(12) United States Patent
Nichol et al.

(10) Patent No.: US 12,262,154 B2
(45) Date of Patent: Mar. 25, 2025

(54) REFLECTIVE DISPLAY COMPRISING COUPLING LIGHTGUIDES FOLDED AT DIFFERENT FOLD ANGLES

(71) Applicant: AZUMO, INC., Chicago, IL (US)

(72) Inventors: Anthony Nichol, Minneapolis, MN (US); Zane Coleman, Elmhurst, IL (US)

(73) Assignee: Azumo, Inc., Chicago, IL (US)

( * ) Notice: Subject to any disclaimer, the term of this patent is extended or adjusted under 35 U.S.C. 154(b) by 659 days.

(21) Appl. No.: 17/305,458

(22) Filed: Jul. 8, 2021

(65) Prior Publication Data

US 2021/0337173 A1    Oct. 28, 2021

Related U.S. Application Data

(63) Continuation of application No. PCT/US2020/012977, filed on Jan. 9, 2020.

(60) Provisional application No. 62/790,105, filed on Jan. 9, 2019.

(51) Int. Cl.
*H04N 9/31* (2006.01)
*F21V 8/00* (2006.01)

(52) U.S. Cl.
CPC ......... *H04N 9/3152* (2013.01); *G02B 6/0055* (2013.01); *G02B 6/0076* (2013.01)

(58) Field of Classification Search
CPC ...... H04N 9/3152; H04N 23/50; H04N 23/61; H04N 23/611; H04N 7/144; H04N 7/147; H04N 9/3194
See application file for complete search history.

(56) References Cited

U.S. PATENT DOCUMENTS

| | | | |
|---|---|---|---|
| 2,732,688 A | 1/1956 | Dickson | |
| 3,535,537 A | 10/1970 | Powell | |
| 3,933,556 A | 1/1976 | Strack | |

(Continued)

FOREIGN PATENT DOCUMENTS

| | | |
|---|---|---|
| CN | 1206661 | 2/1999 |
| CN | 1341229 A | 3/2002 |

(Continued)

OTHER PUBLICATIONS

European Search report for European Patent Application No. 20738199.7.

(Continued)

*Primary Examiner* — Samira Monshi
(74) *Attorney, Agent, or Firm* — Zane Coleman

(57) ABSTRACT

In some aspects, a display comprises a reflective spatial light modulator, a light source, and a film-based lightguide having an array of coupling lightguides in a form of strips of the film extending from and continuous with a lightguide region of the film. The coupling lightguides are folded and stacked behind the reflective spatial light modulator along fold lines oriented at different orientation angles. In some embodiments, the coupling lightguides comprise lateral edges with curved portions. In some embodiments, the coupling lightguides are tapered. In some embodiments, the reflective spatial light modulator comprises an active area in a shape of a polygon with more than four sides or an active area defined by a boundary with a circular, semi-circular, or arcuate portion.

20 Claims, 5 Drawing Sheets

(56) References Cited

U.S. PATENT DOCUMENTS

| | | |
|---|---|---|
| 4,026,693 A | 5/1977 | Sato |
| 4,141,058 A | 2/1979 | Mizohata et al. |
| 4,151,582 A | 4/1979 | Grunberger |
| 4,228,267 A | 10/1980 | Tigashizume et al. |
| 4,389,698 A | 6/1983 | Cibie |
| 4,422,719 A | 12/1983 | Orcutt |
| 4,511,215 A | 4/1985 | Butler |
| 4,551,985 A | 11/1985 | Kovach |
| 4,592,717 A | 6/1986 | Albert |
| 4,667,481 A | 5/1987 | Watanabe et al. |
| 4,824,194 A | 4/1989 | Karasawa |
| 4,869,570 A | 9/1989 | Yokohama |
| 4,961,617 A | 10/1990 | Shahidi et al. |
| 4,974,354 A | 12/1990 | Hembrook, Jr. |
| 5,001,306 A | 3/1991 | Purcell |
| 5,009,483 A | 4/1991 | Rockwell, III |
| 5,106,181 A | 4/1992 | Rockwell, III |
| 5,134,857 A | 8/1992 | Burley |
| 5,165,187 A | 11/1992 | Shahidi-Hamedani et al. |
| 5,315,673 A | 5/1994 | Stetter et al. |
| 5,328,376 A | 7/1994 | West |
| 5,359,691 A | 10/1994 | Tai et al. |
| 5,379,539 A | 1/1995 | Hannula |
| 5,390,436 A | 2/1995 | Ashall |
| 5,506,929 A | 4/1996 | Tai et al. |
| 5,544,268 A | 8/1996 | Bischel |
| 5,596,671 A | 1/1997 | Rockwell, III |
| 5,661,839 A | 8/1997 | Whitehead |
| 5,737,472 A | 4/1998 | Bernasson et al. |
| 5,786,665 A | 7/1998 | Ohtsuki et al. |
| 5,789,710 A | 8/1998 | Vanderpoel |
| 5,818,554 A | 10/1998 | Hiyama et al. |
| 5,888,324 A | 3/1999 | Nakamura |
| 5,938,991 A | 8/1999 | Pollock |
| 6,049,641 A | 4/2000 | Deacon |
| 6,068,381 A | 5/2000 | Ayers |
| 6,208,788 B1 | 3/2001 | Nosov |
| RE37,186 E | 5/2001 | Hill |
| 6,224,269 B1 | 5/2001 | Engstrand et al. |
| 6,315,433 B1 | 11/2001 | Cavello |
| 6,354,724 B1 | 3/2002 | Sakushita |
| 6,361,180 B1 | 3/2002 | Iimura |
| 6,464,365 B1 | 10/2002 | Gunn et al. |
| 6,490,090 B1 | 12/2002 | Kumazawa |
| 6,490,401 B2 | 12/2002 | Corneilissen et al. |
| 6,498,882 B1 | 12/2002 | Buckelew et al. |
| 6,547,445 B2 | 4/2003 | Kiani |
| 6,577,359 B2 | 6/2003 | Ishihara |
| 6,592,233 B1 | 7/2003 | Parikka |
| 6,641,880 B1 | 11/2003 | Deyak et al. |
| 6,700,054 B2 | 3/2004 | Cherney et al. |
| 6,750,996 B2 | 6/2004 | Jagt et al. |
| 6,825,895 B2 | 11/2004 | Nakano et al. |
| 6,846,082 B2 | 1/2005 | Glent-Madsen et al. |
| 6,847,424 B2 | 1/2005 | Gotoh et al. |
| 6,933,994 B1 | 8/2005 | Kaneko et al. |
| 6,964,226 B2 | 11/2005 | Weiss et al. |
| 7,004,610 B2 | 2/2006 | Yamashita et al. |
| 7,066,634 B2 | 6/2006 | Kitamura et al. |
| 7,108,414 B2 | 9/2006 | McCollum et al. |
| 7,121,711 B2 | 10/2006 | Yamamoto et al. |
| 7,190,425 B2 | 3/2007 | Hong |
| 7,237,396 B1 | 7/2007 | Nichol |
| 7,275,850 B2 | 10/2007 | Nesterenko |
| 7,343,060 B2 | 3/2008 | Ohtsu et al. |
| 7,384,173 B2 | 6/2008 | Whitney |
| 7,406,245 B2 | 7/2008 | Page et al. |
| 7,411,142 B2 | 8/2008 | Jung et al. |
| 7,413,334 B2 | 8/2008 | Baba |
| 7,413,336 B2 | 8/2008 | Freking et al. |
| 7,430,355 B2 | 9/2008 | Heikenfeld et al. |
| 7,452,120 B2 | 11/2008 | Lee et al. |
| 7,457,509 B2 | 11/2008 | Haenen et al. |
| 7,490,967 B2 | 2/2009 | Syribeys |
| 7,534,022 B2 | 5/2009 | Chou |
| 7,540,644 B1 * | 6/2009 | Allen ............... G02B 6/0006 345/84 |
| 7,542,635 B2 | 6/2009 | Coleman |
| 7,565,054 B2 | 7/2009 | Rinko |
| 7,582,000 B2 | 9/2009 | Pendlebury et al. |
| 7,639,916 B2 | 12/2009 | Fine |
| 7,643,105 B2 | 1/2010 | Yang |
| 7,729,941 B2 | 6/2010 | Zampini, II et al. |
| 7,742,120 B2 | 6/2010 | Bayley et al. |
| 7,750,886 B2 | 7/2010 | Sampsell |
| 7,751,663 B2 | 7/2010 | Van Ostrand |
| 7,760,284 B2 | 7/2010 | Murase |
| 7,773,849 B2 | 8/2010 | Shani |
| 7,780,329 B2 | 8/2010 | McCollum et al. |
| 7,810,977 B2 | 10/2010 | Jeyama |
| 7,911,554 B2 | 3/2011 | Oohira |
| 7,949,213 B2 | 5/2011 | Mienko et al. |
| 8,013,831 B2 | 9/2011 | Sampsell |
| 8,016,473 B2 | 9/2011 | Salters |
| 8,098,347 B2 | 1/2012 | Brott et al. |
| 8,128,271 B2 | 3/2012 | Nichol |
| 8,164,703 B2 | 4/2012 | Cheng |
| 8,167,461 B2 | 5/2012 | Nichol |
| 8,231,256 B1 | 7/2012 | Coleman et al. |
| 8,434,909 B2 | 5/2013 | Nichol |
| 8,439,545 B2 | 5/2013 | Cheong et al. |
| 8,714,781 B2 | 5/2014 | Nichol |
| 8,750,671 B1 | 6/2014 | Kelly et al. |
| 8,761,565 B1 | 6/2014 | Coleman et al. |
| 8,764,262 B2 | 7/2014 | Nichol et al. |
| 8,794,809 B2 | 8/2014 | Lundin et al. |
| 8,905,610 B2 | 12/2014 | Coleman et al. |
| 8,917,962 B1 | 12/2014 | Nichol et al. |
| 8,950,902 B2 | 2/2015 | Nichol et al. |
| 8,970,461 B2 | 3/2015 | Tatsuya et al. |
| 9,028,123 B2 | 5/2015 | Nichol et al. |
| 9,103,956 B2 | 8/2015 | Nichol et al. |
| 9,110,200 B2 | 8/2015 | Nichol et al. |
| 9,287,336 B2 | 3/2016 | Lin et al. |
| 9,304,243 B2 | 4/2016 | Wolk et al. |
| 9,523,807 B2 | 12/2016 | Nichol et al. |
| 9,557,473 B2 | 1/2017 | Nichol et al. |
| 9,566,751 B1 | 2/2017 | Nichol et al. |
| 9,645,304 B2 | 5/2017 | Nichol et al. |
| 9,651,729 B2 | 5/2017 | Nichol et al. |
| 9,690,032 B1 | 6/2017 | Nichol et al. |
| 9,798,075 B2 | 10/2017 | Nichol et al. |
| 10,036,847 B2 | 7/2018 | Nichol et al. |
| 10,073,208 B2 | 9/2018 | Nichol et al. |
| 10,175,413 B2 | 1/2019 | Nichol et al. |
| 10,191,199 B2 | 1/2019 | Nichol et al. |
| 10,215,905 B2 | 2/2019 | Nichol et al. |
| 10,254,472 B2 | 4/2019 | Coleman et al. |
| 10,393,941 B2 | 8/2019 | Nichol et al. |
| 10,429,577 B2 | 10/2019 | Coleman et al. |
| 10,466,409 B2 | 11/2019 | Nichol et al. |
| 10,598,848 B2 | 3/2020 | Coleman et al. |
| 10,802,196 B2 | 10/2020 | Nichol et al. |
| 10,935,716 B2 | 3/2021 | Nichol et al. |
| 2001/0019379 A1 | 9/2001 | Ishihara et al. |
| 2001/0019380 A1 | 9/2001 | Ishihara |
| 2002/0015563 A1 | 2/2002 | Murakami |
| 2002/0028600 A1 | 3/2002 | Kondo |
| 2002/0047953 A1 | 4/2002 | Endo |
| 2002/0176035 A1 | 11/2002 | Yamazaki |
| 2003/0016930 A1 | 1/2003 | Inditsky |
| 2003/0174953 A1 | 9/2003 | Carnevale et al. |
| 2003/0198456 A1 | 10/2003 | Steiner |
| 2004/0008398 A1 | 1/2004 | Amundson |
| 2004/0017528 A1 | 1/2004 | Kano et al. |
| 2004/0093779 A1 | 5/2004 | Blach |
| 2004/0114342 A1 | 6/2004 | Lin et al. |
| 2004/0119908 A1 | 6/2004 | Sakai |
| 2004/0170373 A1 | 9/2004 | Kim |
| 2004/0228104 A1 | 11/2004 | Birman |
| 2004/0231481 A1 | 11/2004 | Floding et al. |
| 2005/0046921 A1 | 3/2005 | Govil et al. |
| 2005/0072032 A1 | 4/2005 | McCollum et al. |
| 2005/0088830 A1 | 4/2005 | Yumoto et al. |

(56) References Cited

U.S. PATENT DOCUMENTS

| | | |
|---|---|---|
| 2005/0091886 A1 | 5/2005 | Kim |
| 2005/0179850 A1 | 8/2005 | Du |
| 2005/0194896 A1 | 9/2005 | Sugita et al. |
| 2005/0219148 A1 | 10/2005 | Bayley et al. |
| 2005/0264730 A1 | 12/2005 | Shingo et al. |
| 2006/0001037 A1 | 1/2006 | Schardt et al. |
| 2006/0007108 A1 | 1/2006 | Utsumi et al. |
| 2006/0008205 A1 | 1/2006 | Meir et al. |
| 2006/0008225 A1 | 1/2006 | Naitou et al. |
| 2006/0024017 A1 | 2/2006 | Page et al. |
| 2006/0061008 A1 | 3/2006 | Karner et al. |
| 2006/0105149 A1 | 5/2006 | Donahue |
| 2006/0114244 A1 | 6/2006 | Saxena et al. |
| 2006/0120106 A1 | 6/2006 | Kuki et al. |
| 2006/0120681 A1 | 6/2006 | Mune et al. |
| 2006/0207134 A1 | 9/2006 | Harry |
| 2006/0215958 A1 | 9/2006 | Yeo et al. |
| 2006/0269213 A1 | 11/2006 | Hwang |
| 2007/0002578 A1 | 1/2007 | Furusawa et al. |
| 2007/0014110 A1 | 1/2007 | Itaya |
| 2007/0025672 A1 | 2/2007 | Suzuki et al. |
| 2007/0031097 A1 | 2/2007 | Heikenfeld et al. |
| 2007/0035843 A1 | 2/2007 | Casserly |
| 2007/0081344 A1 | 4/2007 | Cappaert et al. |
| 2007/0081360 A1 | 4/2007 | Bailey et al. |
| 2007/0086712 A1 | 4/2007 | Shani |
| 2007/0116424 A1 | 5/2007 | Ting et al. |
| 2007/0133935 A1 | 6/2007 | Fine |
| 2007/0147023 A1 | 6/2007 | Matsushita |
| 2007/0153545 A1 | 7/2007 | Lee |
| 2007/0153548 A1 | 7/2007 | Hamada et al. |
| 2007/0171330 A1 | 7/2007 | Hung |
| 2007/0183730 A1 | 8/2007 | Morimoto et al. |
| 2007/0258267 A1 | 11/2007 | Huang et al. |
| 2007/0274091 A1 | 11/2007 | Inditsky |
| 2007/0279549 A1 | 12/2007 | Iwasaki |
| 2007/0280593 A1 | 12/2007 | Brychell et al. |
| 2007/0286562 A1 | 12/2007 | Inditsky |
| 2008/0007965 A1 | 1/2008 | Kanade et al. |
| 2008/0025039 A1 | 1/2008 | Guillermo |
| 2008/0031579 A1 | 2/2008 | Enami |
| 2008/0037284 A1 | 2/2008 | Rudisill |
| 2008/0043490 A1 | 2/2008 | Coleman et al. |
| 2008/0048366 A1 | 2/2008 | Durney |
| 2008/0075414 A1 | 3/2008 | Van Ostrand |
| 2008/0148753 A1 | 6/2008 | Welker et al. |
| 2008/0159693 A1 | 7/2008 | Chang |
| 2008/0231937 A1 | 9/2008 | Govil et al. |
| 2008/0266863 A1 | 10/2008 | Rinko |
| 2008/0285310 A1 | 11/2008 | Hong |
| 2009/0028038 A1 | 1/2009 | Harada |
| 2009/0034292 A1 | 2/2009 | Pokrovskiy et al. |
| 2009/0059618 A1 | 3/2009 | Onikiri et al. |
| 2009/0091836 A1 | 4/2009 | Mi et al. |
| 2009/0147535 A1 | 6/2009 | Mienko et al. |
| 2009/0172978 A1 | 7/2009 | Steenblick et al. |
| 2009/0173654 A1 | 7/2009 | Steenblick et al. |
| 2009/0190373 A1 | 7/2009 | Bita et al. |
| 2009/0207632 A1 | 8/2009 | McCollum et al. |
| 2009/0219734 A1 | 9/2009 | Sawada et al. |
| 2009/0257108 A1 | 10/2009 | Gruhlke et al. |
| 2009/0257215 A1 | 10/2009 | Gomi |
| 2010/0014311 A1 | 1/2010 | Danieli |
| 2010/0021109 A1 | 1/2010 | Ohtsu et al. |
| 2010/0021119 A1 | 1/2010 | Ohtsu et al. |
| 2010/0027289 A1 | 2/2010 | Kazuma et al. |
| 2010/0040986 A1 | 2/2010 | Yamaguchi |
| 2010/0053148 A1 | 3/2010 | Khazeni et al. |
| 2010/0067254 A1 | 3/2010 | Ohta |
| 2010/0074585 A1 | 3/2010 | Shimizu et al. |
| 2010/0092143 A1 | 4/2010 | Ushiwata et al. |
| 2010/0109173 A1 | 5/2010 | Yamamoto |
| 2010/0156953 A1 | 6/2010 | Nevitt |
| 2010/0212719 A1 | 8/2010 | Stolum |
| 2010/0214786 A1 | 8/2010 | Nichol |
| 2010/0246200 A1 | 9/2010 | Tessnow et al. |
| 2010/0258419 A1 | 10/2010 | Chung et al. |
| 2011/0032724 A1 | 2/2011 | Kinoshita |
| 2011/0085771 A1 | 4/2011 | Matsuyama et al. |
| 2011/0110638 A1 | 5/2011 | Shioda |
| 2011/0134623 A1 | 6/2011 | Sherman et al. |
| 2011/0164875 A1 | 7/2011 | Bicknell et al. |
| 2011/0176325 A1 | 7/2011 | Sherman et al. |
| 2011/0187964 A1 | 8/2011 | Li et al. |
| 2011/0227487 A1 | 9/2011 | Nichol et al. |
| 2011/0249425 A1 | 10/2011 | Aurongzeb et al. |
| 2011/0255303 A1 | 10/2011 | Nichol et al. |
| 2011/0273901 A1 | 11/2011 | Nichol et al. |
| 2011/0273906 A1 | 11/2011 | Nichol et al. |
| 2011/0277361 A1 | 11/2011 | Nichol et al. |
| 2011/0283576 A1 | 11/2011 | Nichol |
| 2011/0286234 A1 | 11/2011 | Nichol |
| 2012/0212414 A1 | 8/2012 | Osterhout et al. |
| 2012/0229531 A1 | 9/2012 | Yata et al. |
| 2012/0287674 A1 | 11/2012 | Nichol et al. |
| 2013/0038928 A1 | 2/2013 | Padiyath et al. |
| 2013/0148055 A1 | 6/2013 | Chen et al. |
| 2013/0155676 A1 | 6/2013 | Lee |
| 2013/0155723 A1 | 6/2013 | Coleman |
| 2013/0208508 A1 | 8/2013 | Nichol et al. |
| 2013/0250618 A1 | 9/2013 | Nichol et al. |
| 2013/0314942 A1 | 11/2013 | Nichol et al. |
| 2014/0049983 A1 | 2/2014 | Nichol et al. |
| 2014/0056028 A1 | 2/2014 | Nichol et al. |
| 2014/0063853 A1* | 3/2014 | Nichol .................. G02B 6/0028 362/616 |
| 2014/0340910 A1 | 11/2014 | Goldstein et al. |
| 2014/0360578 A1 | 12/2014 | Nichol et al. |
| 2015/0049285 A1 | 2/2015 | Qian et al. |
| 2015/0078033 A1 | 3/2015 | Lee et al. |
| 2015/0078035 A1 | 3/2015 | Nichol et al. |
| 2015/0219834 A1 | 8/2015 | Nichol et al. |
| 2015/0253487 A1 | 9/2015 | Nichol et al. |
| 2015/0354781 A1 | 12/2015 | Catalano |
| 2016/0218156 A1 | 7/2016 | Shedletsky et al. |
| 2017/0045669 A1 | 2/2017 | Nichol et al. |
| 2017/0205572 A1 | 7/2017 | Nichol et al. |
| 2017/0235036 A1 | 8/2017 | Nichol et al. |
| 2017/0285243 A1 | 10/2017 | Nichol et al. |
| 2018/0052274 A1 | 2/2018 | Nichol et al. |
| 2018/0059318 A1 | 3/2018 | Nichol et al. |
| 2018/0210131 A1 | 7/2018 | Nichol et al. |
| 2018/0335629 A1 | 11/2018 | Cheng et al. |
| 2018/0348425 A1 | 12/2018 | Coleman et al. |
| 2019/0107665 A1 | 4/2019 | Bu et al. |
| 2019/0170925 A1* | 6/2019 | Nichol .................. G02B 6/0065 |
| 2019/0170928 A1 | 6/2019 | Nichol et al. |
| 2019/0187360 A1 | 6/2019 | Nichol et al. |
| 2019/0235157 A1 | 8/2019 | Coleman et al. |
| 2019/0302327 A1 | 10/2019 | Murata et al. |
| 2020/0310020 A1 | 10/2020 | Sasaki et al. |
| 2021/0080638 A1 | 3/2021 | Nichol et al. |
| 2021/0181405 A1 | 6/2021 | Nichol et al. |
| 2021/0215857 A1 | 7/2021 | Nichol et al. |
| 2021/0294021 A1 | 9/2021 | Romero et al. |
| 2021/0333629 A1 | 10/2021 | Nichol et al. |
| 2022/0179148 A1 | 6/2022 | Coleman et al. |
| 2022/0196903 A1 | 6/2022 | Nichol et al. |
| 2023/0011530 A1 | 1/2023 | Nichol et al. |
| 2023/0099260 A1 | 3/2023 | Nichol et al. |

FOREIGN PATENT DOCUMENTS

| | | |
|---|---|---|
| CN | 1981220 A | 6/2007 |
| CN | 1981221 | 6/2007 |
| CN | 1985202 | 6/2007 |
| CN | 200962289 Y | 10/2007 |
| CN | 101140335 A | 3/2008 |
| CN | 101349400 A | 1/2009 |
| CN | 101639169 A | 2/2010 |
| CN | 102681253 A | 9/2012 |
| CN | 109564304 A | 4/2019 |
| DE | 2736486 A1 | 2/1978 |
| EP | 284098 A1 | 9/1988 |

(56) References Cited

FOREIGN PATENT DOCUMENTS

| | | |
|---|---|---|
| EP | 1760502 A1 | 3/2007 |
| EP | 2103972 A1 | 9/2009 |
| GB | 198085 | 5/1923 |
| GB | 662514 | 12/1951 |
| GB | 2320156 A | 6/1998 |
| JP | 61-278416 A | 12/1987 |
| JP | 10-197865 A | 7/1998 |
| JP | 863301909 A | 12/1998 |
| JP | 11-264974 A | 9/1999 |
| JP | 2000-056138 A | 2/2000 |
| JP | 2000141997 A | 5/2000 |
| JP | 2000147218 A | 5/2000 |
| JP | 2000-258633 | 9/2000 |
| JP | 2001243818 | 9/2001 |
| JP | 2001266626 A | 9/2001 |
| JP | 2001305540 A | 10/2001 |
| JP | 2001-312233 A | 11/2001 |
| JP | 2002277661 A | 9/2002 |
| JP | 2004069729 A | 3/2004 |
| JP | 2004109426 A | 4/2004 |
| JP | 2004-170972 A | 6/2004 |
| JP | 2004199967 A | 7/2004 |
| JP | 2004-288570 A | 10/2004 |
| JP | 2005043766 A | 2/2005 |
| JP | 2005340160 A | 8/2005 |
| JP | 2006-003431 A | 1/2006 |
| JP | 2006-024561 | 1/2006 |
| JP | 2006310112 A | 11/2006 |
| JP | 2007053054 A | 3/2007 |
| JP | 2007-535790 A | 12/2007 |
| JP | 2008-198615 A | 8/2008 |
| KR | 20050113118 A | 12/2005 |
| KR | 20060057583 A | 5/2006 |
| WO | 1996011358 | 4/1996 |
| WO | 2004027314 A1 | 4/2004 |
| WO | 2006131924 A2 | 12/2006 |
| WO | 2007081862 A2 | 7/2007 |
| WO | 2007123180 A1 | 11/2007 |
| WO | 2007143383 A2 | 12/2007 |
| WO | 2009048863 A1 | 4/2009 |
| WO | 2009084176 A1 | 7/2009 |
| WO | 2009084556 A1 | 7/2009 |
| WO | 2010005655 A2 | 1/2010 |
| WO | 2010085787 A1 | 7/2010 |
| WO | 2011130715 A2 | 10/2011 |
| WO | 2011130718 A2 | 10/2011 |
| WO | 2011130720 A2 | 10/2011 |
| WO | 2012016047 A1 | 2/2012 |
| WO | 2012068543 A1 | 5/2012 |
| WO | 2012088315 A1 | 6/2012 |
| WO | 2012122511 A1 | 9/2012 |
| WO | 2012158460 A1 | 11/2012 |
| WO | 2018144720 A1 | 9/2018 |
| WO | 2019090139 A1 | 5/2019 |
| WO | 2020047340 A1 | 3/2020 |
| WO | 2020123539 A1 | 6/2020 |
| WO | 2020142731 A1 | 7/2020 |
| WO | 2020146668 A1 | 7/2020 |
| WO | 2021022307 A1 | 2/2021 |
| WO | 2012116215 A1 | 8/2021 |
| WO | 2022072386 A1 | 7/2022 |

OTHER PUBLICATIONS

Rizzo, et al., "The recovery after bending of polycarbonate sheets." Rheol. Acta 20, 133-138 (1981), ISSN 0035-4511, p. 138, In 1-2.
Lee et al., "LED Light Coupler Design for a Ultra Thin Light Guide," Journal of the Optical Society of Korea, vol. 11, No. 3, Sep. 2007, pp. 113-117.
Chien et al., "The study of LED uniform lightguide for liquid crystal display backlight applications," Tatung University white paper, Taipei, Taiwan, 2008.
Siitonen et al., "Coupling of light from an LED into a thin light guide by diffractive gratings," Applied Optics, vol. 43, No. 30, Oct. 2004, 5631-5636.
Murata et al., "Input couplers for thin light-guides and light-emitting diodes," Optical Engineering 47(2), Feb. 2008, 027001-027007.
Kim, Joon-Sung, et al. "Stacked Polymeric Multimode Waveguide Arrays for Two-Dimensional Optical Interconnects", Journal of Lightwave Technology, p. 840, Mar. 2004.
Luminus Devices PhlatLight Data Sheet, PDS-001022 Rev 05, 2009.
International Search Report for International Application No. PCT/US08/79041, dated Jan. 8, 2009.
Cardinal Intellectual Property's search report (Work order 5874.5) including the results of a search for the features of the claims included in the U.S. patent application entitled "Light Coupling Into Films", inventor: Anthony Nichol, and having assigned U.S. Appl. No. 12/682,387. The foregoing U.S. patent application is a continuation of U.S. Appl. No. 12/682,387.
Cardinal Intellectual Property's supplemental search report dated Nov. 7, 2011 (Work order 5874.6) including the results of a search for the features of the claims included in the U.S. patent application entitled "Method of Manufacturing a Light Emitting Device", inventor: Anthony Nichol, and having assigned U.S. Appl. No. 12/682,387. The foregoing U.S. patent application is a continuation of U.S. Appl. No. 12/682,387.
International Search Report for International Application No. PCT/US11/032797 dated Nov. 7, 2011.
Written Opinion of the International Searching Authority for International Application No. PCT/US11/032797 dated Nov. 7, 2011.
International Search Report for International Application No. PCT/US11/032795 dated Nov. 16, 2011.
Written Opinion of the International Searching Authority for International Application No. PCT/US11/032795 dated Nov. 16, 2011.
International Search Report for International Application No. PCT/US11/032792 dated Nov. 17, 2011.
Written Opinion of the International Searching Authority for International Application No. PCT/US11/032792 dated Nov. 17, 2011.
Written Opinion of the International Searching Authority for International Application No. PCT/US08/079041 dated Jan. 8, 2009.
International Search Report for International Application No. PCT/US10/22066 dated Mar. 22, 2010.
Written Opinion of the International Searching Authority for International Application No. PCT/US10/22066 dated Mar. 22, 2010.
International Search Report for International Application No. PCT/US11/045730 dated Dec. 23, 2011.
Written Opinion of the International Searching Authority for International Application No. PCT/US11/045730 dated Dec. 23, 2011.
International Search Report for International Application No. PCT/US11/61528 dated Mar. 26, 2012.
Written Opinion of the International Searching Authority for International Application No. PCT/US11/61528 dated Mar. 26, 2012.
International Search Report for International Application No. PCT/US11/066596 dated May 7, 2012.
Written Opinion of the International Searching Authority for International Application No. PCT/US11/066596 dated May 7, 2012.
Cardinal Intellectual Property's supplemental search report dated Nov. 7, 2011 (Work Order 5874.6) including the results of a search for the features of the claims included in the U.S. patent application entitled "Method of Manufacturing a Light Emitting Device," inventor: Anthony Nichol. The foregoing U.S. Patent application is a continuation of U.S. Appl. No. 12/682,387.
International Search Report and Written Opinion for International Application No. PCT/US2012/028578 dated Jun. 28, 2012.
Office action dated Nov. 19, 2013 by the China Patent Office for application No. 201180027447.2.
European Search Report and written opinion for European Application No. EP08838526 dated Sep. 19, 2012.
Office action dated Sep. 10, 2012 by the State Intellectual Property Office of China for application No. CN201080005385.0.
International Search Report and Written opinion for International Application No. PCT/US2012/37317 dated Aug. 22, 2012.
Office action dated Dec. 3, 2013 by Japan Patent Office for application No. 2010-528972.

(56) References Cited

OTHER PUBLICATIONS

Office action dated Mar. 5, 2013 by the Japan Patent Office for application No. 2010-528972.
Office action dated May 15, 2012 by the USPTO for U.S. Appl. No. 12/682,387.
Office action dated Dec. 23, 2011 by the USPTO for U.S. Appl. No. 12/682,387.
Office action dated Jul. 23, 2012 by IP Australia for application No. 2010206525.
Office action dated Nov. 22, 2012 by Instituto Mexicano de la Propiedad Industrial for application MX/a/2011/007770.
Office action dated Dec. 6, 2012 by the USPTO for U.S. Appl. No. 13/088,231.
Notice of allowance dated Jan. 7, 2013 by the USPTO for U.S. Appl. No. 13/089,311.
Buchner, Diplomarbeit: Kinetmatics of 3D Folded Structures for Nanostructured Origami, Department of Mechanical Engineering, 3D optical Systems Group, Massachusetts Institute of Technology, 2003.
Nichol, A.J.; Barbastathis, G., "Sub-30nm alignment accuracy between layered photonic nanostructures using optimized V nanomagnet arrays," Optical MEMs and Nanophotonics, 2008 IEEE/LEOS International Conference on , vol. No., pp. 9,10, Aug. 11-14, 2008.
Arora et al., " Membrane folding to achieve three-dimensional nanostructures: Nanopatterned silicon nitride folded with stressed chromium hinges," Appl. Phys. Lett. 88, 053108 (Jan. 2006).
"Nanostructured Origami Folding of Patternable Resist for 3D Lithography ""Se Young Yang, Hyung-ryul Johnny Choi, Martin Deterre, George Barbastathis"" IEEE 2010 International Conference on Optical MEMS & Nanophotonics, p. 37-38, Aug. 2010".
Notice of allowance dated Jul. 29, 2013 by the China Patent Office for application No. 201080005385.0.
Office action dated Jun. 20, 2013 by Instituto Mexicano de la Propiedad Industrial for application MX/a/2012/012033.
Office action dated Jun. 26, 2013 by Instituto Mexicano de la Propiedad Industrial for application MX/a/2012/012034.
Office action dated Jun. 26, 2013 by Instituto Mexicano de la Propiedad Industrial for application MX/a/2012/012035.
Office action dated Oct. 15, 2013 by the China Patent Office for application No. 201180027439.8.
Office action dated Mar. 13, 2023 in Chinese Application No. 202080019873.0.
Office action dated Mar. 13, 2023 in Chinese Application No. 202080019873.0 (Machine Translation).
International Search Report and Written Opinion for International Application No. PCT/US2019/48943 dated Nov. 29, 2019.
International Search Report and Written Opinion for International Application No. PCT/US2019/065525 dated Feb. 21, 2020.
International Search Report and Written Opinion for International Application No. PCT/US2020/012245 dated Mar. 24, 2020.
International Search Report and Written Opinion for International Application No. PCT/US2020/012977 dated Mar. 20, 2020.
International Search Report and Written Opinion for International Application No. PCT/US2020/070341 dated Oct. 9, 2020.

\* cited by examiner

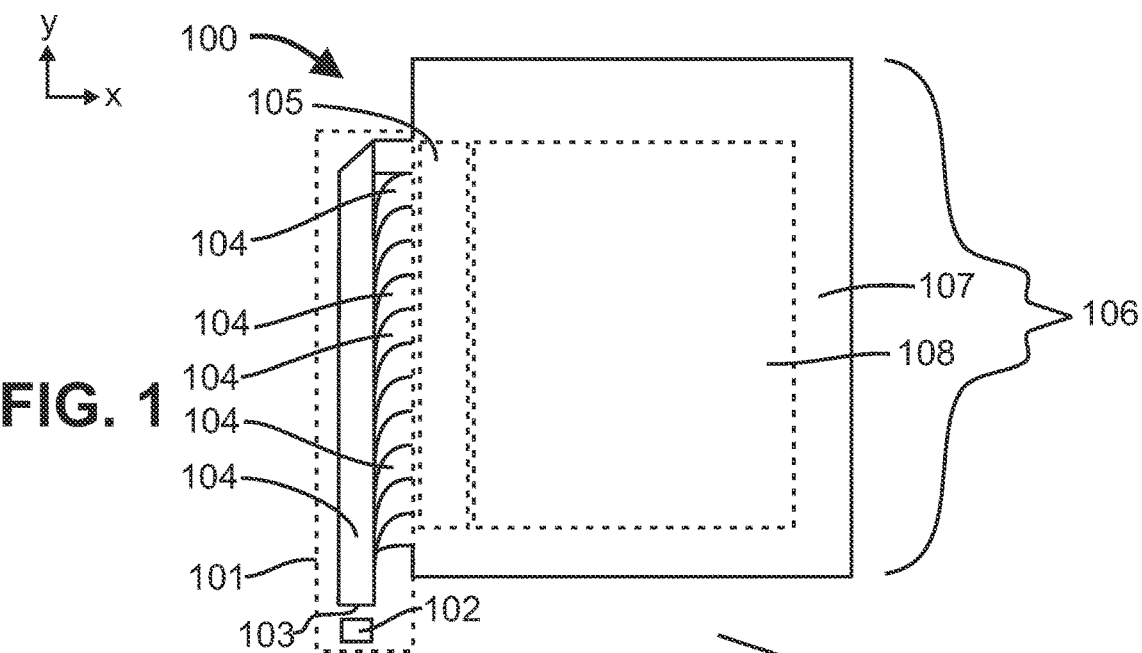
FIG. 1
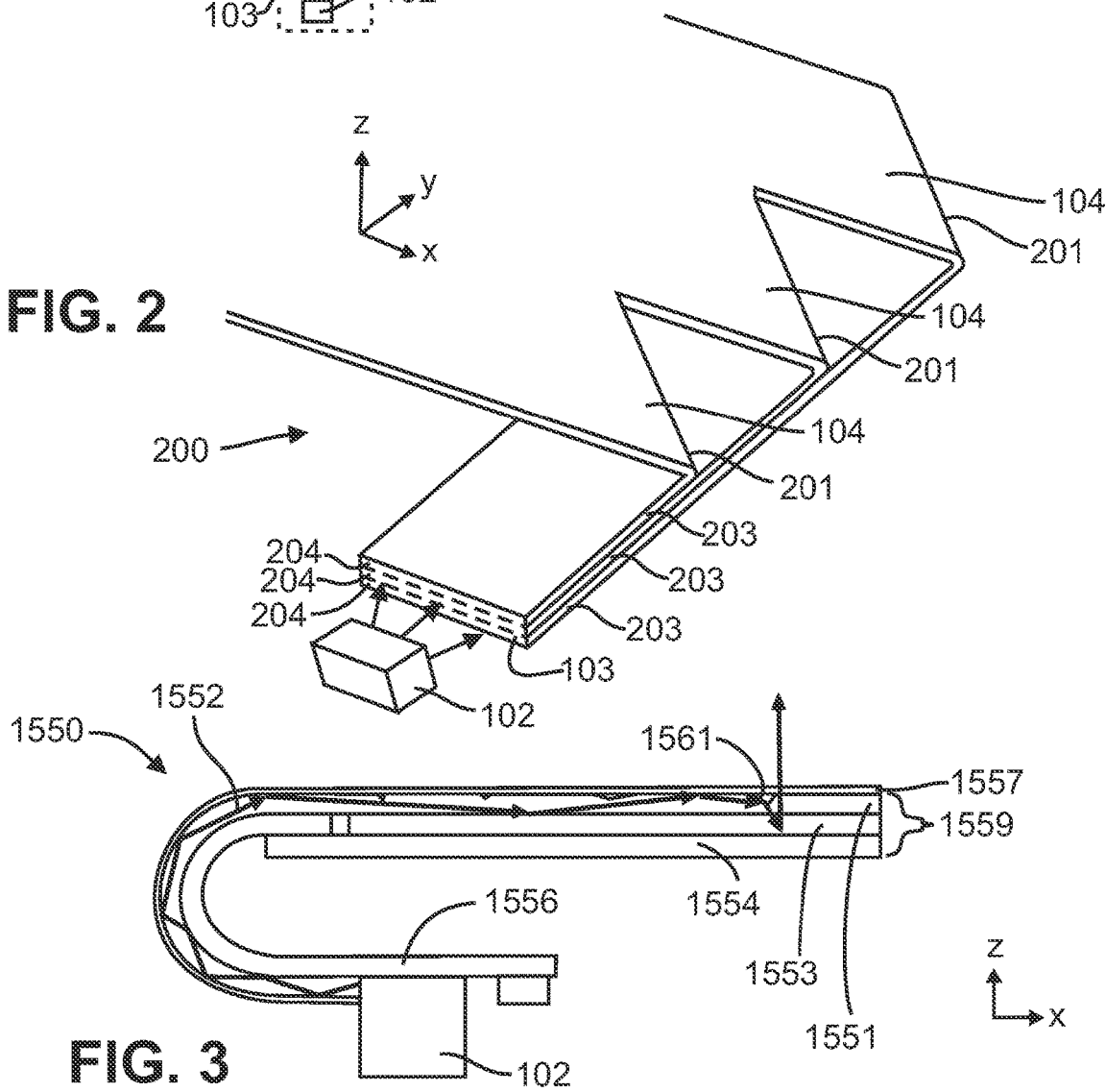
FIG. 2
FIG. 3

REFLECTIVE DISPLAY COMPRISING COUPLING LIGHTGUIDES FOLDED AT DIFFERENT FOLD ANGLES

CROSS REFERENCE TO RELATED APPLICATION

This application is a continuation application of International Application No. PCT/US2020/12977, entitled "Reflective display comprising coupling lightguides folded at different fold angles," filed on Jan. 9, 2020, which claims the benefit of U.S. Provisional Application No. 62/790,105, entitled "Film-based lightguide comprising tapered coupling lightguides with curved lateral edges" filed on Jan. 9, 2019.

TECHNICAL FIELD

The subject matter disclosed herein generally relates to lightguides, films, and light emitting devices such as, without limitation, light fixtures, backlights, frontlights, light emitting signs, passive displays, and active displays and their components and methods of manufacture.

BACKGROUND

Light emitting devices are needed that have a very thin form factor that can generate light with specific angular light output profiles. Conventionally, in order to reduce the thickness of displays and backlights, edge-lit configurations using rigid lightguides have been used to receive light from the edge of and direct light out of a larger area surface. These types of light emitting devices are typically housed in relatively thick, rigid frames that do not allow for component or device flexibility and require long lead times for design changes. The volume of these devices remains large and often includes thick or large frames or bezels around the device. The thick lightguides (typically 2 millimeters (mm) and larger) limit the design configurations, production methods, and illumination modes. The ability to further reduce the thickness and overall volume of these area light emitting devices has been limited by the ability to couple sufficient light flux into a thinner lightguide. Achieving a high level of uniformity in the light emitting region has been problematic in some configurations due to introductions of artifacts from the array of coupling lightguides and different desired form factors including wider light emitting regions than light mixing regions.

SUMMARY

In one embodiment, a display comprises: a reflective spatial light modulator comprising a front viewing side and a back side opposite the front viewing side; a lightguide formed from a film having opposing surfaces with a thickness not greater than 0.5 millimeters therebetween, the lightguide positioned on the front viewing side of the reflective spatial light modulator and comprising a lightguide region, a light emitting region, and a plurality of coupling lightguides in a form of strips of the film extending from and continuous with the lightguide region, and each coupling lightguide of the plurality of coupling lightguides terminates in a bounding edge; a light source positioned to emit light into the bounding edges, the light propagating within the plurality of coupling lightguides to the lightguide region; and a plurality of light extraction features arranged within the light emitting region, the plurality of light extraction features frustrate totally internally reflected light from the light source propagating in the lightguide region such that light exits the lightguide in the light emitting region and propagates to the reflective spatial light modulator, wherein the plurality of coupling lightguides are folded along linear fold lines behind the reflective spatial light modulator such that the plurality of coupling lightguides are stacked on the back side of the reflective spatial light modulator with the bounding edges positioned to receive the light from the light source, and the linear fold lines of the plurality of coupling lightguides are oriented at different fold angles such that a difference between fold angles of adjacent coupling lightguides of the plurality of coupling lightguides is greater than 5 degrees. In another embodiment, each fold angle of the fold angles directs the bounding edge toward a center of the light emitting region in a width direction orthogonal to a thickness direction of the film. In one embodiment, the plurality of coupling lightguides comprise linear lateral edge sections proximate the linear fold lines that are substantially parallel to each other and perpendicular to the linear fold lines. In another embodiment, the reflective spatial light modulator comprises a designed illumination angle for ambient light illumination of the reflective spatial light modulator and a primary axis of illumination defined as an in-plane component of the designed illumination angle in a plane perpendicular to a thickness direction of the reflective spatial light modulator, and optical axes of light from the plurality of coupling lightguides are within 10 degrees of the primary axis of illumination when entering the light emitting region. In a further embodiment, the primary axis of illumination is a downward vertical direction when viewing the display. In one embodiment, the plurality of coupling lightguides comprise lateral edges, and the lateral edges join the lightguide region at an angle less than 10 degrees from the primary axis of illumination. In another embodiment, the plurality of coupling lightguides comprises a central coupling lightguide with a fold angle of 90 degrees from the primary axis of illumination. In one embodiment, the plurality of coupling lightguides comprises coupling lightguides on opposite sides of the central coupling lightguide with fold angles at a same magnitude but opposite in sign. In on embodiment, the reflective spatial light modulator comprises an active area defined by a boundary with a circular, semi-circular, or arcuate portion. In another embodiment, the reflective spatial light modulator comprises an active area in a shape of a polygon with more than four sides. In one embodiment, the linear fold lines are substantially parallel to two or more sides of the more than four sides. In another embodiment, the plurality of coupling lightguides comprise tapered lateral edges that reduce widths of each coupling lightguide of the plurality of coupling lightguides from the lightguide region to the bounding edge. In a further embodiment, the plurality of coupling lightguides comprise tapered lateral edges that reduce widths of each coupling lightguide of the plurality of coupling lightguides from the lightguide region to the bounding edge, and the tapered lateral edges comprise portions curved in a plane orthogonal to a thickness direction of the film. In one embodiment, each coupling lightguide of the plurality of coupling lightguides comprises lateral edges with portions curved in a plane orthogonal to a thickness direction of the coupling lightguide. In a further embodiment, one or more coupling lightguides of the plurality of coupling lightguides comprise: a first lateral edge of the one or more coupling lightguides with a radius of curvature r1 along a section of the first lateral edge; a second lateral edge of the one or more coupling lightguides opposite the first lateral edge with a radius of curvature r2 along a section of the second lateral edge; and a width, w, at a bounding edge in a direction orthogonal to an optical axis of the light source and orthogonal to the thickness direction of the coupling lightguide, and an average radius-to-width ratio, (r1+r2)/2w, of the one or more coupling lightguides is greater than 6.

In one embodiment, a display comprises: a reflective spatial light modulator comprising a front viewing side and a back side opposite the front viewing side; a lightguide formed from a film having opposing surfaces with a thickness not greater than 0.5 millimeters therebetween, the lightguide positioned on the front viewing side of the reflective spatial light modulator and comprising a lightguide region, a light emitting region, and a plurality of coupling lightguides in a form of strips of the film extending from and continuous with the lightguide region, and each coupling lightguide of the plurality of coupling lightguides terminates in a bounding edge; a light source positioned to emit light into the bounding edges, the light propagating within the plurality of coupling lightguides to the lightguide region; and a plurality of light extraction features arranged within the light emitting region, the plurality of light extraction features frustrate totally internally reflected light from the light source propagating in the lightguide region such that light exits the lightguide in the light emitting region and propagates to the reflective spatial light modulator, wherein the plurality of coupling lightguides are folded along linear fold lines behind the reflective spatial light modulator such that the plurality of coupling lightguides are stacked on the back side of the reflective spatial light modulator with the bounding edges positioned to receive the light from the light source, the linear fold lines of the plurality of coupling lightguides are oriented at different fold angles, and the plurality of coupling lightguides comprise lateral edges with curved portions. In one embodiment, the plurality of coupling lightguides comprise tapered lateral edges that reduce widths of each coupling lightguide of the plurality of coupling lightguides from the lightguide region to the bounding edge. In another embodiment, the lateral edges of each coupling lightguide of the plurality of coupling lightguides comprise linear portions proximate the linear fold lines that are substantially parallel to each other. In another embodiment, a display comprises a reflective spatial light modulator comprising a front viewing side and a back side opposite the front viewing side; a lightguide formed from a film having opposing surfaces with a thickness not greater than 0.5 millimeters therebetween, the lightguide positioned on the front viewing side of the reflective spatial light modulator and comprising a lightguide region, a light emitting region, and a plurality of coupling lightguides in a form of strips of the film extending from and continuous with the lightguide region, and each coupling lightguide of the plurality of coupling lightguides terminates in a bounding edge; a light source positioned to emit light into the bounding edges, the light propagating within the plurality of coupling lightguides to the lightguide region; and a plurality of light extraction features arranged within the light emitting region, the plurality of light extraction features frustrate totally internally reflected light from the light source propagating in the lightguide region such that light exits the lightguide in the light emitting region and propagates to the reflective spatial light modulator, wherein the reflective spatial light modulator comprises an active area defined by a boundary with a circular, semi-circular, or arcuate portion, or an active area in a shape of a polygon with more than four sides, the plurality of coupling lightguides are folded along linear fold lines behind the reflective spatial light modulator such that the plurality of coupling lightguides are stacked on the back side of the reflective spatial light modulator with the bounding edges positioned to receive the light from the light source, and the linear fold lines of the plurality of coupling lightguides are oriented at different fold angles.

BRIEF DESCRIPTION OF THE DRAWINGS

FIG. 1 is a top view of one embodiment of a light emitting device including a light input coupler disposed on one side of a lightguide.

FIG. 2 is a perspective view of one embodiment of a light input coupler with coupling lightguides folded in the −y direction.

FIG. 3 is a cross-sectional side view of one embodiment of a light emitting display including a lightguide that further functions as a top substrate for a reflective spatial light modulator.

DETAILED DESCRIPTION

Figure 4:
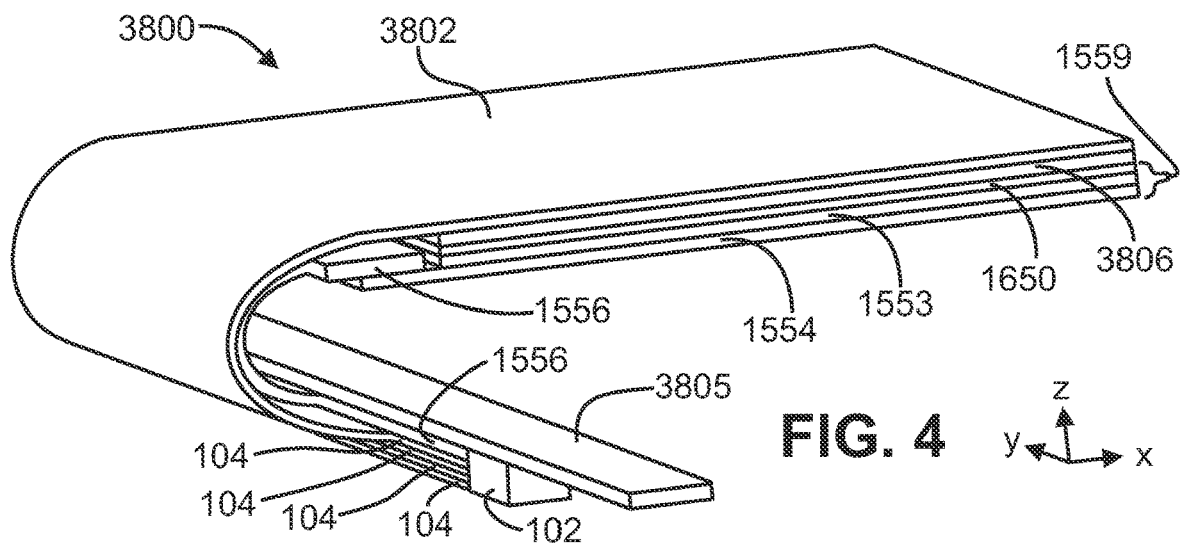
FIG. 4 is a perspective view of one embodiment of a light emitting device including a film-based lightguide that further functions as a top substrate for the reflective spatial light modulator with the light source disposed on a circuit board physically coupled to the flexible connector.

The features and other details of several embodiments will now be more particularly described. It will be understood that particular embodiments described herein are shown by way of illustration and not as limitations. The principal features can be employed in various embodiments without departing from the scope of any particular embodiment. All parts and percentages are by weight unless otherwise specified.

Definitions

"Electroluminescent display" is defined herein as a means for displaying information wherein the legend, message, image or indicia thereon is formed by or made more apparent by an electrically excitable source of illumination. This includes illuminated cards, transparencies, pictures, printed graphics, fluorescent signs, neon signs, channel letter signs, light box signs, bus-stop signs, illuminated advertising signs, EL (electroluminescent) signs, LED signs, edge-lit signs, advertising displays, liquid crystal displays, electrophoretic displays, point of purchase displays, directional signs, illuminated pictures, and other information display signs. Electroluminescent displays can be self-luminous (emissive), back-illuminated (back-lit), front illuminated (front-lit), edge-illuminated (edge-lit), waveguide-illuminated or other configurations wherein light from a light source is directed through static or dynamic means for creating images or indicia.

"Optically coupled" as defined herein refers to coupling of two or more regions or layers such that the luminance of light passing from one region to the other is not substantially reduced by Fresnel interfacial reflection losses due to differences in refractive indices between the regions. "Optical coupling" methods include methods of coupling wherein the two regions coupled together have similar refractive indices or using an optical adhesive with a refractive index substantially near or between the refractive index of the regions or layers. Examples of "optical coupling" include, without limitation, lamination using an index-matched optical adhesive, coating a region or layer onto another region or layer, or hot lamination using applied pressure to join two or more layers or regions that have substantially close refractive indices. Thermal transferring is another method that can be used to optically couple two regions of material. Forming, altering, printing, or applying a material on the surface of another material are other examples of optically coupling two materials. "Optically coupled" also includes forming, adding, or removing regions, features, or materials of a first refractive index within a volume of a material of a second refractive index such that light propagates from the first material to the second material. For example, a white light scattering ink (such as titanium dioxide in a methacrylate, vinyl, or polyurethane based binder) may be optically coupled to a surface of a polycarbonate or silicone film by inkjet printing the ink onto the surface. Similarly, a light scattering material such as titanium dioxide in a solvent applied to a surface may allow the light scattering material to penetrate or adhere in close physical contact with the surface of a polycarbonate or silicone film such that it is optically coupled to the film surface or volume.

"Lightguide" or "waveguide" refers to a region bounded by the condition that light rays propagating at an angle that is larger than the critical angle will reflect and remain within the region. In a lightguide, the light will reflect or TIR (totally internally reflect) if the angle ($\alpha$) satisfies the condition $\alpha > \sin^{-1}(n_2/n_1)$, where $n_1$ is the refractive index of the medium inside the lightguide and $n_2$ is the refractive index of the medium outside the lightguide. Typically, $n_2$ is air with a refractive index of $n \neq 1$; however, high and low refractive index materials can be used to achieve lightguide regions. A lightguide does not need to be optically coupled to all of its components to be considered as a lightguide. Light may enter from any surface (or interfacial refractive index boundary) of the waveguide region and may totally internally reflect from the same or another refractive index interfacial boundary. A region can be functional as a waveguide or lightguide for purposes illustrated herein as long as the thickness is larger than the wavelength of light of interest. For example, a lightguide may be a 5-micrometer region or layer of a film or it may be a 3 millimeter sheet including a light transmitting polymer.

"In contact" and "disposed on" are used generally to describe that two items are adjacent one another such that the whole item can function as desired. This may mean that additional materials can be present between the adjacent items, as long as the item can function as desired.

A "film" as used herein refers to a thin extended region, membrane, or layer of material.

A "bend" as used herein refers to a deformation or transformation in shape by the movement of a first region of an element relative to a second region, for example. Examples of bends include the bending of a clothes rod when heavy clothes are hung on the rod or rolling up a paper document to fit it into a cylindrical mailing tube. A "fold" as used herein is a type of bend and refers to the bend or lay of one region of an element onto a second region such that the first region covers at least a portion of the second region. An example of a fold includes bending a letter and forming creases to place it in an envelope. A fold does not require that all regions of the element overlap. A bend or fold may be a change in the direction along a first direction along a surface of the object. A fold or bend may or may not have creases and the bend or fold may occur in one or more directions or planes such as 90 degrees or 45 degrees. A bend or fold may be lateral, vertical, torsional, or a combination thereof. The "primary axis of illumination" for a light emitting region of a film-based lightguide is the angle of peak luminous intensity of the light from all of the coupling lightguides on a side of the light emitting region in a plane perpendicular to the thickness direction. The "in-plane directional component of the illumination axis of a reflective display" as used herein is the component of the designed illumination angle for ambient light illumination of the display in a plane perpendicular to the thickness direction of the display. This is typically in a downward direction within the display when viewing the display in normal viewing mode. In some embodiments, the in-plane directional component of the illumination axis of a reflective display optically coupled to the film-based lightguide is at the same angle as the primary axis of illumination, or the downward vertical direction of a planar display comprising horizontal and vertical directions orthogonal to the thickness direction of the display.

Light Emitting Device

In one embodiment, a light emitting device includes a first light source, a light input coupler, a light mixing region, and a lightguide including a light emitting region with a light extraction feature. In one embodiment, the first light source has a first light source emitting surface, the light input coupler includes an input surface disposed to receive light from the first light source and transmit the light through the light input coupler by total internal reflection through a plurality of coupling lightguides. In this embodiment, light exiting the coupling lightguides is re-combined and mixed in a light mixing region and directed through total internal reflection within a lightguide or lightguide region. Within the lightguide, a portion of incident light is directed within the light extracting region by light extracting features into a condition whereupon the angle of light is less than the critical angle for the lightguide and the directed light exits the lightguide through the lightguide light emitting surface.

In a further embodiment, the lightguide is a film with light extracting features below a light emitting device output surface within the film. The film is separated into coupling lightguide strips which are folded such that the coupling lightguide strips form a light input coupler with a first input surface formed by the collection of edges of the coupling lightguide strips.

In one embodiment, the light emitting device has an optical axis defined herein as the direction of peak luminous intensity for light emitting from the light emitting surface or region of the device for devices with output profiles with one peak. For optical output profiles with more than one peak and the output is symmetrical about an axis, such as with a "batwing" type profile, the optical axis of the light emitting device is the axis of symmetry of the light output. In light emitting devices with angular luminous intensity optical output profiles with more than one peak which are asymmetrical about an axis, the light emitting device optical axis is the angular weighted average of the luminous intensity output. For non-planar output surfaces, the light emitting device optical axis is evaluated in two orthogonal output planes and may be a constant direction in a first output plane and at a varying angle in a second output plane orthogonal to the first output plane. For example, light emitting from a cylindrical light emitting surface may have a peak angular luminous intensity (thus light emitting device optical axis) in a light output plane that does not include the curved output surface profile and the angle of luminous intensity could be substantially constant about a rotational axis around the cylindrical surface in an output plane including the curved surface profile. Thus, in this example, the peak angular intensity is a range of angles. When the light emitting device has a light emitting device optical axis in a range of angles, the optical axis of the light emitting device includes the range of angles or an angle chosen within the range. The optical axis of a lens or element is the direction of which there is some degree of rotational symmetry in at least one plane and as used herein corresponds to the mechanical axis. The optical axis of the region, surface, area, or collection of lenses or elements may differ from the optical axis of the lens or element, and as used herein is dependent on the incident light angular and spatial profile, such as in the case of off-axis illumination of a lens or element.

Light Input Coupler

In one embodiment, a light input coupler includes a plurality of coupling lightguides disposed to receive light emitting from a light source and channel the light into a lightguide. In one embodiment, the plurality of coupling lightguides are strips cut from a lightguide film such that each coupling lightguide strip remains un-cut on at least one edge but can be rotated or positioned (or translated) substantially independently from the lightguide to couple light through at least one edge or surface of the strip. In another embodiment, the plurality of coupling lightguides are not cut from the lightguide film and are separately optically coupled to the light source and the lightguide. In another embodiment, the light emitting device includes a light input coupler having a core region of a core material and a cladding region or cladding layer of a cladding material on at least one surface or edge of the core material with a refractive index less than a refractive index of the core material. In other embodiment, the light input coupler includes a plurality of coupling lightguides wherein a portion of light from a light source incident on a surface of at least one strip is directed into the lightguide such that light travels in a waveguide condition. The light input coupler may also include one or more of the following: a strip folding device, a strip holding element, and an input surface optical element.

Light Source

In one embodiment, a light emitting device includes at least one light source selected from a group: fluorescent lamp, cylindrical cold-cathode fluorescent lamp, flat fluorescent lamp, light emitting diode, organic light emitting diode, field emissive lamp, gas discharge lamp, neon lamp, filament lamp, incandescent lamp, electroluminescent lamp, radiofluorescent lamp, halogen lamp, incandescent lamp, mercury vapor lamp, sodium vapor lamp, high pressure sodium lamp, metal halide lamp, tungsten lamp, carbon arc lamp, electroluminescent lamp, laser, photonic bandgap based light source, quantum dot based light source, high efficiency plasma light source, microplasma lamp. The light emitting device may include a plurality of light sources arranged in an array, on opposite sides of lightguide, on orthogonal sides of a lightguide, on 3 or more sides of a lightguide, or on 4 sides of a substantially planer lightguide. The array of light sources may be a linear array with discrete LED packages includes at least one LED die. In another embodiment, a light emitting device includes a plurality of light sources within one package disposed to emit light toward a light input surface. In one embodiment, the light emitting device includes 1, 2, 3, 4, 5, 6, 8, 9, 10, or more than 10 light sources. In another embodiment, the light emitting device includes an organic light emitting diode disposed to emit light as a light emitting film or sheet. In another embodiment, the light emitting device includes an organic light emitting diode disposed to emit light into a lightguide.

In one embodiment, a light emitting device includes at least one broadband light source that emits light in a wavelength spectrum larger than 100 nanometers. In another embodiment, a light emitting device includes at least one narrowband light source that emits light in a narrow bandwidth less than 100 nanometers. In another embodiment, a light emitting device includes at least one broadband light source that emits light in a wavelength spectrum larger than 100 nanometers or at least one narrowband light source that emits light in a narrow bandwidth less than 100 nanometers. In one embodiment a light emitting device includes at least one narrowband light source with a peak wavelength within a range selected from the group: 300 nm-350 nm, 350 nm-400 nm, 400 nm-450 nm, 450 nm-500 nm, 500 nm-550 nm, 550 nm-600 nm, 600 nm-650 nm, 650 nm-700 nm, 700 nm-750 nm, 750 nm-800 nm, and 800 nm-1200 nm. The light sources may be chosen to match the spectral qualities of red, green and blue such that collectively when used in a light emitting device used as a display, the color gamut area is at least one selected from the group: 70% NTSC, 80% NTSC, 90% NTSC, 100% NTSC, and 60%, 70%, 80%, 90%, and 95% of the visible CIE u' v' color gamut of a standard viewer. In one embodiment, at least one light source is a white LED package including a red, green, and blue LED.

In another embodiment, at least two light sources with different colors are disposed to couple light into the lightguide through at least one light input coupler. In another embodiment, a light emitting device includes at least three light input couplers, at least three light sources with different colors (red, green and blue for example) and at least three lightguides. In another embodiment, a light source further includes at least one selected from the group: reflective optic, reflector, reflector cup, collimator, primary optic, secondary optic, collimating lens, compound parabolic collimator, lens, reflective region and input coupling optic. The light source may also include an optical path folding optic such as a curved reflector that can enable the light source (and possibly heat-sink) to be oriented along a different edge of the light emitting device. The light source may also include a photonic bandgap structure, nanostructure or other three-dimensional arrangement that provides light output with an angular FWHM less than one selected from the group: 120 degrees, 100 degrees, 80 degrees, 60 degrees, 40 degrees, and 20 degrees.

In another embodiment, a light emitting device includes a light source emitting light in an angular full-width at half maximum intensity of less than one selected from 150 degrees, 120 degrees, 100 degrees, 80 degrees, 70 degrees, 60 degrees, 50 degrees, 40 degrees, 30 degrees, 20 degrees, and 10 degrees. In another embodiment, the light source further includes at least one selected from the group: a primary optic, secondary optic, and photonic bandgap region and the angular full-width at half maximum intensity of the light source is less than one selected from 150 degrees, 120 degrees, 100 degrees, 80 degrees, 70 degrees, 60 degrees, 50 degrees, 40 degrees, 30 degrees, 20 degrees, and 10 degrees.

Led Array

In one embodiment, the light emitting device includes a plurality of LEDs or LED packages wherein the plurality of LEDs or LED packages includes an array of LEDs. The array components (LEDs or electrical components) may be physically (and/or electrically) coupled to a single circuit board or they may be coupled to a plurality of circuit boards that may or may not be directly physically coupled (i.e. such as not on the same circuit board). In one embodiment, the array of LEDs is an array including at least two selected from the group: red, green, blue, and white LEDs. In this embodiment, the variation in the white point due to manufacturing or component variations can be reduced. In another embodiment, the LED array includes at least one cool white LED and one red LED. In this embodiment, the CRI, or Color Rendering Index, is higher than the cool white LED illumination alone. In one embodiment, the CRI of at least one selected from the group: a light emitting region, the light emitting surface, light fixture, light emitting device, display driven in a white mode including the light emitting device, and sign is greater than one selected from the group: 70, 75, 80, 85, 90, 95, and 99. In another embodiment, the NIST Color Quality Scale (CQS) of at least one selected from the group: a light emitting region, the light emitting surface, light fixture, light emitting device, display driven in a white mode including the light emitting device, or sign is greater than one selected from the group: 70, 75, 80, 85, 90, 95, and 99. In one embodiment, the light emitting device includes one or more lasers disposed to couple light into one or more light input couplers or the surface of one or more coupling lightguides. In another embodiment, the LED is a blue or ultraviolet LED combined with a phosphor. In another embodiment, a light emitting device includes a light source with a first activating energy and a wavelength conversion material which converts a first portion of the first activating energy into a second wavelength different than the first. In another embodiment, the light emitting device includes at least one wavelength conversion material selected from the group: a fluorophore, phosphor, a fluorescent dye, an inorganic phosphor, photonic bandgap material, a quantum dot material, a fluorescent protein, a fusion protein, a fluorophores attached to protein to specific functional groups (such as amino groups (active ester, carboxylate, isothiocyanate, hydrazine), carboxyl groups (carbodiimide), thiol (maleimide, acetyl bromide), azide (via click chemistry or non-specifically (glutaraldehyde))), quantum dot fluorophores, small molecule fluorophores, aromatic fluorophores, conjugated fluorophores, a fluorescent dye, and other wavelength conversion material.

Light Input Coupler Input Surface

In one embodiment, the light input coupler includes a collection of coupling lightguides with a plurality of edges forming a light coupler input surface. In another embodiment, an optical element is disposed between the light source and at least one coupling lightguide wherein the optical element receives light from the light source through a light coupler input surface. In some embodiments, the input surface is substantially polished, flat, or optically smooth such that light does not scatter forwards or backwards from pits, protrusions or other rough surface features. In some embodiments, an optical element is disposed to between the light source and at least one coupling lightguide to provide light redirection as an input surface (when optically coupled to at least one coupling lightguide) or as an optical element separate or optically coupled to at least one coupling lightguide such that more light is redirected into the lightguide at angles greater than the critical angle within the lightguide than would be the case without the optical element or with a flat input surface. The coupling lightguides may be grouped together such that the edges opposite the lightguide region are brought together to form an input surface including their thin edges.

Stacked Strips or Segments of Film Forming a Light Input Coupler

In one embodiment, the light input coupler is region of a film that includes the lightguide and the light input coupler which includes strip sections of the film which form coupling lightguides that are grouped together to form a light coupler input surface. The coupling lightguides may be grouped together such the edges opposite the lightguide region are brought together to form an input surface including their thin edges. A planar input surface for a light input coupler can provide beneficial refraction to redirect a portion of the input light from the surface into angles such that it propagates at angles greater than the critical angle for the lightguide. In another embodiment, a substantially planar light transmitting element is optically coupled to the grouped edges of coupling lightguides. One or more of the edges of the coupling lightguides may be polished, melted, smoothed using a caustic or solvent material, adhered with an optical adhesive, solvent welded, or otherwise optically coupled along a region of the edge surface such that the surface is substantially polished, smooth, flat, or substantially planarized.

In one embodiment, the lateral edges of at least one selected from the group: light turning lateral edges of the coupling lightguides, light collimating lateral edges of the coupling lightguides, lateral edges of the coupling lightguides, lateral edges of the lightguide region, lateral edges of the light mixing region, and lateral edges of the light emitting region includes an optical smoothing material disposed at a region of the edge that reduces the surface roughness of the region of the edge in at least one of the lateral direction and thickness direction. In one embodiment, the optical smoothing material fills in gaps, grooves, scratches, pits, digs, flattens regions around protrusions or other optical blemishes such that more light totally internally reflects from the surface from within the core region of the coupling lightguide.

The light input surface may include a surface of the optical element, the surface of an adhesive, the surface of more than one optical element, the surface of the edge of one or more coupling lightguides, or a combination of one or more of the aforementioned surfaces. The light input coupler may also include an optical element that has an opening or window wherein a portion of light from a light source may directly pass into the coupling lightguides without passing through the optical element. The light input coupler or an element or region therein may also include a cladding material or region.

Light Redirecting Optical Element

In one embodiment, a light redirecting optical element is disposed to receive light from at least one light source and redirect the light into a plurality of coupling lightguides. In another embodiment, the light redirecting optical element is at least one selected from the group: secondary optic, mirrored element or surface, reflective film such as aluminized PET, giant birefringent optical films such as Vikuiti™ Enhanced Specular Reflector Film by 3M Inc., curved mirror, totally internally reflecting element, beamsplitter, and dichroic reflecting mirror or film.

Light Collimating Optical Element

In one embodiment, the light input coupler includes a light collimating optical element. A light collimating optical element receives light from the light source with a first angular full-width at half maximum intensity within at least one input plane and redirects a portion of the incident light from the light source such that the angular full-width at half maximum intensity of the light is reduced in the first input plane. In one embodiment, the light collimating optical element is one or more of the following: a light source primary optic, a light source secondary optic, a light input surface, and an optical element disposed between the light source and at least one coupling lightguide. In another embodiment, the light collimating element is one or more of the following: an injection molded optical lens, a thermoformed optical lens, and a cross-linked lens made from a mold. In another embodiment, the light collimating element reduces the angular full-width at half maximum (FWHM) intensity within the input plane and a plane orthogonal to the input plane.

In one embodiment, a light emitting device includes a light input coupler and a film-based lightguide. In one embodiment the light input coupler includes a light source and a light collimating optical element disposed to receive light from one or more light sources and provide light output in a first output plane, second output plane orthogonal to the first plane, or in both output planes with an angular full-width at half maximum intensity in air less than one selected from the group: 60 degrees, 40 degrees, 30 degrees, 20 degrees, and 10 degrees from the optical axis of the light exiting the light collimating optical element.

In one embodiment, the collimation or reduction in angular FWHM intensity of the light from the light collimating element is substantially symmetric about the optical axis. In one embodiment, the light collimating optical element receives light from a light source with a substantially symmetric angular FWHM intensity about the optical axis greater than one selected from the group: 50, 60, 70, 80, 90, 100, 110, 120, and 130 degrees and provides output light with an angular FWHM intensity less than one selected from the group: 60, 50, 40, 30, and 20 degrees from the optical axis. For example, in one embodiment, the light collimating optical element receives light from a white LED with an angular FWHM intensity of about 120 degrees symmetric about its optical axis and provides output light with an angular FWHM intensity of about 30 degrees from the optical axis.

The angular full-width at half maximum intensity of the light propagating within the lightguide can be determined by measuring the far field angular intensity output of the lightguide from an optical quality end cut normal to the film surface and calculating and adjusting for refraction at the air-lightguide interface. In another embodiment, the average angular full-width at half maximum intensity of the extracted light from one or more light extraction features or light extraction regions including light extraction features of the film-based lightguide is less than one selected from the group: 50 degrees, 40 degrees, 30 degrees, 20 degrees, 10 degrees, and 5 degrees. In another embodiment, the peak angular intensity of the light extracted from the light extraction feature is within 50 degrees of the surface normal of the lightguide within the region. In another embodiment, the far-field total angular full-width at half maximum intensity of the extracted light from the light emitting region of the film-based lightguide is less than one selected from the group: 50 degrees, 40 degrees, 30 degrees, 20 degrees, 10 degrees, and 5 degrees and the peak angular intensity is within 50 degrees of the surface normal of the lightguide in the light emitting region.

Coupling Lightguides

In one embodiment, the coupling lightguide is a region wherein light within the region can travel in a waveguide condition and a portion of the light input into a surface or region of the coupling lightguides passes through the coupling lightguide toward a lightguide or light mixing region. The coupling lightguide, in some embodiments, may serve to geometrically transform a portion of the flux from a light source from a first shaped area to a second shaped area different from the first shaped area. In an example of this embodiment, the light input surface of the light input coupler formed from the edges of folded strips (coupling lightguides) of a planar film has dimensions of a rectangle that is 3 millimeters by 2.7 millimeters and the light input coupler couples light into a planar section of a film in the light mixing region with cross-sectional dimensions of 40.5 millimeters by 0.2 millimeters. In one embodiment, the extended direction of one or more coupling lightguides is the direction in which the one or more coupling lightguides extend from a common base area.

Coupling Lightguide Folds and Bends

In one embodiment, a light emitting device includes a light mixing region disposed between a lightguide and strips or segments cut to form coupling lightguides, whereby a collection of edges of the strips or segments are brought together to form a light input surface of the light input coupler disposed to receive light from a light source. In one embodiment, the light input coupler includes a coupling lightguide wherein the coupling lightguide includes at least one fold or bend in a plane such that at least one edge overlaps another edge. In another embodiment, the coupling lightguide includes a plurality of folds or bends wherein edges of the coupling lightguide can be abutted together in region such that the region forms a light input surface of the light input coupler of the light emitting device. In one embodiment, at least one coupling lightguide includes a strip or a segment that is bent or folded to radius of curvature of less than 75 times a thickness of the strip or the segment. In another embodiment, at least one coupling lightguide includes a strip or a segment that is bended or folded to radius of curvature greater than 10 times a thickness of the strip or the segment. In another embodiment, at least one coupling lightguide is bent or folded such that a longest dimension in a cross-section through the light emitting device or coupling lightguide in at least one plane is less than without the fold or bend. Segments or strips may be bent or folded in more than one direction or region and the directions of folding or bending may be different between strips or segments.

Coupling Lightguide Lateral Edges

In one embodiment, the lateral edges, defined herein as the edges of the coupling lightguide which do not substantially receive light directly from the light source and are not part of the edges of the lightguide region. The lateral edges of the coupling lightguide receive light substantially only from light propagating within the coupling lightguide. In one embodiment, the lateral edges are at least one selected from the group: uncoated, coated with a reflecting material, disposed adjacent to a reflecting material, and cut with a specific cross-sectional profile. The lateral edges may be coated, bonded to or disposed adjacent to a specularly reflecting material, partially diffusely reflecting material, or diffuse reflecting material. In one embodiment, the edges are coated with a specularly reflecting ink including nano-sized or micron-sized particles or flakes which substantially reflect the light in a specular manner when the coupling lightguides are brought together from folding or bending. In another embodiment, a light reflecting element (such as a multi-layer mirror polymer film with high reflectivity) is disposed near the lateral edge of at least one region of a coupling lightguide disposed, the multi-layer mirror polymer film with high reflectivity is disposed to receive light from the edge and reflect it and direct it back into the lightguide. In another embodiment, the lateral edges are rounded, and the percentage of incident light diffracted out of the lightguide from the edge is reduced. One method of achieving rounded edges is by using a laser to cut the strips, segments or coupling lightguide region from a film and edge rounding through control of the processing parameters (speed of cut, frequency of cut, laser power, etc.). Other methods for creating rounded edges include mechanical sanding/polishing or from chemical/vapor polishing. In another embodiment, the lateral edges of a region of a coupling lightguide are tapered, angled, serrated, or otherwise cut or formed such that light from a light source propagating within the coupling lightguide reflects from the edge such that it is directed into an angle closer to the optical axis of the light source, toward a folded or bent region, or toward a lightguide or lightguide region.

Shaped or Tapered Coupling Lightguides

The width of the coupling lightguides may vary in a predetermined pattern. In one embodiment, the width of the coupling lightguides varies from a large width in a central coupling lightguide to smaller width in lightguides further from the central coupling lightguide as viewed when the light input edges of the coupling lightguides are disposed together to form a light input surface on the light input coupler. In this embodiment, a light source with a substantially circular light output aperture can couple into the coupling lightguides such that the light at higher angles from the optical axis are coupled into a smaller width strip such that the uniformity of the light emitting surface along the edge of the lightguide or lightguide region and parallel to the input edge of the lightguide region disposed to receive the light from the coupling lightguides is greater than one selected from the group: 60%, 70%, 80%, 90% and 95%.

Other shapes of stacked coupling lightguides can be envisioned, such as triangular, square, rectangular, oval, etc. that provide matched input areas to the light emitting surface of the light source. The widths of the coupling lightguides may also be tapered such that they redirect a portion of light received from the light source. The lightguides may be tapered near the light source, in the area along the coupling lightguide between the light source and the lightguide region, near the lightguide region, or some combination thereof.

The shape of a coupling lightguide is referenced herein from the lightguide region or light emitting region or body of the lightguide. One or more coupling lightguides extending from a side or region of the lightguide region may expand (widen or increase in width) or taper (narrow or decrease in width) in the direction toward the light source. In one embodiment, coupling lightguides taper in one or more regions to provide redirection or partial collimation of the light traveling within the coupling lightguides from the light source toward the lightguide region. In one embodiment, one or more coupling lightguides widens along one lateral edge and tapers along the opposite lateral edge. In this embodiment, the net effect may be that the width remains constant. The widening or tapering may have different profiles or shapes along each lateral side for one or more coupling lightguides. The widening, tapering, and the profile for each lateral edge of each coupling lightguide may be different and may be different in different regions of the coupling lightguide. For example, one coupling lightguide in an array of coupling lightguides may have a parabolic tapering profile on both sides of the coupling lightguides in the region near the light source to provide partial collimation, and at the region starting at about 50% of the length of the coupling lightguides one lateral edge tapers in a linear angle and the opposite side includes a parabolic shaped edge. The tapering, widening, shape of the profile, location of the profile, and number of profiles along each lateral edge may be used to provide control over one or more selected from the group: spatial or angular color uniformity of the light exiting the coupling lightguides into the light mixing region (or light emitting region), spatial or angular luminance uniformity of the light exiting the coupling lightguides into the light mixing region (or light emitting region), angular redirection of light into the light mixing region (or light emitting region) of the lightguide (which can affect the angular light output profile of the light exiting the light emitting region along with the shape, size, and type of light extraction features), relative flux distribution within the light emitting region, and other light redirecting benefits such as, without limitation, redirecting more light toward a second, extending light emitting region.

In one embodiment, a film-based lightguide comprises tapered coupling lightguides that may comprise one or more curved and/or angled lateral edges or sections of the coupling lightguides. These coupling lightguides may be directed such that their end regions are substantially co-linear when the folds of the coupling lightguides are at an angle with respect to each other, or at different angles from a primary axis of illumination, or an in-plane directional component of the illumination axis of a reflective display. The coupling lightguides may have different curves, optionally with different radii of curvature such that their ends may be collinear when folded at different angles (such as folded around angled linear edges of a guide element rounded in the thickness direction for a display with a circular light emitting region). For a frontlight illuminating a circular or curved display with a small bezel or edge footprint, the light mixing region does not uniformly fold behind the light emitting region and/or display since the fold would need to be curved. Therefore, one can segment the fold by folding the coupling lightguide sections to create individual segmented linear fold sections along fold lines oriented at fold angles along a side of a display or guide element when the display has a curved (or angled segment) edge or light emitting area. The width of the tapered coupling lightguides further from the center of the light emitting region in the width direction where they meet the body of the film-based lightguide may be wider than the tapered coupling lightguides closer to the center of the light emitting region in the width direction. This provides one mechanism for distributing the flux in the light emitting region, and may help compensate, for example, for the light reflecting back toward the light emitting region from the lateral edges of the body, lightguide region, light mixing region, or light emitting region of the film-based lightguide. Also, for increased uniformity for embodiments with a short light mixing region, (such as light mixing region less than one selected from the group of 50%, 30%, 20%, 10%, 8%, 5%, 4%, 3%, and 2% of the length of the light emitting region in the length direction (the direction orthogonal to the width direction and thickness direction), it is preferable in some embodiments to have the central coupling lightguide (in the width direction) align with the center of the light source emitting area in the thickness direction when folded and stacked such that it receives the most light flux from the light source of the coupling lightguides such that it can emit the light output from the coupling lightguide in the light mixing region laterally in the width direction to a large angle (large angular full-width at half-maximum luminous intensity) to contribute to the luminance of the light emitting region on either side of the center. In this embodiment, the coupling lightguides near the lateral edge of the light emitting region in the width direction do not need to spread light out laterally (or at least do not need to spread the light laterally in a direction toward the lateral edge to which it is closer). Thus, in this embodiment, one may control the light to a higher degree of collimation (reduced angular width) to prevent more light escaping a lateral edge of the lightguide region by increasing the width of the coupling lightguide the closer it is to the lateral edge of the light emitting region to enable a higher control (reduced angular width) due to the increased width in the width direction enabling wider curved (or faceted) lateral edges. In one embodiment, the angular full-width at half maximum luminous intensity of the light from a first coupling lightguide upon entering the light mixing region or light emitting region of the film-based lightguide is at least one selected from the group of 5, 10, 15, 20, and 30 degrees less than the angular full-width at half maximum luminous intensity of the light from a second coupling lightguide upon entering the light mixing region. In this embodiment, the first coupling lightguide may be the furthermost coupling lightguide in the width direction from the center of the light emitting region and the second coupling lightguide may be the coupling lightguide closest to the center of the light emitting region in the width direction.

The curved sections of one or more coupling lightguides may have a radius of curvature $r_1$ along a section of a first lateral edge of the coupling lightguide, a radius of curvature $r_2$ along a section of a second lateral edge of the coupling lightguide, and the width, w, of the coupling lightguide at the end of the coupling lightguide in a direction orthogonal to the optical axis of the light source and orthogonal to the thickness direction of the coupling lightguide is such that the radius-to-width ratio $r_1/w$, $r_2/w$ or the average radius-to-width ratio, $(r_1+r_2)/2w$, for one or both lateral edges of one or more coupling lightguides (which may be tapered coupling lightguides) may be greater than one selected from the group of 2, 3, 4, 6, 8, 10, and 15. In one embodiment, the tapered coupling lightguides provide for a single or narrow width light source, such as a light source having a width in the width direction orthogonal to the optical axis of the light source and orthogonal to the thickness direction of the body, light emitting region, or lightguide region of the film based lightguide to illuminate a light emitting region with a larger width in the width direction (such as the ratio of the light emitting region width to the light source emitting area width in the width direction greater than one selected from the group of 2, 4, 6, 8, 10, and 20) without using many coupling lightguides such that the total thickness of the stack of tapered coupling lightguides can be reduced (thus reducing the total thickness of the frontlight and/or the display comprising the frontlight with the film-based lightguide while the lateral edges of the tapered coupling lightguides have sufficient separation (thus sufficient width of the corresponding tapered coupling lightguide) to provide a reduction in angular width of the light by total internal reflection from the lateral edges of the light entering the light emitting region and/or sufficient width to redirect the optical axes of light from the tapered coupling lightguides to directions closer to the primary axis of illumination or an in-plane directional component of the illumination axis of a reflective display. In one embodiment, the lateral edges of one or more coupling lightguides (such as tapered coupling lightguides) are asymmetric in the width direction (such as having curved portions with different radii of curvature on each side of the coupling lightguide, for example). In one embodiment, the curved portions of the lateral edges on opposing sides of one or more coupling lightguides (such as tapered coupling lightguides) have radii of curvature directed to centers on the same side of the coupling lightguide or the curved sections on the lateral edges open in the same direction (such as −x direction, for example), and redirect each of the optical axes of the illuminating light from the light source within the tapered coupling lightguides as the light enters the light mixing region or light emitting region to angles within one or more selected from the group of 5, 10, 15, and 20 degrees of the primary axis of illumination. In this embodiment, the lateral edges of one or more coupling lightguides (such as one or more coupling lightguides positioned centrally in the width direction) are substantially symmetric about the orientation axis of the coupling lightguide and do not redirect the optical axis of the light propagating within the coupling lightguide more toward the primary axis of illumination since the optical axis of the light source (once the coupling lightguide is folded) and the coupling lightguide orientation axis may be oriented within 10 degrees of each other (such as parallel to each other and oriented at 0 degrees, for example) or within 10 degrees from the primary axis of illumination. In one embodiment, the primary axis of illumination is the same angle as the in-plane directional component of the illumination axis of a reflective display.

In one embodiment, a film-based lightguide comprises one or more coupling lightguides (such as tapered coupling lightguides) comprising centrally directing lateral edge sections that direct a portion of the light from the light source (when the coupling lightguides are folded, stacked, cut, and positioned to receive light from the light source) toward the center of the light mixing region and/or light emitting region in the width direction (+x or −x direction). In one embodiment, the centrally directing lateral edge sections and are oriented substantially parallel to each other and orthogonal to the fold line such that the coupling lightguide can be folded across a linear edge of a guide element, a linear edge of a housing, a linear edge of a reflective display, or other guide or housing without adjacent tapered coupling lightguides overlapping at their fold regions about the fold lines which reduces the probability of a tear of a coupling lightguide or adjacent tapered coupling lightguides interfering with each other in the folding steps. In one embodiment, the coupling lightguides have different fold angles and do not overlap with each other in the fold region comprising the curved section of the fold. In another embodiment, the coupling lightguides have different fold angles and two or more coupling lightguides partially overlap in the fold region comprising the curved section of the fold. In one embodiment, the lateral edges of one or more coupling lightguides in a central region of the light emitting region in the width direction comprise linear lateral edge sections proximate their fold line substantially parallel to each other and perpendicular to the fold line to provide a similar reduced probability of a tear or interference during folding. In one embodiment, light from the light source propagates through a tapered coupling lightguide, totally internally reflects at a lateral edge of the tapered coupling lightguide and is directed toward the optical axis of the tapered coupling lightguide and to an angle within one selected from the group of 30, 20, 15, 10, 8, 6, and 5 degrees of the primary axis of illumination or the in-plane directional component of the illumination axis of a reflective display optically coupled to the film-based lightguide. In some embodiments, a portion of the light from the light source is directed toward the center (in the width direction of the light mixing region or light emitting region) by centrally directing lateral edge sections that redirect light by totally internally reflecting light from the lateral edges oriented at an angle to the adjacent and/or other segments of the tapered coupling lightguides or by orienting the lateral edges at an angle to permit more light to propagate in the direction toward the central region of the light emitting region in the width direction (+x or −x direction) without being totally internally reflected. In some embodiments, the centrally directing lateral edges totally internally reflect a portion of the light incident near the lateral edges of the body or lightguide region of the film-based lightguide to reduce the luminance of the light emitting region near the lateral edges of the body that could otherwise be non-uniformly higher due to light reflecting from the edges back toward the center (in the width direction) of the light emitting region, or could otherwise exit the lateral edge of the light mixing region or light emitting region, for example.

In some embodiments, if the lateral edges of the coupling lightguides are straight and angled at lateral edge angles symmetrically across the width of the coupling lightguide, then the optical axis of the light in the coupling lightguide will generally be at the same angle as the coupling lightguide orientation angle. In the case where the fold regions are all parallel to each other, then the resulting optical axes of the coupling lightguides can be at a single angle and that can be made to be at a desired angle from the primary axis of illumination or at the same angle as the primary axis of illumination or an in-plane directional component of the illumination axis of a reflective display. However, when illuminating round, curved, or faceted light emitting regions in a compact space, the fold regions and folds are preferably oriented at different fold angles (such as the coupling lightguides folded in segments around the top half of a lightguide region or body with a circular light emitting region). In one embodiment, the function of one or more of the curved or linear sections of one or more lateral edges of one or more coupling lightguides is accomplished with one or more interior light directing edges within the one or more coupling lightguides and/or within the light mixing region wherein the interior light directing edge may or may not completely extend through the thickness of the film or coupling lightguide. In one embodiment, one or more coupling lightguides (or tapered coupling lightguides) comprises one or more interior light directing edges (that may or may not completely extend through the thickness of the coupling lightguide) that direct a portion of the light propagating through the coupling lightguide to a direction closer to the primary axis of illumination, or closer to the in-plane directional component of the illumination axis of a reflective display optically coupled to the film-based lightguide. In one embodiment, one or more coupling lightguides (or tapered coupling lightguides) comprises one or more interior light directing edges (that may or may not completely extend through the thickness of the coupling lightguide) that direct a portion of the light propagating through the coupling lightguide such that the angular full-width at half-maximum luminous intensity is reduced in the plane perpendicular to thickness direction or such that the angular full-width at half-maximum luminous intensity is less than one selected from the group of 100, 80, 60, 40, and 30 degrees in the plane perpendicular to the thickness direction.

In one embodiment, the film-based lightguide comprises a plurality of coupling lightguides wherein the lateral edges of the coupling lightguides join the body or lightguide region of the film-based lightguide at an angle less than one selected from the group of 30, 20, 15, 10, 8, and 5 degrees from the primary axis of illumination, or the in-plane directional component of the illumination axis of a reflective display optically coupled to the film-based lightguide. In one embodiment, the curved sections of the coupling lightguides disclosed herein may be replaced with linear segments oriented at angles to each other to discretize the curve into linear sections. In one embodiment, one or more lateral edges of one or more coupling lightguides comprise linear sections angled relative to each other along the lateral edge that may be in the form of a curve that has been segmented or discretized into linear sections. In one embodiment, one or more of the tapered coupling lightguides may comprise light reflecting regions positioned on or within one or more surfaces of the coupling lightguides (or the light mixing region or the light emitting region) such as stripes or lines of material printed on the surface that may help redistribute light, increase light mixing, or redirect a portion of incident light.

Orientation Axis and Alignment Holes of the Coupling Lightguide

In one embodiment, a film-based lightguide comprise a plurality of coupling lightguides each with an orientation axis that may be different or the same as the other coupling lightguides. The orientation axis of a coupling lightguide is the direction in a plane perpendicular to the thickness direction of the coupling lightguide and parallel to the optical axis of the light propagating through the coupling lightguide at the input surface edge of the coupling lightguide when the coupling lightguide is disposed to receive light at the edge of the coupling lightguide. Prior to folding the coupling lightguides, the orientation axes of the coupling lightguide may be oriented at different angles and when the coupling lightguides are folded at different fold angles, the orientation axes may be overlapped and oriented in the same direction, such as for example if the coupling lightguides including one or more tapered coupling lightguides with appropriately curved sides. In some embodiments, the coupling lightguides comprise alignment holes that may overlap around a protrusion (such as a pin or other protrusion in a relative position maintaining element, housing circuit board, or flexible circuit board, for example) after folding such that when the coupling lightguides (which may be tapered coupling lightguides) are cut at cut locations, input edges to the coupling lightguides, are formed at the cut locations (forming the new ends of the coupling lightguides) such that the combined end edges of the folded stack of coupling lightguides form a light input surface that can be positioned to receive light from a light source. In another embodiment, the film-based lightguide does not comprise the alignment holes in the coupling lightguides and the coupling lightguides are folded, stacked, and/or aligned manually or by mechanical means such as a pick-and-place vacuum, robotic arm, clamp, folding mechanism, or similar mechanism. In one embodiment, a film-based lightguide comprising one or more coupling lightguides with one or more curved lateral edges comprises one or more linear sections, such as linear sections with parallel, linear, lateral edges adjacent the input edge of the coupling lightguides where the lateral edges of the coupling lightguide may be parallel to the orientation axis, perpendicular to the light input edge surface of the coupling lightguide, and/or parallel to the optical axis of the light in coupling lightguide adjacent the input surface of the coupling lightguide within the coupling lightguide.

Fold Angles of the Coupling Lightguides

In one embodiment, the film-based lightguide comprises a plurality of coupling lightguides folded along linear fold lines oriented at fold angles to each other or a primary axis of illumination or the in-plane directional component of the illumination axis of a reflective display optically coupled to the film-based lightguide. The difference between the fold angles between neighboring or two coupling lightguides along a side of a body or lightguide region of a film-based lightguide may be greater than one selected from the group of 5, 10, 15, 20, and 30 degrees. In one embodiment, the set of fold angles on opposite sides of a central coupling lightguide (that may have a fold angle of 90 degrees from the primary axis of illumination, for example) are symmetric but opposite in sign. For example, the fold angles from a primary axis of illumination for a film-based lightguide comprising five coupling lightguides extended from the lightguide region of the film may be (in order in the +x direction): 40 degrees, 60 degrees, 90 degrees, −60 degrees, and −40 degrees. In one embodiment, the order of folding and/or stacking of the coupling lightguides can help improve the spatial luminance uniformity of the light emitting region. For example, in one embodiment, the coupling lightguides are stacked sequentially in the same order as their position along the lightguide region or body of film from which they extend in the width direction. In this embodiment, the central coupling lightguide or central two coupling lightguides in the width direction will be positioned in the central area of the stack of coupling lightguides. In one embodiment, a film based lightguide comprises one or two centrally located coupling lightguides in the width direction and coupling lightguides on one or both sides of the centrally located one or two centrally located coupling lightguides in the width direction that are folded at one or more fold angles that direct the coupling lightguides on one or both sides of the centrally located one or two centrally located coupling lightguides toward the center of the light emitting mixing region or light emitting region in the width direction. In one embodiment, a reflective spatial light modulator comprises an active area in the shape of a polygon with three or more than four sides or edges (such as a pentagon or octagon) and the fold lines are substantially parallel to two or more sides of the active area or edge of the reflective spatial light modulator. In one embodiment the fold lines for the coupling lightguides are parallel to lines tangent to a curved edge or boundary of a circular, semi-circular, or arcuate reflective spatial light modulator or active area of a reflective spatial light modulator.

Guide Element for Coupling Lightguides

In one embodiment, a light emitting device comprises a guide element and a film-based lightguide, wherein the guide element may comprise angled edges that may be oriented at the same angles as the corresponding fold angles of the coupling lightguides and parallel to the fold lines. In one embodiment, each of the angled edges is curved in a plane comprising the thickness direction of the guide element and/or the thickness direction of the light emitting region of a film-based lightguide with tapered coupling lightguides folded behind the guide element along the angled edges. The guide element may comprise a thick region adjacent a thin region and/or two coupling lightguide guide protrusions positioned on either side in the width direction of the location for the stacked coupling lightguides (such as tapered coupling lightguides) to restrain the stacked coupling lightguides in the width direction such that they may be aligned in the width direction to the light emitting area of a light source that may be positioned on or against a light source surface with light source boundary walls or protrusions positioned to restrain the light source in the width direction (such as a +x and −x direction) and the direction opposite the optical axis of the light from the light source. The light source surface may be lower in the thickness direction toward the light emitting region of the film-based lightguide (such as in the −z direction) than a lower surface of the thick region of the guide element; and the light source may be restrained in the direction of the optical axis of the light from the light source (such as the +y direction) by a front edge or protrusion between the light source surface and the lower surface of the thick region of the guide element. Also, since light sources typically have housings (such as the housing for a light emitting diode) surrounding the light emitting surface in the plane orthogonal to the optical axis of the light source, by lowering the light source relative to the lower surface (such as by 0.5 millimeters, for example), the lower edge (in the direction toward the light emitting region of the lightguide) of the light emitting area of the light source can line up in the thickness direction with the lowest coupling lightguide when the coupling lightguides are stacked against the lower surface of the thick region. In one embodiment, the thick region of the guide element has a first thickness, $t_1$, and the thin region has a second thickness, $t_2$. The thickness, $t_2$, of the thick region facilitates the folding the coupling lightguides (such as the tapered coupling lightguides) around the guide element such that they are less likely to tear or leak significant amount of light flux out of the coupling lightguide due to bending at a tight radius. In one embodiment, the radius of curvature of one or more angled edges in a plane comprising the thickness direction of the guide element is greater than one selected from the group of 6, 8, 10, and 20 times the thickness of the coupling lightguide. In one embodiment, the radius of curvature of one or more angled edges in a plane comprising the thickness direction of the guide element is greater than one selected from the group of 0.5, 1, 2, 3, and 4 millimeters and less than one selected from the group of 10, 8, 6, and 4 millimeters. The angled edges are curved in a plane comprising the thickness direction and the curved surface of the angled edges have radii of curvature (which may all be the same or some may be different) that may be greater than or equal to half of the thickness, $t_1$, of the thick region of the guide element. The shape of the curve of the angled edges in a first plane comprising the thickness direction may also be an arc that subtends and angle of one selected from the group: 180 degrees, 90 degrees, less than 180 degrees and greater than 90 degrees, between 135 degrees and 45 degrees, greater than 45 degrees, between 60 and 120 degrees, between 70 and 110 degrees, and between 80 and 100 degrees in the first plane. The thickness, $t_2$, of the thin region may be less than the thickness, $t_1$, of the thick region, for example, to reduce the volume of the light emitting device or display. When the guide element is used to guide the folds of the coupling lightguides (such as the tapered coupling lightguides), the lower surface of a reflective spatial light modulator (such as a reflective LCD or electrophoretic display) may be positioned against the top surface of the guide element such that the film-based lightguide positioned above the reflective spatial modulator functions as a frontlight for the reflective spatial light modulator. Alternatively, in another embodiment, the reflective spatial light modulator is positioned within a cavity formed in the top surface of the guide element to position the display relative to the film-based lightguide. In one embodiment, the angled edges of the guide element have a slight curvature in the plane perpendicular to the thickness direction of the guide element. In one embodiment, the angled edges of the guide element are beyond the edges of the reflective spatial light modulator and the height of the angled edges could extend higher in the thickness direction above the top surface of the reflective spatial light modulator above at least a portion of the of guide element. In one embodiment, the guide element provides a platform to stack the coupling lightguides on, align the coupling lightguides, to hold the coupling lightguides (such as providing a surface to which a tape or adhesive may be applied across the strips and onto the lower surface of the guide element, for example, and help protect the coupling lightguides on at least one side. In another embodiment, the guide element has a visible light transmittance less than 10, 5, 3, 1, or 0.5 percent such that the guide element blocks stray light from the light source entering the rear of the reflective spatial light modulator or illuminating the housing or area around the sides of the display. In one embodiment, the guide element contains protrusions and/or recessions and snaps into (or is snapped into) protrusions and/or recessions of the reflective spatial light modulator (or frame or housing for the reflective spatial light modulator). In one embodiment, the guide element comprises protrusions and/or recessions and snaps into (or is snapped into) protrusions and/or recessions of the reflective spatial light modulator (or frame or housing for the reflective spatial light modulator). In another embodiment, the reflective spatial light modulator (or frame or housing for the reflective spatial light modulator) comprises protrusions and/or recessions and snaps into protrusions and/or recessions of the guide element. The coupling lightguides wrapped around the angled edges of the guide element may have cladding layers (such as a low refractive index pressure sensitive adhesive on one or both sides of a core layer) extended around the fold to the light input surface, for example. In one embodiment, a surface (such as a lower surface of the thick region, thin region, or light source surface) of the guide element provides a rigid surface for cutting the along the cut lines of the stacked coupling lightguides to form a light input surface. In another embodiment, the guide element is a thermally conducting element that conducts heat from the light source (such as a light emitting diode). In one embodiment the guide element has a thermal conductivity greater than one selected from the group: 0.2, 0.5, 0.7, 1, 3, 5, 50, 100, 120, 180, 237, 300, and 400 watts per meter-kelvin. In one embodiment, the guide element comprises one or more fastener to fasten the guide element to one or more components (or fastener to fasten the one or more components to the guide element) selected from the group of relative position maintaining element, light source, reflective spatial light modulator, housing or frame for the reflective spatial light modulator, film-based lightguide, one or more coupling lightguides, printed circuit board for the display or light source or other components, or flexible printed circuit for the display or light source or other components, or housing or frame for the light emitting device (such as the frontlight), protective cover to cover the stacked coupling lightguides, or other element of the film-based light guide, display, or other element disclosed herein. In this embodiment, the fastener may be one or more selected from the group: batten, button, clamp, clasp, clip, clutch (pin fastener), flange, grommet, anchor, nail, pin, peg, clevis pin, cotter pin, linchpin, R-clip, retaining ring, circlip retaining ring, e-ring retaining ring, rivet, screw anchor, snap, staple, stitch, strap, tack, threaded fastener, captive threaded fasteners (nut, screw, stud, threaded insert, threaded rod), tie, toggle, hook-and-loop strips, wedge anchor, and zipper.

Interior Light Directing Edge

In one embodiment, the interior region of one or more coupling lightguides, light mixing region, lightguide region, or light emitting region includes one or more interior light directing edges. The interior light directing edge may be formed by cutting or otherwise removing an interior region of the coupling lightguide, light mixing region, lightguide region, or light emitting region. In one embodiment, the interior light directed edge redirects a first portion of light within the coupling lightguide, light mixing region, lightguide region, or light emitting region. In one embodiment, the interior light directing edges provide an additional level of control for directing the light within the coupling lightguides, light mixing region, lightguide region, or light emitting region and can provide light flux redistribution within the coupling lightguide, light mixing region, lightguide region and/or within the light emitting region to achieve a predetermined light output pattern (such as higher uniformity or higher flux output) in a specific region.

In one embodiment, at least one interior light directing edge is positioned within a coupling lightguide, the light mixing region, lightguide region, or light emitting region to receive light propagating within the coupling lightguide, light mixing region, lightguide region, or light emitting region, respectively, within a first angular range from the optical axis of light traveling within the coupling lightguide or region and direct the light to a second, different angular range propagating within the coupling lightguide or region. In one embodiment, the first angular range is selected from the group: 70-89, 70-80, 60-80, 50-80, 40-80, 30-80, 20-80, 30-70, and 30-60 degrees; and the second angular range is selected from the group: 0-10, 0-20, 0-30, 0-40, 0-50, 10-40, and 20-60 degrees. In one embodiment, a plurality of interior light directing edges are formed after the coupling lightguides are stacked. In another embodiment, one or more coupling lightguides, the light mixing region, lightguide region, and light emitting region have interior light directing edges that form a channel that spatially separates light traveling within the coupling lightguide. In one embodiment, a length along the optical axis of light travelling within the coupling lightguide, light mixing region, lightguide region, or light emitting region of one or more interior light directing edges is greater than one selected from the group: 20%, 30%, 40%, 50%, 60%, 70%, 80%, and 90% of a length from an input surface of the coupling lightguide to the lightguide region or the light mixing region along the optical axis of light traveling within the coupling lightguide, light mixing region, lightguide region, or light emitting region, respectively. In another embodiment, the interior light directing edges are positioned within one selected from the group: 1, 5, 7, 10, 15, 20, 25 millimeters from the input surface of the coupling lightguides, the boundary where the coupling lightguide meet the lightguide region or light mixing region, or the boundary between the light mixing region and the light emitting region of the film-based lightguide. In one embodiment, one or more coupling lightguides have interior light directing edges positioned within one selected from the group: 1, 5, 7, 10, 15, 20, 25 millimeters from the light input surface of the one or more coupling lightguides. In a further embodiment, one or more coupling lightguides have at least one interior light directing edge with a width of the interior light directing edge in a direction parallel to the fold line greater than one selected from the group of: 5, 10, 15, 20, 25, 30, 35, 40, 45, 50, and 60 percent of a width of the coupling lightguide at the lightguide region. In a further embodiment, at least one coupling lightguide has two adjacent interior light directing edges wherein the average separation between the interior light directing edges in a direction parallel to a fold line is greater than one selected from the group of: 5, 10, 15, 20, 25, 30, 35, 40, 45, 50, and 60 percent of the width of the coupling lightguide at the lightguide region.

In another embodiment, at least one coupling lightguide, the light mixing region, the lightguide region, or the light emitting region includes a plurality of channels defined by at least one interior light directing edge and a lateral edge of the coupling lightguide or region. In a further embodiment, the coupling lightguide, light mixing region, lightguide region, or light emitting region includes a channel defined by a first interior light directing edge and a second interior light directing edge. In one embodiment, one or more channels defined by interior light directing edges and/or lateral edges of the coupling lightguide, light mixing region, lightguide region, or light emitting region separate angular ranges of light from the light source into spatially separated channels that can transfer the spatial separation to the lightguide region, light emitting region, or light emitting region. In one embodiment, the channels are parallel to the extended direction of an array of coupling lightguides. In another embodiment, the light source includes a plurality of light emitting diodes formed in an array such that the optical axis of a first light source enters a first channel defined in a coupling lightguide and the optical axis of a second source enters a second channel defined in a coupling lightguide. In one embodiment, one or more interior light directing edges extend from within one or more coupling lightguides into the lightguide region of the lightguide. In another embodiment, the lightguide region has one or more interior light directing edges. In a further embodiment, the lightguide region has one or more interior light directing edges and one or more coupling lightguides include one or more interior light directing edges. In another embodiment, one or more interior light directing edges extend from within one or more coupling lightguides into the light emitting region of the lightguide. In this embodiment, for example, a light source including red, green, and blue light emitting diodes in a linear array adjacent a first, second, and third channel of a plurality of coupling lightguides, respectively can be directed to an alternating first, second, and third pixel region within the light emitting region to create a spatial arrangement of repeating red, green, blue, red, green, blue, red, green, blue color pixels in a light emitting region for a color display or sign. In another embodiment, the interior region of the light mixing region or lightguide region includes at least one interior light directing edge.

Coupling Lightguide Orientation Angle

In a further embodiment, at least one portion of the array of coupling lightguides is disposed at a first coupling lightguide orientation angle to the edge of at least one of the light mixing region and light emitting region which it directs light into. The coupling lightguide orientation angle is defined as the angle between the coupling lightguide axis and the direction parallel to the major component of the direction of the coupling lightguides to the light emitting region of the lightguide. The major component of the direction of the coupling lightguide to the light emitting region of the lightguide is orthogonal to the array direction of the array of coupling lightguides at the light mixing region (or lightguide region if they extend directly from the light emitting region). In one embodiment, the orientation angle of a coupling lightguide or the average orientation angle of a plurality of coupling lightguides is at least one selected from the group: 1-10 degrees, 10-20 degrees, 20-30 degrees, 30-40 degrees, 40-50 degrees, 60-70 degrees, 70-80 degrees, 1-80 degrees, 10-70 degrees, 20-60 degrees, 30-50 degrees, greater than 5 degrees, greater than 10 degrees, and greater than 20 degrees.

Light Mixing Region

In one embodiment, a light emitting device includes a light mixing region disposed in an optical path between the light input coupler and the lightguide region. The light mixing region can provide a region for the light output from individual coupling lightguides to mix together and improve at least one of a spatial luminance uniformity, a spatial color uniformity, an angular color uniformity, an angular luminance uniformity, an angular luminous intensity uniformity or any combination thereof within a region of the lightguide or of the surface or output of the light emitting region or light emitting device. In one embodiment, a width of the light mixing region is selected from a range from 0.1 mm (for small displays) to more than 10 feet (for large billboards). In one embodiment, the light mixing region is the region disposed along an optical path near the end region of the coupling lightguides wherein light from two or more coupling lightguides may inter-mix and subsequently travel to a light emitting region of the lightguide. In one embodiment, the light mixing region is formed from the same component or material as at least one of the lightguide, lightguide region, light input coupler, and coupling lightguides.

Width of the Light Mixing Region or Array of Coupling Lightguides

In one embodiment, the length of the array of coupling lightguides and/or the light mixing region is longer than the light emitting region or lightguide region in a direction parallel to the array direction of the coupling lightguides (perpendicular to the extended direction of the array of coupling lightguides). In one embodiment, the array of coupling lightguides and/or the light mixing region extends past a lateral side of the light emitting region in the direction parallel to the array direction of the coupling lightguides (the perpendicular to the extended direction of the coupling lightguides) by a distance selected from the group: greater than 1 millimeter; greater than 2 millimeters; greater than 4 millimeters; greater than 6 millimeters; greater than 10 millimeters; greater than 15 millimeters; greater than 20 millimeters; greater than 50% of the average width of the coupling lightguides; greater than 100% of the average width of the coupling lightguides; and greater than 1%, 2%, 5%, or 10% of the length of the light emitting region in the direction parallel to the array direction of the coupling lightguides. In one embodiment, the array of coupling lightguides or light mixing region extends past the lateral edge of the light emitting region opposite the direction of the fold. In a further embodiment, the array of coupling lightguides or light mixing region extends past the lateral side of the light emitting region in the direction of the fold. In one embodiment, more light can be introduced into the edge region (defined as the region of the light emitting area within 10% of the lateral edge) by extending the array of coupling lightguides past the lateral edge of the light emitting region and/or extending the light mixing region past the lateral edge of the light emitting region. In a further embodiment, a lateral edge of the light mixing region, a lateral edge of one or more coupling lightguides, or an interior light directing edge is oriented at a first extended orientation angle to the extended direction of the coupling lightguides to direct light from the extended region of the array of coupling lightguides or the light mixing region toward the light emitting region of the film-based lightguide. In one embodiment, the first extended orientation angle is greater than one selected from the group: 0, 2, 5, 10, 20, 30, 45, and 60 degrees. For example, in one embodiment, the array of coupling lightguides includes a coupling lightguide that extends past the far lateral edge (the edge furthest from the light source) of the light emitting area and the light mixing region includes a lateral edge with an extended orientation angle of 30 degrees. In this embodiment, the far coupling lightguides are longer in length, and thus more light is absorbed through the material. One method of compensation for the light flux difference reaching the far edge region of the light emitting area due to the longer path length of light traveling toward the far edge region of the light emitting area is to add an additional coupling lightguide that can receive a distributed portion of the light from the light source and direct it into the far edge region of the light emitting area by an angled lateral edge in the extended coupling lightguide, the light mixing region, or an interior light directing edge.

Housing or Holding Device for Light Input Coupler

In one embodiment, a light emitting device includes a housing or holding device that holds or includes at least part of a light input coupler and light source. The housing or holding device may house or contain within at least one selected from the group: light input coupler, light source, coupling lightguides, lightguide, optical components, electrical components, heat sink or other thermal components, attachment mechanisms, registration mechanisms, folding mechanisms devices, and frames.

In another embodiment, the housing includes at least one curved surface. A curved surface can permit non-linear shapes or devices or facilitate incorporating non-planer or bent lightguides or coupling lightguides. In one embodiment, a light emitting device includes a housing with at least one curved surface wherein the housing includes curved or bent coupling lightguides. In another embodiment, the housing is flexible such that it may be bent temporarily, permanently or semi-permanently.

Cladding Layer

In one embodiment, at least one of the light input coupler, coupling lightguide, light mixing region, lightguide region, and lightguide includes a cladding layer optically coupled to at least one surface. A cladding region, as used herein, is a layer optically coupled to a surface wherein the cladding layer includes a material with a refractive index, $n_{clad}$, less than the refractive index of the material, nm, of the surface to which it is optically coupled. In a one embodiment, the average thickness of one or both cladding layers of the lightguide is less than one selected from the group: 100 microns, 60 microns, 30 microns, 20 microns, 10 microns, 6 microns, 4 microns, 2 microns, 1 micron, 0.8 microns, 0.5 microns, 0.3 microns, and 0.1 microns. In one embodiment, the cladding layer includes an adhesive such as a silicone-based adhesive, acrylate-based adhesive, epoxy, radiation curable adhesive, UV curable adhesive, or other light transmitting adhesive. Fluoropolymer materials may be used as a low refractive index cladding material. In one embodiment, the cladding region is optically coupled to one or more of the following: a lightguide, a lightguide region, a light mixing region, one surface of the lightguide, two surfaces of the lightguide, a light input coupler, coupling lightguides, and an outer surface of the film. In another embodiment, the cladding is disposed in optical contact with the lightguide, the lightguide region, or a layer or layers optically coupled to the lightguide and the cladding material is not disposed on one or more coupling lightguides.

In one embodiment, the cladding is one selected from the group: methyl-based silicone pressure sensitive adhesive, fluoropolymer material (applied using a coating including a fluoropolymer substantially dissolved in a solvent), and a fluoropolymer film. The cladding layer may be incorporated to provide a separation layer between the core or core part of a lightguide region and the outer surface to reduce undesirable out-coupling (for example, frustrated totally internally reflected light by touching the film with an oily finger) from the core or core region of a lightguide. Components or objects such as additional films, layers, objects, fingers, dust etc. that come in contact or optical contact directly with a core or core region of a lightguide may couple light out of the lightguide, absorb light or transfer the totally internally reflected light into a new layer. By adding a cladding layer with a lower refractive index than the core, a portion of the light will totally internally reflect at the core-cladding layer interface. Cladding layers may also be used to provide the benefit of at least one of increased rigidity, increased flexural modulus, increased impact resistance, anti-glare properties, provide an intermediate layer for combining with other layers such as in the case of a cladding functioning as a tie layer or a base or substrate for an anti-reflection coating, a substrate for an optical component such as a polarizer, liquid crystal material, increased scratch resistance, provide additional functionality (such as a low-tack adhesive to bond the lightguide region to another element, a window "cling type" film such as a highly plasticized PVC). The cladding layer may be an adhesive, such as a low refractive index silicone adhesive which is optically coupled to another element of the device, the lightguide, the lightguide region, the light mixing region, the light input coupler, or a combination of one or more of the aforementioned elements or regions. In one embodiment, a cladding layer is optically coupled to a rear polarizer in a backlit liquid crystal display. In another embodiment, the cladding layer is optically coupled to a polarizer or outer surface of a front-lit display such as an electrophoretic display, e-book display, e-reader display, MEMs type display, electronic paper displays such as E-Ink® display by E Ink Corporation, reflective or partially reflective LCD display, cholesteric display, or other display capable of being illuminated from the front. In another embodiment, the cladding layer is an adhesive that bonds the lightguide or lightguide region to a component such as a substrate (glass or polymer), optical element (such as a polarizer, retarder film, diffuser film, brightness enhancement film, protective film (such as a protective polycarbonate film), the light input coupler, coupling lightguides, or other element of the light emitting device. In one embodiment, the cladding layer is separated from the lightguide or lightguide region core layer by at least one additional layer or adhesive.

In one embodiment, the cladding region is optically coupled to one or more surfaces of the light mixing region to prevent out-coupling of light from the lightguide when it is in contact with another component. In this embodiment, the cladding also enables the cladding and light mixing region to be physically coupled to another component.

Cladding Location

In one embodiment, the cladding region is optically coupled to at least one selected from the group: lightguide, lightguide region, light mixing region, one surface of the lightguide, two surfaces of the lightguide, light input coupler, coupling lightguides, and an outer surface of the film. In another embodiment, the cladding is disposed in optical contact with the lightguide, lightguide region, or layer or layers optically coupled to the lightguide and the cladding material is not disposed on one or more coupling lightguides. In one embodiment, the coupling lightguides do not include a cladding layer between the core regions in the region near the light input surface or light source. In another embodiment, the core regions may be pressed or held together, and the edges may be cut and/or polished after stacking or assembly to form a light input surface or a light turning edge that is flat, curved, or a combination thereof. In another embodiment, the cladding layer is a pressure sensitive adhesive and the release liner for the pressure sensitive adhesive is selectively removed in the region of one or more coupling lightguides that are stacked or aligned together into an array such that the cladding helps maintain the relative position of the coupling lightguides relative to each other. In another embodiment, the protective liner is removed from the inner cladding regions of the coupling lightguides and is left on one or both outer surfaces of the outer coupling lightguides. In one embodiment, a cladding layer is disposed on one or both opposite surfaces of the light emitting region and is not disposed between two or more coupling lightguides at the light input surface. In one embodiment, two or more core regions of the coupling lightguides do not include a cladding region between the core regions in a region of the coupling lightguide disposed within a distance selected from the group: 1 millimeter, 2 millimeters, 4 millimeters, and 8 millimeters from the light input surface edge of the coupling lightguides. In a one embodiment, the average thickness of one or both cladding layers of the lightguide is less than one selected from the group: 100 microns, 60 microns, 30 microns, 20 microns, 10 microns, 6 microns, 4 microns, 2 microns, 1 micron, 0.8 microns, 0.5 microns, 0.3 microns, and 0.1 microns. In one embodiment, the cladding layer includes an adhesive such as a silicone-based adhesive, acrylate-based adhesive, epoxy, radiation curable adhesive, UV curable adhesive, or other light transmitting adhesive.

Layers or Regions on Opposite Sides of the Lightguide of Materials with Higher and Lower Refractive Indexes In one embodiment, a light emitting region of the film-based lightguide comprises: a first layer or coating of a first material with a first refractive index optically coupled to a first surface of the film-based lightguide in the light emitting region, a second layer or coating of a second material with a second refractive index optically coupled to the opposite surface of the film-based lightguide in the light emitting region, the second refractive index higher than the first refractive index, the second refractive index and the first refractive index less than the refractive index of the material in the core region of the lightguide. In this embodiment, light propagating within the core layer or region of the film-based lightguide in the light emitting region that undergoes a low angle light redirection, such as by a low angle directing feature, will preferentially leak or exit the lightguide on the side with the second refractive index since it is higher than the first refractive index and the critical angle is higher. In this embodiment, light deviating from angles higher than the critical angle to smaller angles from the thickness direction of the film will first pass the total internal reflection interface on the side of the core layer or region optically coupled to the cladding layer or region with the higher refractive index.

Lightguide Configuration and Properties

In one embodiment, the thickness of the film, light redirecting optical element, reflective display, lightguide, and/or lightguide region is within a range of 0.005 mm to 0.5 mm. In another embodiment, the thickness of the film or lightguide is within a range of 0.025 mm (0.001 inches) to 0.5 mm (0.02 inches). In a further embodiment, the thickness of the film, lightguide and/or lightguide region is within a range of 0.050 mm to 0.175 mm. In one embodiment, the thickness of the film, lightguide or lightguide region is less than 0.2 mm or less than 0.5 mm. In one embodiment, one or more of a thickness, a largest thickness, an average thickness, a greater than 90% of the entire thickness of the film, a lightguide, and a lightguide region is less than 0.2 millimeters.

Optical Properties of the Lightguide or Light Transmitting Material

With regards to the optical properties of lightguides, light redirecting optical element or region, light extraction film or region, or light transmitting materials for certain embodiments, the optical properties specified herein may be general properties of the lightguide, the core, the cladding, or a combination thereof or they may correspond to a specific region (such as a light emitting region, light mixing region, or light extracting region), surface (light input surface, diffuse surface, flat surface), and direction (such as measured normal to the surface or measured in the direction of light travel through the lightguide).

Refractive Index of the Light Transmitting Material

In one embodiment, the core material of the lightguide has a higher refractive index than the cladding material. In one embodiment, the core is formed from a material with a refractive index ($n_D$) greater than one selected from the group: 1.3, 1.4, 1.5, 1.6, 1.7, 1.8, 1.9, 2.0, 2.1, 2.2, 2.3, 2.4, 2.5, 2.6, 2.7, 2.8, 2.9, and 3.0. In another embodiment, the refractive index ($n_D$) of the cladding material is less than one selected from the group: 1.1, 1.2, 1.3, 1.4, 1.5, 1.6, 1.7, 1.8, 1.9, 2.0, 2.1, 2.2, 2.3, 2.4, and 2.5.

Shape of the Lightguide

In one embodiment, at least a portion of the lightguide shape or lightguide surface is substantially planar, curved, cylindrical, a formed shape from a substantially planar film, spherical, partially spherical, angled, twisted, rounded, have a quadric surface, spheroid, cuboid, parallelepiped, triangular prism, rectangular prism, ellipsoid, ovoid, cone pyramid, tapered triangular prism, wave-like shape, and/or other known suitable geometrical solids or shapes. In one embodiment, the lightguide is a film formed into a shape by thermoforming or other suitable forming techniques. In another embodiment, the film or region of the film is tapered in at least one direction. In a further embodiment, a light emitting device includes a plurality of lightguides and a plurality of light sources physically coupled or arranged together (such as tiled in a 1×2 array for example). In another embodiment, the surface of the lightguide region of the film is substantially in the shape of a polygon, triangle, rectangle, square, trapezoid, diamond, ellipse, circle, semicircle, segment or sector of a circle, crescent, oval, annulus, alphanumeric character shaped (such as "U-shaped" or "T-shaped), or a combination of one or more of the aforementioned shapes. In another embodiment, the shape of the lightguide region of the film is substantially in the shape of a polyhedron, toroidal polyhedron, curved polyhedron, spherical polyhedron, rectangular cuboid, cuboid, cube, orthotope, stellation, prism, pyramid, cylinder, cone, truncated cone, ellipsoid, paraboloid, hyperboloid, sphere, or a combination of one or more of the aforementioned shapes.

Thickness of the Lightguide

In one embodiment, the thickness of the film, lightguide, lightguide region, and/or light emitting region is within a range of 0.005 mm to 0.5 mm. In another embodiment, the thickness of the film or lightguide is within a range of 0.025 mm (0.001 inches) to 0.5 mm (0.02 inches). In a further embodiment, the thickness of the film, lightguide and/or lightguide region is within a range of 0.050 mm to 0.175 mm. In one embodiment, the thickness of the film, lightguide or lightguide region is less than 0.2 mm or less than 0.5 mm. In one embodiment, one or more of a thickness, a largest thickness, an average thickness, greater than 90% of the entire thickness of the film, a lightguide, and a lightguide region is less than 0.2 millimeters.

Lightguide Material

In one embodiment, a light emitting device includes a lightguide or lightguide region formed from at least one light transmitting material. In one embodiment, the lightguide is a film includes at least one core region and at least one cladding region, each including at least one light transmitting material. In one embodiment, the light transmitting material is a thermoplastic, thermoset, rubber, polymer, high transmission silicone, glass, composite, alloy, blend, silicone, or other suitable light transmitting material, or a combination thereof. In one embodiment, a component or region of the light emitting device includes a suitable light transmitting material, such as one or more of the following: cellulose derivatives (e.g., cellulose ethers such as ethylcellulose and cyanoethylcellulose, cellulose esters such as cellulose acetate), acrylic resins, styrenic resins (e.g., polystyrene), polyvinyl-series resins [e.g., poly(vinyl ester) such as poly(vinyl acetate), poly(vinyl halide) such as poly(vinyl chloride), polyvinyl alkyl ethers or polyether-series resins such as poly(vinyl methyl ether), poly(vinyl isobutyl ether) and poly(vinyl t-butyl ether)], polycarbonate-series resins (e.g., aromatic polycarbonates such as bisphenol A-type polycarbonate), polyester-series resins (e.g., homopolyesters, for example, polyalkylene terephthalates such as polyethylene terephthalate and polybutylene terephthalate, polyalkylene naphthalates corresponding to the polyalkylene terephthalates; copolyesters including an alkylene terephthalate and/or alkylene naphthalate as a main component; homopolymers of lactones such as polycaprolactone), polyamide-series resin (e.g., nylon 6, nylon 66, nylon 610), urethane-series resins (e.g., thermoplastic polyurethane resins), copolymers of monomers forming the above resins [e.g., styrenic copolymers such as methyl methacrylate-styrene copolymer (MS resin), acrylonitrile-styrene copolymer (AS resin), styrene-(meth)acrylic acid copolymer, styrene-maleic anhydride copolymer and styrene-butadiene copolymer, vinyl acetate-vinyl chloride copolymer, vinyl alkyl ether-maleic anhydride copolymer]. Incidentally, the copolymer may be whichever of a random copolymer, a block copolymer, or a graft copolymer.

Lightguide Material with Adhesive Properties

In another embodiment, the lightguide includes a material with at least one selected from the group: chemical adhesion, dispersive adhesion, electrostatic adhesion, diffusive adhesion, and mechanical adhesion to at least one element of the light emitting device (such as a carrier film with a coating, an optical film, the rear polarizer in an LCD, a brightness enhancing film, another region of the lightguide, a coupling lightguide, a thermal transfer element such as a thin sheet including aluminum, or a white reflector film). In a further embodiment, at least one of the core material or cladding material of the lightguide is an adhesive material.

Multilayer Lightguide

In one embodiment, the lightguide includes at least two layers or coatings. In another embodiment, the layers or coatings function as at least one selected from the group: a core layer, a cladding layer, a tie layer (to promote adhesion between two other layers), a layer to increase flexural strength, a layer to increase the impact strength (such as Izod, Charpy, Gardner, for example), and a carrier layer.

Light Extraction Method

In one embodiment, one or more of the lightguide, the lightguide region, and the light emitting region includes at least one light extraction feature or region. In one embodiment, the light extraction region may be a raised or recessed surface pattern or a volumetric region. Raised and recessed surface patterns include, without limitation, scattering material, raised lenses, scattering surfaces, pits, grooves, surface modulations, microlenses, lenses, diffractive surface features, holographic surface features, photonic bandgap features, wavelength conversion materials, holes, edges of layers (such as regions where the cladding is removed from covering the core layer), pyramid shapes, prism shapes, and other geometrical shapes with flat surfaces, curved surfaces, random surfaces, quasi-random surfaces, and combinations thereof. The volumetric scattering regions within the light extraction region may include dispersed phase domains, voids, absence of other materials or regions (gaps, holes), air gaps, boundaries between layers and regions, and other refractive index discontinuities or inhomogeneities within the volume of the material different that co-planar layers with parallel interfacial surfaces.

In one embodiment, the light extraction feature is substantially directional and includes one or more of the following: an angled surface feature, a curved surface feature, a rough surface feature, a random surface feature, an asymmetric surface feature, a scribed surface feature, a cut surface feature, a non-planar surface feature, a stamped surface feature, a molded surface feature, a compression molded surface feature, a thermoformed surface feature, a milled surface feature, an extruded mixture, a blended materials, an alloy of materials, a composite of symmetric or asymmetrically shaped materials, a laser ablated surface feature, an embossed surface feature, a coated surface feature, an injection molded surface feature, an extruded surface feature, and one of the aforementioned features disposed in the volume of the lightguide. For example, in one embodiment, the directional light extraction feature is a 100 micron long, 45-degree angled facet groove formed by UV cured embossing a coating on the lightguide film that substantially directs a portion of the incident light within the lightguide toward 0 degrees from the surface normal of the lightguide.

In one embodiment, the light extraction feature is a specularly, diffusive, or a combination thereof reflective material. For example, the light extraction feature may be a substantially specularly reflecting ink disposed at an angle (such as coated onto a groove) or the light extraction feature may be a substantially diffusely reflective ink such as an ink including titanium dioxide particles within a methacrylate-based binder. In one embodiment, the thin lightguide film permits smaller features to be used for light extraction features or light extracting surface features to be spaced further apart due to the thinness of the lightguide. In one embodiment, the average largest dimensional size of the light extracting surface features in the plane parallel to the light emitting surface corresponding to a light emitting region of the light emitting device is less than one selected from the group of 3 mm, 2 mm, 1 mm, 0.5 mm, 0.25 mm, 0.1 mm, 0.080, 0.050 mm, 0.040 mm, 0.025 mm, and 0.010 mm.

The light extraction region may comprise volumetric scattering regions having dispersed phase domains, voids, absence of other materials or regions (gaps, holes), air gaps, boundaries between layers and regions, and other refractive index discontinuities within the volume of the material different than co-planar layers with parallel interfacial surfaces. In one embodiment, the light extracting region comprises angled or curved surface or volumetric light extracting features that redirect a first redirection percentage of light into an angular range within 5 degrees of the normal to the light emitting surface of the light emitting device or within 80-90 or 85-90 degrees from the direction normal to the light emitting surface of the light emitting device. In another embodiment, the first redirection percentage is greater than one selected from the group of 5, 10, 20, 30, 40, 50, 60, 70, 80, and 90. In one embodiment, the light extraction features are light redirecting features, light extracting regions, or light output coupling features.

In a further embodiment, the light extraction features are grooves, indentations, curved, or angled features that redirect a portion of light incident in a first direction to a second direction within the same plane through total internal reflection. In another embodiment, the light extraction features redirect a first portion of light incident at a first angle into a second angle greater than the critical angle in a first output plane and increase the angular full width at half maximum intensity in a second output plane orthogonal to the first. In a further embodiment, the light extraction feature is a region comprising a groove, indentation, curved or angled feature and further comprises a substantially symmetric or isotropic light scattering region of material such as dispersed voids, beads, microspheres, substantially spherical domains, or a collection of randomly shaped domains wherein the average scattering profile is substantially symmetric or isotropic.

The pattern or arrangement of light extraction features may vary in size, shape, pitch, location, height, width, depth, shape, orientation, in the x, y, or z directions. Patterns and formulas or equations to assist in the determination of the arrangement to achieve spatial luminance or color uniformity are known in the art of edge-illuminated backlights. In one embodiment, the non-uniform pitch, feature dimension, or density of the low angle directing features in the first and/or second direction is used to direct light to an angle less than the critical angle for one or more interfaces of the core region of the lightguide with a spatially uniform luminous flux such that the light coupling through the cladding layer or region with the higher refractive index than the cladding layer or region on the opposite surface of the core region of the lightguide is incident on one or more light turning features that direct the light to an angular range within thirty degrees from the thickness direction of the lightguide in the light emitting region. In one embodiment, varying the pitch, feature dimension, or density of the low angle directing features in the first and/or second direction enables spatial control of the light flux redirected toward the light turning features wherein the low angle directing features do not cause moiré interference with the object being illuminated by the light emitting device (such as a reflective or transmissive liquid crystal display). Thus, in this example, the pitch of the light turning features can be chosen to be a constant pitch that does not create moiré interference and the luminance uniformity of the light reaching the object of illumination is achieved by spatially varying the pitch, feature dimension, or density of the low angle directing features. In one embodiment, a method of providing uniform illuminance for an object includes providing a plurality of types of light directing features (such as low angle directing features and light turning features) wherein the uniformity is provided by varying the pitch, dimension, or density of a first type of feature and the redirection of light to an angle that escapes the lightguide to illuminate an object (such as a reflective or transmissive LCD) is achieved by a second type of feature with a substantially constant pitch, dimension, and/or density such that the moiré contrast between the light directing features and the object of illumination is less than one selected from the group of 50%, 40%, 30%, 20% and 10%. The low angle directing feature may be formed on a surface or within a volume of material and the material may be thermoplastic, thermoset, or adhesive material. In one embodiment, the low angle directing features are light extraction features. In another embodiment, the low angle directing features are light extraction features for a first lightguide and a second lightguide. In another embodiment, the light emitting device comprises low angle directing features in two or more layers or regions in the direction of the light output of the light emitting device.

Width of the Light Emitting Region

In one embodiment, the total width of the array of coupling lightguides where they meet the light mixing region, lightguide region, or light emitting region is less than the average width, largest width, or width of the light emitting region or lightguide region in a direction parallel to the array direction of the coupling lightguides (perpendicular to the extended direction of the array of coupling lightguides).

Low Angle Directing Features

In one embodiment, at least one of the coupling lightguides, light mixing region, or light emitting region comprises two or more low angle directing features. As used herein, low angle directing features are refractive, total internal reflection, diffractive, or scattering surfaces, features, or interfaces that redirect light propagating within a totally internally reflecting lightguide at a first angle to the thickness direction of the film in the core region of the lightguide to a second angle in the core region of the lightguide smaller than the first angle by an average total angle of deviation of less than 20 degrees. In another embodiment, the low angle directing features redirect incident light to a second angle with an average total angle of deviation less than one selected from the group 18, 16, 14, 12, 10, 8, 6, 5, 4, 3, 2, and 1 degrees from the angle of incidence. In one embodiment, the low angle directing features are defined by one or more reflective surfaces of the reflective spatial light modulator. For example, in one embodiment, the rear reflective surface of a reflective spatial light modulator comprises low angle directing features and the reflective spatial light modulator is optically coupled to the lightguide in the light emitting region. In another example, the reflective pixels of a reflective spatial light modulator are low angle directing features and the reflective spatial light modulator is optically coupled to the lightguide in the light emitting region.

In one embodiment, at least one of the pitch, first dimension of the feature in a first direction perpendicular to the thickness direction of the film, second dimension of the feature in a second direction perpendicular to the first direction and perpendicular to the thickness direction of the film; dimension of the feature in the thickness direction; and density of the features in the first direction and/or second direction varies in the first direction and/or second direction.

In one embodiment, the non-uniform pitch, feature dimension, or density is used to direct light to an angle less than the critical angle for one or more interfaces of the core region of the lightguide with a spatially uniform luminous flux such that the light coupling through the cladding layer or region with the higher refractive index than the cladding layer or region on the opposite surface of the core region of the lightguide is incident on one or more light turning features that direct the light to an angular range within thirty degrees from the thickness direction of the lightguide in the light emitting region. The low angle directing feature may be formed on a surface or within a volume of material and the material may be thermoplastic, thermoset, or adhesive material. In one embodiment, the low angle directing features are light extraction features. In a further embodiment, the light redirecting features are low angle directing features. In another embodiment, the low angle directing features are light extraction features for a first lightguide and a second lightguide. In another embodiment, the light emitting device comprises low angle directing features in two or more layers or regions in the direction of the light output of the light emitting device.

In one embodiment, the light redirecting element has a refractive index less than or equal to the refractive index of the core layer of the film-based lightguide. For example, in one embodiment a reflective display comprises a frontlight having a light redirecting element formed in a polycarbonate material with a refractive index of about 1.6 that is optically coupled to a polycarbonate lightguide with a refractive index of about 1.6 using an adhesive functioning as a cladding layer with a refractive index of about 1.5 where the lightguide comprises low angle directing features that are light extracting features for the film-based lightguide and the lightguide is optically coupled to a reflective spatial light modulator on a side opposite the light redirecting optical element using an adhesive that functions as a cladding with a refractive index of about 1.42.

Reflecting Low Angle Directing Features

In one embodiment, a film-based lightguide comprises a light emitting region with low angle directing features defined by angled or curved interfaces between materials with two different refractive indexes. In this embodiment, the refractive index difference can cause at least a portion of the incident light to be reflected with an average total angle of deviation less than 20 degrees from the angle of incidence.

Refractive Low Angle Directing Features

In another example, a film-based lightguide comprises a light emitting region with low angle directing features defined by an arrangement of surfaces wherein light passing through the surface is refracted (and optionally reflected) at least once to a new angle with an average total angle of deviation less than 20 degrees from the angle of incidence.

Diffracting Low Angle Directing Features

In another example, a film-based lightguide comprises a light emitting region with low angle directing features defined by an arrangement of diffractive features or surfaces wherein light passing through the features or surfaces is diffracted (and optionally reflected) at least once to a new angle with an average total angle of deviation less than 20 degrees from the angle of incidence.

Scattering Low Angle Directing Features

In a further example, a film-based lightguide comprises a light emitting region with low angle directing features defined by a layer or region with light scattering features, domains, or particles wherein light passing through the light scattering layer or region is scattered at least once to a new angle with an average total angle of deviation less than 20, 15, 10, 8, 6, 4, 3, 2, or 1 degrees from the angle of incidence.

Polarization Dependent Low Angle Directing Features

In one embodiment, the low angle directing features redirect light with a first polarization more than light with a second polarization different than the first polarization. In another embodiment, the ratio of the percentage of the light with the first polarization that is redirected to the percentage of light with the second polarization that is redirected, the polarization directing ratio, is greater than one selected from the group: 1, 2, 3, 4, 5, 10, 15, 20, 30, and 50.

Light Turning Features

In one embodiment, the light emitting region of the lightguide comprises or is optically coupled to a layer or region with light turning features. As used herein, light turning features are refractive, total internal reflection, diffractive, or scattering surfaces, features, or interfaces that redirect at least a portion of light incident within a first angular range to a second angular range different from the first, wherein the second angular range is within 30 degrees from the thickness direction of the film in the light emitting region. For example, in one embodiment, a polycarbonate film with grooves on a first outer surface is optically coupled to a film-based lightguide using a pressure sensitive adhesive on the second surface of the polycarbonate film opposite the first outer surface. In this embodiment, light escaping the lightguide (such as by low angle directing features) through the pressure sensitive adhesive totally internally reflects at the groove-air interface in the polycarbonate film and is directed to an angle within 30 degrees from the thickness direction of the film in the light emitting region where it further passes through the lightguide to illuminate an object, such as a reflective LCD, and may optionally pass back through the lightguide.

Size and Shape of the Light Turning Features

In one embodiment, a light emitting device comprises the film-based lightguide providing front illumination, such as a frontlight for a reflective display, and the density of the light turning features in the light emitting region of the film (or in a film optically coupled to the light emitting region) is less than about 50% in order to reduce undesired second light deviations (such as unwanted reflections) of the light reflected from the object illuminated and passing back through the lightguide and layer or region comprising the light turning features. In another embodiment, the average depth of the light turning features in the thickness direction of the layer or region of film comprising the light turning features is one or more selected from the group: between 1 and 500 microns, between 3 and 300 microns, between 5 and 200 microns, greater than 2 microns, less than 500 microns, less than 200 microns, less than 100 microns, less than 75 microns, less than 50 microns, and less than 10 microns.

In another embodiment, the average width of the light turning features in the direction of light propagation from a first input side of the light emitting region of the lightguide to the opposite side of the light emitting region of the lightguide is one or more selected from the group: between 2 and 500 microns, between 5 and 300 microns, between 10 and 200 microns, greater than 5 microns, less than 500 microns, less than 200 microns, less than 100 microns, less than 75 microns, less than 50 microns, less than 25 microns, and less than 10 microns.

In one embodiment, the light turning feature includes one or more of the following: an angled surface feature, a curved surface feature, a rough surface feature, a random surface feature, an asymmetric surface feature, a scribed surface feature, a cut surface feature, a non-planar surface feature, a stamped surface feature, a molded surface feature, a compression molded surface feature, a thermoformed surface feature, a milled surface feature, a composite of symmetric or asymmetrically shaped materials, a laser ablated surface feature, an embossed surface feature, a coated surface feature, an injection molded surface feature, an extruded surface feature, and one of the aforementioned features positioned in the volume of the lightguide.

In one embodiment, a reflective display comprises a light emitting device with a film-based lightguide and a reflective spatial light modulator. In this embodiment, the light emitting device comprises a light redirecting optical element with light redirecting features or light turning features with a dimension in a plane orthogonal to the thickness direction of the film-based lightguide larger than the average size of a pixel of the reflective spatial light modulator or larger than the size of 2, 3, 4, 5, 7, 10, 20, 30, or 50 average size pixels.

Pitch of the Light Turning Features

In one embodiment the average pitch or spacing between the light redirecting features or light turning features is constant. In one embodiment, the average pitch of the light turning features in the direction of light propagation from a first input side of the light emitting region of the lightguide to the opposite side of the light emitting region of the lightguide (such as the direction of the average angle of propagation within the lightguide in the light emitting region, for example) is one or more selected from the group: between 5 and 500 microns, between 10 and 300 microns, between 20 and 200 microns, greater than 5 microns, less than 500 microns, less than 200 microns, less than 100 microns, less than 75 microns, and less than 50 microns. In one embodiment, the light turning features redirect light with a first polarization more than light with a second polarization different than the first polarization. In another embodiment, the ratio of the percentage of the light with the first polarization that is redirected to the percentage of light with the second polarization that is redirected, the polarization directing ratio, is greater than one selected from the group: 1, 2, 3, 4, 5, 10, 15, 20, 30, and 50.

Multiple Lightguides

In one embodiment, a light emitting device includes more than one lightguide to provide one or more of the following: color sequential display, localized dimming backlight, red, green, and blue lightguides, animation effects, multiple messages of different colors, NVIS and daylight mode backlight (one lightguide for NVIS, one lightguide for daylight for example), tiled lightguides or backlights, and large area light emitting devices including smaller light emitting devices. In another embodiment, a light emitting device includes a plurality of lightguides optically coupled to each other. In another embodiment, at least one lightguide or a component thereof includes a region with anti-blocking features such that the lightguides do not substantially couple light directly into each other due to touching.

Lightguide Folding Around Components

In one embodiment, at least one selected from the group: lightguide, lightguide region, light mixing region, plurality of lightguides, coupling lightguides, and light input coupler bends or folds such that components of the light emitting device are hidden from view, located behind another component or the light emitting region, or are partially or fully enclosed. These components around which they may bend or fold include components of the light emitting device such as light source, electronics, driver, circuit board, thermal transfer element, spatial light modulator, display, housing, holder, or other components such that the components are disposed behind the folded or bent lightguide or other region or component. In one embodiment, a frontlight for a reflective display includes a lightguide, coupling lightguides and a light source wherein one or more regions of the lightguide are folded and the light source is disposed substantially behind the display. In one embodiment, the light mixing region includes a fold and the light source and/or coupling lightguides are substantially disposed on the side of the film-based lightguide opposite the light emitting region of the device or reflective display. In one embodiment, a reflective display includes a lightguide that is folded such that a region of the lightguide is disposed behind the reflective spatial light modulator of the reflective display. In one embodiment, the fold angle is between 150 and 210 degrees in one plane. In another embodiment, the fold angle is substantially 180 degrees in one plane. In one embodiment, the fold is substantially 150 and 210 degrees in a plane parallel to the optical axis of the light propagating in the film-based lightguide. In one embodiment, more than one input coupler or component is folded behind or around the lightguide, light mixing region or light emitting region. In this embodiment, for example, two light input couplers from opposite sides of the light emitting region of the same film may be disposed adjacent each other or utilize a common light source and be folded behind the spatial light modulator of a display. In another embodiment, tiled light emitting devices include light input couplers folded behind and adjacent or physically coupled to each other using the same or different light sources. In one embodiment, the light source or light emitting area of the light source is disposed within the volume bounded by the edge of the light emitting region and the normal to the light emitting region on the side of the lightguide opposite the viewing side. In another embodiment, at least one of the light source, light input coupler, coupling lightguides, or region of the light mixing region is disposed behind the light emitting region (on the side of the lightguide opposite the viewing side) or within the volume bounded by the edge of the light emitting region and the normal to the light emitting region on the side of the lightguide opposite the viewing side.

In another embodiment, the lightguide region, light mixing region, or body of the lightguide extends across at least a portion of the array of coupling lightguides or a light emitting device component. In another embodiment, the lightguide region, light mixing region, or body of the lightguide extends across a first side of the array of coupling lightguides or a first side of the light emitting device component. In a further embodiment, the lightguide region, light mixing region or body of the lightguide extends across a first side and a second side of the array of coupling lightguides. For example, in one embodiment, the body of a film-based lightguide extends across two sides of a stack of coupling lightguides with a substantially rectangular cross section. In one embodiment, the stacked array of coupling lightguides is oriented in a first orientation direction substantially parallel to their stacked surfaces toward the direction of light propagation within the coupling lightguides, and the light emitting region is oriented in a second direction parallel to the optical axis of light propagating within the light emitting region where the orientation difference angle is the angular difference between the first orientation direction and the second orientation direction. In one embodiment, the orientation difference angle is selected from the group: 0 degrees, greater than 0 degrees, greater than 0 degrees and less than 90 degrees, between 70 degrees and 110 degrees, between 80 degrees and 100 degrees, greater than 0 degrees and less than 180 degrees, between 160 degrees and 200 degrees, between 170 degrees and 190 degrees, and greater than 0 degrees and less than 360 degrees.

In one embodiment, at least one selected from the group: lightguide, lightguide region, light mixing region, plurality of lightguides, coupling lightguides, and light input coupler bends or folds such that it wraps around a component of the light emitting device more than once. For example, in one embodiment, a lightguide wraps around the coupling lightguides two times, three times, four times, five times, or more than five times. In another embodiment, the lightguide, lightguide region, light mixing region, plurality of lightguides, coupling lightguides, or light input coupler may bend or fold such that it wraps completely around a component of the light emitting device and partially wraps again around. For example, a lightguide may wrap around a relative position maintaining element 1.5 times (one time around and half-way around again). In another embodiment, the lightguide region, light mixing region or body of the lightguide further extends across a third, fourth, fifth, or sixth side of the array of coupling lightguides or light emitting device component. For example, in one embodiment, the light mixing region of a film-based lightguide extends completely around four sides of the relative position maintaining element plus across a side again (fifth side). In another example, the light mixing region wraps around a stack of coupling lightguides and relative position maintaining element more than three times.

In one embodiment, wrapping the lightguide, lightguide region, light mixing region, plurality of lightguides, coupling lightguides, or light input coupler around a component provides a compact method for extending the length of a region of the lightguide. For example, in one embodiment, the light mixing region is wrapped around the stack of coupling lightguides to increase the light mixing distance within the light mixing region such that the spatial color or the light flux uniformity of the light entering the light emitting region is improved.

In one embodiment, the wrapped or extended region of the lightguide is operatively coupled to the stack of coupling lightguides or a component of the light emitting device. In one embodiment, the wrapped or extended region of the lightguide is held with adhesive to the stack of coupling lightguides or the component of the light emitting device. For example, in one embodiment, the light mixing region includes a pressure sensitive adhesive cladding layer that extends or wraps and adheres to one or more surfaces of one or more coupling lightguides or to the component of the light emitting device. In another embodiment, the light mixing region includes a pressure sensitive adhesive layer that adheres to at least one surface of a relative position maintaining element. In another embodiment, a portion of the film-based lightguide includes a layer that extends or wraps to one or more surfaces of one or more coupling lightguides or a component of the light emitting device. In another embodiment, the wrapped or extended region of the lightguide extends across one or more surfaces or sides or wraps around one or more light sources. The wrapping or extending of a lightguide or lightguide region across one or more sides or surfaces of the stack of coupling lightguides or the component of the light emitting device, may occur by physically translating or rotating the lightguide or the lightguide region, or may occur by rotating the stack of coupling lightguides or the component. Thus, the physical configuration does not require a particular method of achieving the wrapping or extending.

Light Absorbing Region or Layer

In one embodiment, one or more of the cladding, the adhesive, the layer disposed between the lightguide and lightguide region and the outer light emitting surface of the light emitting device, a patterned region, a printed region, and an extruded region on one or more surfaces or within a volume of the film includes a light absorbing material which absorbs a first portion of light in a first predetermined wavelength range.

Adhesion Properties of the Lightguide, Film, Cladding, or Other Layer

In one embodiment, one or more of the lightguide, the core material, the light transmitting film, the cladding material, and a layer disposed in contact with a layer of the film has adhesive properties or includes a material with one or more of the following: chemical adhesion, dispersive adhesion, electrostatic adhesion, diffusive adhesion, and mechanical adhesion to at least one element of the light emitting device (such as a carrier film with a coating, an optical film, the rear polarizer in an LCD, a brightness enhancing film, another region of the lightguide, a coupling lightguide, a thermal transfer element such as a thin sheet including aluminum, or a white reflector film) or an element external to the light emitting device such as a window, wall, or ceiling.

Light Redirecting Element Disposed to Redirect Light from the Lightguide

In one embodiment, a light emitting device includes a lightguide with light redirecting elements disposed on or within the lightguide and light extraction features disposed in a predetermined relationship relative to one or more light redirecting elements. In another embodiment, a first portion of the light redirecting elements are disposed above a light extraction feature in a direction substantially perpendicular to the light emitting surface, lightguide, or lightguide region.

Light Redirecting Element

As used herein, the light redirecting element is an optical element which redirects a portion of light of a first wavelength range incident in a first angular range into a second angular range different than the first. In one embodiment, the light redirecting element includes at least one element selected from the group: refractive features, totally internally reflected feature, reflective surface, prismatic surface, microlens surface, diffractive feature, holographic feature, diffraction grating, surface feature, volumetric feature, and lens. In a further embodiment, the light redirecting element includes a plurality of the aforementioned elements. The plurality of elements may be in the form of a 2-D array (such as a grid of microlenses or close-packed array of microlenses), a one-dimensional array (such as a lenticular lens array), random arrangement, predetermined non-regular spacing, semi-random arrangement, or other predetermined arrangement.

Reduction of Excess Width Region

In one embodiment, the width of the light mixing region and/or lightguide region where the array of coupling lightguides meet the light mixing region and/or lightguide region, respectively, is reduced or tapered to meet the total width of the array of coupling lightguides in the array direction.

Redirecting Light in the Light Mixing Region

In one embodiment, a light transmitting material is added to the surface of the lightguide in the light mixing region to create areas that guide or reflect the light in sub-regions of the light mixing regions to reduce angular shadows. For example, in one embodiment, clear parallel stripes are printed on the surface of the light mixing region parallel to the optical axis of light (or perpendicular to the array direction of the coupling lightguides) to create additional total internal reflection light guides for the light that enters into the sub-regions. These sub-regions may be used to direct portions of the light within the light mixing region independently by "tapping" the light into the printed sub-regions and the shape and length of the sub-regions determine where the light is guided. The light transmitting areas added may be thick lines, curved lines, dot patterns, expanding or reducing in width toward the light emitting region, parallel areas such as lines, lines or features at an angle to each other, or lines or areas that direct more light toward the excess width region (where it may subsequently reflect toward the light emitting region) or toward features that reflect light such that it indirectly appears to originate from the excess width region from a particular direction.

Plurality of Reflecting Surfaces Between Lateral Edges

In one embodiment, the film-based lightguide comprise a plurality of reflecting surfaces (such as linear reflecting surfaces) in at least a portion of the light mixing region of the film-based lightguide of the light emitting device between the lateral edges of the film. In one embodiment, one or more of this plurality of reflecting surfaces guide light by total internal reflection toward one or more of the lateral edges of the film and may provide additional spatial mixing of light and/or redirection of light from the coupling lightguides in the light mixing region in a direction parallel to the array direction of the array of coupling lightguides. The reflecting surfaces may be disposed on or within a film-based lightguide, such as a film with an average thickness less than 250 micrometers. The plurality of reflecting surfaces may be formed, for example, by printing or depositing a light transmitting material on one or more surfaces of the film-based lightguide, scribing or cutting the film to form a cut with a component in the thickness direction of the film where the cut may or may not pass through the film, or embossing or forming a film with reflective surfaces that form plurality of reflecting surfaces.

In one embodiment, the plurality of reflective surfaces increase the spatial luminance uniformity in the light mixing region and thus the light emitting region in a direction parallel to the array direction of the array of coupling lightguides due to propagation of the light from the light mixing region to the light emitting region. The plurality of reflecting surfaces may increase this uniformity by creating additional reflective surfaces with components in the thickness direction and a direction orthogonal to the array direction of the array of coupling lightguides with a pitch higher than that of the pitch of the array of coupling lightguides.

Interior Light Directing Edges Forming a Plurality of Reflecting Surfaces

In one embodiment, the plurality of reflecting surfaces are formed in the interior region of the film in the light mixing region of the lightguide by slicing, cutting, etching, ablating, removing material, embossing, or molding (such as injection molding) the film to form reflecting surfaces (such as total internal reflection surfaces) with a component in the thickness direction of the film that reflect light from the coupling lightguides in direction parallel to the array direction of the array of coupling, toward a lateral edge of the lightguide in the light mixing region, and/or toward an excess width region of the light mixing region or light emitting region.

In one embodiment, the plurality of reflecting surfaces are positioned at least in a portion of the light mixing region of the film-based lightguide. In one embodiment, all or a portion of the plurality of reflecting surfaces extend into the light emitting region. In one embodiment, at least a portion of the plurality of reflecting surfaces are positioned along the film between the coupling lightguides and the light emitting region of the film. In another embodiment, at least a portion of the plurality of reflecting surfaces extend into regions of the light mixing region of the film that extend beyond the lateral edges of the film in the light emitting region of the film. In a further embodiment, at least a portion of the plurality of reflecting surfaces are positioned on a first surface of the film-based lightguide closer to a reflective spatial light modulator, a second surface of the film-based lightguide further away from the reflective spatial light modulator, and/or on two opposing extended surfaces of the film-based lightguides.

Orientation of the Plurality of Reflecting Surfaces

In one embodiment, the plurality of reflecting surfaces are oriented substantially in the same plane parallel to the surface of the film in the light mixing region. In one embodiment, the plurality of reflecting surfaces are oriented with a portion of the plurality of reflecting surfaces having a component parallel to a thickness direction of the film. In another embodiment, all or a portion of the plurality of reflecting surfaces are oriented in a plane perpendicular to the thickness direction of the film at a first reflecting surface orientation angle from a direction perpendicular to the array direction of the array of coupling lightguides selected from the group: 0 degrees, less than 5 degrees, less than degrees, less than 20 degrees, greater than 5 degrees, greater than 10 degrees, greater than 20 degrees, greater than 30 degrees, and greater than 45 degrees.

Interior Light Directing Edges or Guides to Direct Light in Lightguide Region or Light Emitting Region In one embodiment, the lightguide region and/or light emitting region comprises one or more interior light directing edges and/or light transmitting guides (such as printed sub-regions of a light transmitting material as disclosed above with respect to the light mixing region) to reflect light into specific spatial locations with specific angular profiles such that they reflect more light toward the excess width region (which may subsequently reflected toward the light emitting region) or toward features (such as other interior light directing edges, lateral film edges, or light scattering materials) that reflect light such that it indirectly appears to originate from the excess width region. As with the light mixing region or lightguide region, the light emitting region may have interior light directing edges, lateral film edges, printed guides, or light scattering materials that reflect or direct light to the excess width region representing the area region of the display or light emitting region that extends past the array of coupling lightguides in the array direction of the array of coupling lightguides. In one embodiment, the shape of the display or light emitting region is in the shape of one or more selected from the group: circle, oval, square, rectangle, triangle, parallelogram, pentagon, hexagon, heptagon, octagon, nonagon, decagon, hendecagon, dodecagon, tridecagon, tetradecagon, pentadecagon, polygon, and combination of two or more polygons.

Illuminating the Light Emitting Area from Many Directions

In one embodiment, the light emitting region and or display is illuminated from coupling lightguides or light mixing regions extending from the light emitting region or lightguide region on opposite sides, neighboring sides, or along a curve or other sides of the light emitting region, lightguide region, or display such that the coupling lightguides and/or light mixing regions along the sides are folded behind the display. For example, in one embodiment, a watch comprises an octagonal display and the lightguide has an octagonal light emitting area where along four adjacent sides light mixing regions of the film extend from the light emitting region (or lightguide region comprising the light emitting region) and are folded at different fold angles, optionally corresponding to the angle of the side of the display, behind the display where each light mixing region may comprise an array of coupling lightguides. Similarly, a circular or oval-shaped light emitting region and/or display may have arcuate sections of the light mixing region or sections of coupling lightguides along the light emitting region or lightguide region that may be folded behind and optionally stacked to optionally a single light source such as a light emitting diode.

Location of the Film-Based Lightguide

In one embodiment, the core region of the film-based lightguide is positioned between two layers selected from the group: hardcoating substrate, layer, or adhesive; anti-glare layer or anti-reflection layer, substrate or adhesive; color filter material, layer, substrate, or adhesive; first cladding of the lightguide; second cladding of the lightguide; cladding substrate or adhesive; film-based lightguide adhesive; electro-optic layer (such as liquid crystal layer or electrophoretic layer, for example); viewer side substrate for the electro-optic layer; substrate for the electro-optic layer on non-viewer side; adhesive or substrate for the electro-optic layer; reflective material, film, layer, or substrate or adhesive for reflective layer; polarizer layer substrate, or adhesive for polarizer; light redirecting layer; light extraction feature film; impact protection layer; internal coating; conformal coating; circuit board; flexible connector; thermally conducting film, layer (such as a stainless steel, copper, or aluminum foil layer), substrate, or adhesive; sealant layer, film substrate or adhesive; air gap layer; spacer layer or substrate for the spacer layer; electrically conducting layer (transparent or opaque), substrate, or adhesive; anode layer, substrate, or adhesive for anode layer; cathode layer, substrate or adhesive for cathode layer; active matrix layer, substrate or adhesive for active matrix layer; passive matrix layer, substrate or adhesive for passive matrix layer; and touchscreen layer, substrate for touchscreen, or adhesive for touchscreen layer. In another embodiment, the film-based lightguide functions as one or more of the aforementioned layers in addition to propagating light in a waveguide condition.

In one embodiment, the film based lightguide is positioned between the color filter layer and the electro-optical layer such that the parallax effects due to high angle light are minimized (thus resulting in higher contrast, greater resolution, or increased brightness). In another embodiment, the film-based lightguide is the substrate for the color filter material or layer. In another embodiment, the film-based lightguide is the substrate for the electro-optic material or layer.

In one embodiment, the distance between the light extraction features and the color filters in a multi-color display is minimized by positioning the film-based lightguide within the display or using the film-based lightguide as a substrate for a layer or material of the display (such as, for example, the substrate for the color filter layer, transparent conductor layer, adhesive layer, or electro-optical material layer). In one embodiment, the light emitting device includes a plurality of light absorbing adhesive regions that adhere to one or more layers of the display or film-based lightguide (such as on the cladding layer of the film-based lightguide or on the electro-optical material layer).

In one embodiment, the light emitting device includes a film-based lightguide and a force sensitive touchscreen wherein the film based lightguide is sufficiently thin to permit a force sensitive touchscreen to function by finger pressure on the display.

In one embodiment, a film-based lightguide frontlight is disposed between a touchscreen film and a reflective spatial light modulator. In another embodiment, a touchscreen film is disposed between the film-based lightguide and the reflective spatial light modulator. In another embodiment, the reflective spatial light modulator, the film-based lightguide frontlight and the touchscreen are all film-based devices and the individual films may be laminated together. In another embodiment, the light transmitting electrically conductive coating for the touchscreen device or the display device is coated onto the film-based lightguide frontlight. In a further embodiment, the film-based lightguide is physically coupled to the flexible electrical connectors of the display or the touchscreen. In one embodiment, the flexible connector is a "flexible cable", "flex cable," "ribbon cable," or "flexible harness" including a rubber film, polymer film, polyimide film, polyester film or other suitable film.

In one embodiment, a reflective display includes one or more film-based lightguides disposed within or adjacent to one or more regions selected from the group: the region between the touchscreen layer and the reflective light modulating pixels, the region on the viewing side of the touchscreen layer, the region between a diffusing layer and the reflective light modulating pixels, the viewing side of the diffusing layer in a reflective display, the region between a diffusing layer and the light modulating pixels, the region between the diffusing layer and the reflective element, the region between the light modulating pixels and a reflective element, the viewing side of a substrate for a component or the light modulating pixels, the reflective display, between the color filters and the spatial light modulating pixels, the viewing side of the color filters, between the color filters and the reflective element, the substrate for the color filter, the substrate for the light modulating pixels, the substrate for the touchscreen, the region between a protective lens and the reflective display, the region between a light extraction layer and the light modulating pixels, the region on the viewing side of a light extraction layer, the region between an adhesive and a component of a reflective display, and between two or more components of a reflective display known in the art. In the aforementioned embodiment, the film-based lightguide may include volumetric light extraction features or light extraction features on one or more surfaces of the lightguide and the lightguide may include one or more lightguide regions, one or more cladding regions, or one or more adhesive regions.

In one embodiment, the film-based lightguide is folded around a first edge of the active area of a reflective spatial light modulator behind a reflective spatial light modulator and one or more selected from the group: a touchscreen connector, touchscreen film substrate, reflective spatial light modulator connector, and reflective spatial light modulator film substrate is folded behind the first edge, a second edges substantially orthogonal to the first edge, or an opposite edge to the first edge. In the aforementioned embodiment, a portion of the lightguide region, light mixing region, or coupling lightguide includes the bend region of the fold and may extend beyond the reflective spatial light modulator flexible connector, reflective spatial light modulator substrate, touchscreen flexible connector or touchscreen flexible substrate.

Orientation of Light within the Display

In one embodiment, a film-based lightguide illumination device illuminates a spatial light modulator (from the viewer side, from the side opposite the viewer, or from within the display) at a display illumination angle within the layer or material adjacent the electro-optical material or layer of the spatial light modulator in a first illumination plane. As used herein, the display illumination angle is defined as the angle of peak intensity from the surface normal of the spatial light modulating component or layer measured (or calculated) within the layer or material adjacent (on the viewer side) the spatial light modulating component or layer (such as for example, the electro-optical elements of an electrophoretic display, or liquid crystal layer in a liquid crystal display) in a first illumination plane. In one embodiment, the display illumination angle is less than one selected from the group: 60, 50, 40, 30, 20, 10, and 5 degrees. In one embodiment, the first illumination plane is parallel to the extended direction of the coupling lightguides. In another embodiment, the first illumination plane is perpendicular to the extended direction of the coupling lightguides.

In another embodiment, a film-based lightguide illumination device illuminates a color filter layer or material (from the viewer side, from the side opposite the viewer, or from within the display) at a color filter illumination angle within the material or layer adjacent the color filter layer or material in a first illumination plane. As used herein, the color filter illumination angle is defined as the angle of peak intensity from the surface normal of the color filter layer or material measured (or calculated) within the layer or material adjacent (on the viewer side) the color filter layer or material (such as for example, a red, green, and blue array of color filter materials in an electrophoretic display) in a first illumination plane. In one embodiment, the color filter illumination angle is less than one selected from the group: 70, 60, 50, 40, 30, 20, 10, and 5 degrees.

As used herein, the lightguide illumination angle in a first illumination plane is the peak angular intensity of light exiting the film-based lightguide (due to extraction features) measured or calculated within the core layer (or within the cladding layer if present) from the normal to the light emitting device surface (or normal to the film-based lightguide surface). In one embodiment, the lightguide illumination angle is less than one selected from the group: 70, 60, 50, 40, 30, 20, 10, and 5 degrees in a first illumination plane. In one embodiment the lightguide illumination angle is the same as the display illumination angle or the color filter illumination angle.

In another embodiment, the angular bandwidth illumination angle is the full angular width at half maximum intensity of the light exiting the film-based lightguide due to extraction features measured or calculated within the core layer (or within the cladding layer if present) in a first illumination plane from the normal to the light emitting device surface. In one embodiment, the angular bandwidth illumination angle is less than one selected from the group: 60, 50, 40, 30, 20, 10, and 5 degrees in a first illumination plane.

Backlight or Frontlight

In one embodiment, the film-based lightguide illuminates a display, forming an electroluminescent display. In one embodiment, the film based lightguide is a frontlight for a reflective or transflective display. In another embodiment, the film-based lightguide is a backlight for a transmissive or transflective display. Typically, with displays including light emitting lightguides for illumination, the location of the lightguide will determine whether or not it is considered a backlight or frontlight for an electroluminescent display where traditionally a frontlight lightguide is a lightguide disposed on the viewing side of the display (or light modulator) and a backlight lightguide is a lightguide disposed on the opposite side of the display (or light modulator) than the viewing side. However, the frontlight or backlight terminology to be used can vary in the industry depending on the definition of the display or display components, especially in the cases where the illumination is from within the display or within components of the spatial light modulator (such as the cases where the lightguide is disposed in-between the liquid crystal cell and the color filters or in-between the liquid crystal materials and a polarizer in an LCD). In some embodiments, the lightguide is sufficiently thin to be disposed within a spatial light modulator, such as between light modulating pixels and a reflective element in a reflective display. In this embodiment, light can be directed toward the light modulating pixels directly or indirectly by directing light to the reflective element such that is reflects and passes through the lightguide toward the spatial light modulating pixels. In one embodiment, a lightguide emits light from one side or both sides and with one or two light distribution profiles that contribute to the "front" and/or "rear" illumination of light modulating components. In embodiments disclosed herein, where the light emitting region of the lightguide is disposed between the spatial light modulator (or electro-optical regions of the pixels, sub-pixels, or pixel elements) and a reflective component of a reflective display, the light emitting from the light emitting region may propagate directly toward the spatial light modulator or indirectly via directing the light toward a reflective element such that the light reflected passes back through the lightguide and into the spatial light modulator. In this specific case, the terms "frontlight" and "backlight" used herein may be used interchangeably.

In one embodiment, a light emitting display backlight or frontlight includes a light source, a light input coupler, and a lightguide. In one embodiment, the frontlight or backlight illuminates a display or spatial light modulator selected from the group: transmissive display, reflective display, liquid crystal displays (LCD's), MEMs based display, electrophoretic displays, cholesteric display, time-multiplexed optical shutter display, color sequential display, interferometric modulator display, bistable display, electronic paper display, LED display, TFT display, OLED display, carbon nanotube display, nanocrystal display, head mounted display, head-up display, segmented display, passive matrix display, active matrix display, twisted nematic display, in-plane switching display, advanced fringe field switching display, vertical alignment display, blue phase mode display, zenithal bistable device, reflective LCD, transmissive LCD, electrostatic display, electrowetting display, bistable TN displays, micro-cup EPD displays, grating aligned zenithal display, photonic crystal display, electrofluidic display, and electrochromic displays.

LCD Backlight or Frontlight

In one embodiment, a backlight or frontlight suitable for use with a liquid crystal display panel includes at least one light source, light input coupler, and lightguide. In one embodiment, the backlight or frontlight includes a single lightguide wherein the illumination of the liquid crystal panel is white. In another embodiment, the backlight or frontlight includes a plurality of lightguides disposed to receive light from at least two light sources with two different color spectra such that they emit light of two different colors. In another embodiment, the backlight or frontlight includes a single lightguide disposed to receive light from at least two light sources with two different color spectra such that they emit light of two different colors. In another embodiment, the backlight or frontlight includes a single lightguide disposed to receive light from a red, green and blue light source. In one embodiment, the lightguide includes a plurality of light input couplers wherein the light input couplers emit light into the lightguide with different wavelength spectrums or colors. In another embodiment, light sources emitting light of two different colors or wavelength spectrums are disposed to couple light into a single light input coupler. In this embodiment, more than one light input coupler may be used, and the color may be controlled directly by modulating the light sources.

Reflective Display

The lightguides disclosed herein may be used to illuminate a reflective display. In one embodiment, a reflective display comprises a first reflective surface and a film-based lightguide comprising a plurality of coupling lightguides. In this embodiment, the reflective display may be a diffusely reflective spatial light modulator or a specularly reflecting spatial light modulator. For example, a diffusely reflective spatial light modulator can include a reflective display such as an electrophoretic particle based reflective display and a specularly reflecting spatial light modulator can include a reflective LCD with specularly reflecting rear electrodes. The reflective spatial light modulator, or a component of the light emitting device, lightguide, or a coating or layer positioned within, may include a light scattering or diffusive surface or volumetric light scattering particles or domains. In one embodiment, the light emitting device is a frontlight for a watch that comprises a reflective display. In another embodiment, the largest dimension in a plane orthogonal to the thickness direction of the lightguide or display of the light emitting region is less than one selected from the group of 100, 75, 50, 40, 30, and 25 millimeters.

Modes of the Light Emitting Device

In another embodiment, a light emitting device includes one or more modes selected from the group: normal viewing mode, daytime viewing mode, high brightness mode, low brightness mode, nighttime viewing mode, night vision or NVIS compatible mode, dual display mode, monochrome mode, grayscale mode, transparent mode, full color mode, high color gamut mode, color corrected mode, redundant mode, touchscreen mode, 3D mode, field sequential color mode, privacy mode, video display mode, photo display mode, alarm mode, nightlight mode, emergency lighting/sign mode. In one embodiment, a head-mounted display (HMD) comprises the film-based lightguide, wherein the light output from the light emitting area provides illumination to an amplitude or phase spatial light modulator.

Multiple Light Emitting Areas or Displays

In one embodiment, the light emitting device includes two or more light emitting areas or displays defined by regions with one or more properties selected from the group: emit different color gamuts; emit light within different functional areas of the display; emit light with different angular properties; emit light to illuminate a button, key, keyboard area, or other user interface region; have different sizes or shapes; and are positioned on different sides or surfaces of the device. In one embodiment, the light emitting device includes two or more light emitting regions with different use modes or different illumination modes.

Light Emitting Device Assembly

In one embodiment, the film-based lightguide is adhered to a display, component of a display, or other component of a light emitting device using lamination and/or one or more of the following: addition of pressure, addition of heat, laminating a coated layer or region, laminating to a relative position maintaining element, and coating an adhesive onto a substrate or component and joining one component to another.

In one embodiment, the adhesive functions as a cladding between the core region of the lightguide and another component and reduces the flux of light absorbed by the RPME due to the lightguide contacting the RPME.

Method of Manufacturing Light Input/Output Coupler

In one embodiment, the lightguide and light input or output coupler are formed from a light transmitting film by creating segments of the film corresponding to the coupling lightguides and translating and bending the segments such that a plurality of segments overlap. In a further embodiment, the input surfaces of the coupling lightguides are arranged to create a collective light input surface by translation of the coupling lightguides to create at least one bend or fold.

Film Production

In one embodiment, the film or lightguide is one selected from the group: extruded film, co-extruded film, cast film, solvent cast film, UV cast film, pressed film, injection molded film, knife coated film, spin coated film, and coated film. In one embodiment, one or two cladding layers are co-extruded on one or both sides of a lightguide region. In another embodiment, tie layers, adhesion promotion layers, materials or surface modifications are disposed on a surface of or between the cladding layer and the lightguide layer. In one embodiment, the coupling lightguides, or core regions thereof, are continuous with the lightguide region of the film as formed during the film formation process. For example, coupling lightguides formed by slicing regions of a film at spaced intervals can form coupling lightguides that are continuous with the lightguide region of the film. In another embodiment, a film-based lightguide with coupling lightguides continuous with the lightguide region can be formed by injection molding or casting a material in a mold including a lightguide region with coupling lightguide regions with separations between the coupling lightguides. In one embodiment, the region between the coupling lightguides and lightguide region is homogeneous and without interfacial transitions such as without limitation, air gaps, minor variations in refractive index, discontinuities in shapes or input-output areas, and minor variations in the molecular weight or material compositions.

In another embodiment, at least one selected from the group: lightguide layer, light transmitting film, cladding region, adhesive region, adhesion promotion region, or scratch resistant layer is coated onto one or more surfaces of the film or lightguide. In another embodiment, the lightguide or cladding region is coated onto, extruded onto or otherwise disposed onto a carrier film. In one embodiment, the carrier film permits at least one selected from the group: easy handling, fewer static problems, the ability to use traditional paper or packaging folding equipment, surface protection (scratches, dust, creases, etc.), assisting in obtaining flat edges of the lightguide during the cutting operation, UV absorption, transportation protection, and the use of winding and film equipment with a wider range of tension and flatness or alignment adjustments. In one embodiment, the carrier film is removed before coating the film, before bending the coupling lightguide, after folding the coupling lightguides, before adding light extraction features, after adding light extraction features, before printing, after printing, before or after converting processes (further lamination, bonding, die cutting, hole punching, packaging, etc.), just before installation, after installation (when the carrier film is the outer surface), and during the removal process of the lightguide from installation. In one embodiment, one or more additional layers are laminated in segments or regions to the core region (or layers coupled to the core region) such that there are regions of the film without the one or more additional layers. For example, in one embodiment, an optical adhesive functioning as a cladding layer is optically coupled to a touchscreen substrate; and an optical adhesive is used to optically couple the touchscreen substrate to the light emitting region of film-based lightguide, thus leaving the coupling lightguides without a cladding layer for increased input coupling efficiency.

Relative Position Maintaining Element

In one embodiment, at least one relative position maintaining element substantially maintains the relative position of the coupling lightguides in the region of the first linear fold region, the second linear fold region or both the first and second linear fold regions. In one embodiment, the relative position maintaining element is disposed adjacent the first linear fold region of the array of coupling lightguides such that the combination of the relative position maintaining element with the coupling lightguide provides sufficient stability or rigidity to substantially maintain the relative position of the coupling lightguides within the first linear fold region during translational movements of the first linear fold region relative to the second linear fold region to create the overlapping collection of coupling lightguides and the bends in the coupling lightguides.

In a further embodiment, the relative position maintaining element disposed proximal to the first linear fold region has a cross-sectional edge in a plane parallel to the light transmitting film surface disposed proximal to the first linear fold region that includes a substantially linear section oriented at an angle greater than 10 degrees to the first linear fold region for at least one coupling lightguide. In a further embodiment, the relative position maintaining element has saw-tooth-like teeth oriented substantially at 45 degrees to a linear fold region of the coupling lightguides. In one embodiment, the cross-sectional edge of the relative position maintaining element forms a guiding edge to guide the bend of at least one coupling lightguide.

In one embodiment, the RPME includes a spine configured to support an array of alignment guides or angled teeth. In another embodiment, the spine of an RPME connects an array of angled teeth wherein the spine does not extend past the angled teeth portion of the RPME.

Guide for Bend or Fold

In one embodiment, a lightguide or light emitting device comprises a guide (also referred to herein as a guide element) for one or more bends or folds. In this embodiment, the guide is an element with at least one curved surface adjacent a curved inner surface of the film at the bend. In one embodiment, the guide limits the radius of curvature of the bend or fold such that the film does not crease, tear, craze, or crack in the fold or bend region. In one embodiment, the curved surface of the guide is in contact with the inner surface of the film and when tension is applied to the film (such as when a film is pulled behind itself), the guide surface ensures a minimum radius of curvature for the film. In one embodiment, the guide can help protect against crushing, creasing, or wrinkling of the film during handling, device assembly, or during the folding or bending step. In one embodiment, a lightguide comprises a film with a light emitting region and an array of coupling lightguides extending from a body of the film and the film or is folded behind itself at a first fold; and a guide comprising a first curved surface adjacent an inner surface of the film (such as the light emitting region, light mixing region, or one or more coupling lightguides) at the first fold. In one embodiment, a lightguide comprises a film with a light mixing region disposed along the film between the light emitting region and an array of coupling lightguides extending from the film, the light mixing region is folded at a first fold such that a portion of the light mixing region is behind the light emitting region; and a first guide with a first curved surface adjacent an inner surface of the light mixing region of the film. In another embodiment, the light emitting region of the film folds behind itself at a first fold and the guide is positioned adjacent the light emitting region at the fold.

The guide may be formed from a metal, polymer, plastic, rubber, foam rubber, glass, inorganic material, organic material, or a combination thereof. In one embodiment, the guide is a component located within the fold or bend of the film and may be free-standing, physically coupled, operatively coupled, or mechanically coupled to a component of the device. The guide may be solid or hollow. In one embodiment the guide is a surface of a device element such as the film, display, display substrate, glass substrate, glass substrate of a display, display frame, backlight frame, frontlight frame, light fixture frame, display lens or cover, display module, housing, housing for the light input coupler, frame, circuit board, electrical or mechanical connector, a hinge, a gasket, connector, relative position maintaining element, component of the light emitting device, thermal transfer element (such as a heat sink), or rolled-up portion of the film (such as a light mixing region wrapped around the coupling lightguides to form a shape with a curved surface that is used for the guide). In another embodiment, the guide is a separate component comprising a curved surface adjacent the inner surface of the film at the fold or bend wherein the guide is operatively coupled, physically coupled, adhered, or glued to one or more components selected from the group: film, display, display substrate, glass substrate, glass substrate of a display, display frame, backlight frame, frontlight frame, light fixture frame, display lens or cover, display module, housing, housing for the light input coupler, frame, circuit board, electrical or mechanical connector, a hinge, a gasket, connector, relative position maintaining element, thermal transfer element, component of the light emitting device, and an intermediate component operatively coupled to one or more of the aforementioned components.

Guide Surface

In one embodiment, the surface of the guide adjacent the inner surface of the film at the fold or bend is curved in a first plane comprising the fold or bend of the film. In one embodiment, the curved surface of the guide or a portion of the curved surface of the guide adjacent the inner surface of the film at the fold or bend in a plane comprising the fold or bend of the film comprises a subtended angle from a point at the midpoint of the line between a point on the inner surface of the film at the start of the fold or bend and the point on the inner surface of the film at the end of the fold or bend, and the subtended angle is one or more selected from the group: greater than 45 degrees, greater than 80 degrees, 90 degrees, greater than 90 degrees, greater than 135 degrees, 180 degrees, greater than 180 degrees, greater than 270 degrees, between 45 degrees and 360 degrees, between 80 degrees and 360 degrees, between 80 degrees and 270 degrees.

In one embodiment, the cross-sectional shape of the surface of the guide adjacent the inner surface of the film in the fold or bend region comprises all, a portion, or a combination of a circle, semicircle, oval, ellipse, parabola, or hyperbola.

In one embodiment, the curved surface of the guide or a portion of the curved surface of the guide adjacent the inner surface of the film at the fold or bend in a plane comprising the fold or bend of the film has a radius of curvatures or average radius of curvature less than one selected from the group: 1, 2, 4, 8, 10, 20, 30, 50, 100, 200 and 400 millimeters. In embodiments where the radius of curvature of the surface of the guide is not uniform, the average radius of curvature is the average radius of curvature of the surface in the region of the surface of the guide adjacent the inner surface of the film. In another embodiment the curved surface of the guide or the portion of the curved surface of the guide adjacent the inner surface of the film at the fold or bend has a radius of curvatures or average radius of curvature greater than one selected from the group: 1, 2, 4, 8, 10, 20, 30, 50, 100, 200 and 400 millimeters. In this embodiment, the guide can maintain the minimum radius of curvature for the film at the fold to 4 millimeters, for example.

In one embodiment, the curved surface of the guide or a portion of the curved surface of the guide adjacent the inner surface of the film at the fold or bend in a plane comprising the fold or bend of the film has a radius of curvatures or average radius of curvature less than one selected from the group: 2, 4, 8, 10, 20, 30, and 50 times the average thickness of the film at the fold or bend. In another embodiment the curved surface of the guide or the portion of the curved surface of the guide adjacent the inner surface of the film at the fold or bend has a radius of curvatures or average radius of curvature greater than one selected from the group: 0.5, 1, 2, 3, 4, 8, 10, 20, and 30 times the average thickness of the film at the fold or bend. In this embodiment, the guide can maintain the minimum radius of curvature for the film at the fold to greater than 2 times the average thickness of the film at the fold or bend, for example.

In one embodiment, a reflective display comprises reflective spatial light modulator (SLM), a frontlight comprising a film with a light emitting region positioned adjacent a top surface of the reflective SLM on the viewing side of the reflective SLM and configured to extract light toward the reflective SLM, wherein the film is folded behind and adjacent a bottom surface of the reflective SLM at a first fold and the ratio of the radius of curvature or average radius of curvature of a surface of the guide adjacent the inner surface of the film at the fold in a plane comprising the fold to the thickness of the reflective SLM from the top surface to the bottom surface in a plane comprising the fold is greater than one selected from the group: 0.5, 0.75, 1, 1.25, 1.5, 1.75, 2, 2.5, 3, 3.5, 4, 4.5, 5, 6, 7, 8, 9, and 10.

In one embodiment, the inner surface of the film is in contact with the outer surface of the guide at the fold or bend and, in a plane comprising the fold or bend, the radius of curvature or average radius of curvature of the film at the fold or bend along the inner film surface in contact with the outer surface of the guide is substantially the same as the radius of curvature or average radius of curvature of the outer guide surface in contact with the inner surface of the film at the fold or bend.

In one embodiment, the surface of the guide adjacent the film at the fold or bend is smooth, rough, comprises surface undulations, surface grooves, surface pits, or raised surface relief structures. In one embodiment, the non-smooth surface reduces the surface area of the guide in contact with the film and can reduce the friction when the film is pulled or folded behind itself while maintaining a minimum radius of curvature for the fold or bend.

In one embodiment, the cross-section of the guide at the surface of the guide adjacent the inner surface of the film at the fold or bend in a plane comprising the fold or bend is substantially constant in a direction perpendicular to the plane comprising the fold or bend. For example, in one embodiment, the guide has a shape of substantially half of a rod with a semicircular cross-section, with a length more than three times it's width in a plane comprising the fold of the film, and a surface adjacent the inner surface of the film with a cross-section comprising an arc subtending 180 degrees in the plane comprising the fold.

Frame

In one embodiment, one or more relative position maintaining elements are operatively coupled to a frame. In one embodiment, the frame includes a perimeter region and an interior opening. The interior opening can reduce the weight and material costs of the frame, relative to a sheet, for example. In one embodiment, the frame is thermally coupled to a light source such that the frame transfers heat away from the light source through conduction. For example, in one embodiment, the light source is an LED and is thermally coupled to a metal core circuit board that is thermally coupled to the frame. In another embodiment, a light emitting device includes a film-based lightguide that is operatively coupled to the frame. For example, in one embodiment, the film-based lightguide is adhered along one or more sides of a frame. In another embodiment, the length and width of the frame are greater than 5 times the average thickness of the frame. In another embodiment, the frame has a top surface opposite the bottom surface in the thickness direction and the film-based lightguide is operatively coupled to the frame on the top surface, the bottom surface, or both the top and bottom surfaces. In another embodiment, the film-based lightguide is operatively coupled to the top surface and the bottom surface of the frame along the same surface of the lightguide. In one embodiment, the film is operatively coupled to the frame through an intermediate material or component, such as film, optical film, reflective film, frame clamp, fastener, adhesive, housing or housing component, or other element of the light emitting device. In another embodiment, the lightguide is operatively coupled to the frame such that the frame prevents the lightguide from unfolding due to residual stress remaining in the lightguide. In another embodiment, the frame includes one or more curved surfaces or edges along one or more sides to increase the contact surface of the frame with the film-based lightguide and reduce the likelihood of a tear. In one embodiment, a frame includes a curved region with a radius of curvature less than one selected from the group: 1, 2, 4, 8, 10, 20, 30, 50, 100, 200 and 400 millimeters. In one embodiment, the width and/or the length dimension of the frame is greater than the corresponding length or width dimension of the light emitting area of the film-based lightguide. In another embodiment, the width and/or the length of the frame is equal to the corresponding length or width dimension of the light emitting area of the film-based lightguide. In one embodiment, the width and/or the length dimension of the frame is less than the corresponding length or width dimension of the light emitting area of the film-based lightguide. In another embodiment, the width and/or the length dimension of the frame is less than the corresponding length or width dimension of the light emitting area of the film-based lightguide corresponding to the area illuminating a display. In another embodiment, the length or width dimension of the relative position maintaining element is less than the distance between two attachment mechanisms operatively configured to couple to the relative position maintaining element along opposite sides of the frame.

Attachment Mechanisms for Securing Components to the Frame

In one embodiment, the frame includes a plurality of attachment mechanisms on one or more sides or internal regions that facilitate the coupling of the frame to one or more components selected from the group: one or more relative position maintaining elements, one or more light sources, one or more printed circuit boards, a housing, one or more films, one or more optical films, one or more reflective films, one or more film-based lightguides, one or more reflective displays, one or more transmissive displays, one or more transflective displays, a flexible electrical connector, one or more heat sinks, one or more thermal conducting elements, one or more optical elements, one or more batteries, one or more touch sensors (including switches or capacitive touch sensors), a touch screen, and a ground connector. In one embodiment, the attachment mechanism includes one or more fasteners selected from the group: holes, cavities, recessed regions, protrusions, pins, threaded fasteners, screws, bolts, nuts, screw holes, fixed or bendable tabs operatively configured to attach components, adhesive, clamps, clasps, flanges, latches, retainers, rivets, and stitches.

The following are more detailed descriptions of various embodiments illustrated in the Figures.

FIG. 1 is a top view of one embodiment of a light emitting device 100 including a light input coupler 101 disposed on one side of a film-based lightguide. The light input coupler 101 includes coupling lightguides 104 and a light source 102 disposed to direct light into the coupling lightguides 104 through a light input surface 103 including input edges of the coupling lightguides 104. In one embodiment, each coupling lightguide 104 terminates at a bounding edge. Each coupling lightguide is folded such that the bounding edges of the coupling lightguides are stacked to form the light input surface 103. The light emitting device 100 further includes a lightguide region 106 comprising a light mixing region 105, a film-based lightguide 107, and a light emitting region 108. Light from the light source 102 exits the light input coupler 101 and enters the lightguide region 106 of the film. This light spatially mixes with light from different coupling lightguides 104 within the light mixing region 105 as the light propagates through the film-based lightguide 107. In one embodiment, light is emitted from the film-based lightguide 107 in the light emitting region 108 due to light extraction features (not shown).

FIG. 2 is a perspective view of one embodiment of a light input coupler 200 with coupling lightguides 104 folded in the −y direction. Light from the light source 102 is directed into the light input surface 103 through or along light input edges 204 of the coupling lightguides 104. A portion of the light from the light source 102 propagating within the coupling lightguides 104 with a directional component in the +y direction will reflect in the +x and −x directions from the lateral edges 203 of the coupling lightguides 104 and will reflect in the +z and −z directions from the top and bottom surfaces of the coupling lightguides 104. The light propagating within the coupling lightguides is redirected by the folds 201 in the coupling lightguides 104 toward the −x direction.

FIG. 3 is a cross-sectional side view of one embodiment a light emitting display 1550 with a film-based lightguide 1551 physically coupled to a flexible display connector 1556. In this embodiment, the reflective spatial light modulator 1559 includes a bottom substrate 1554 and the film-based lightguide 1551 is a top substrate. Light 1552 from the light source 102 physically coupled to the flexible display connector 1556 is directed into the film-based lightguide 1551 and is redirected by light extraction features 1561 to the active layer 1553 where the light 1552 reflects and passes back through the film-based lightguide 1551, and the upper cladding layer 1557, and exits the light emitting display 1550.

FIG. 4 is a perspective view of one embodiment of a light emitting device 3800 including a film-based lightguide 3802 physically coupled to a flexible display connector 1556 for the reflective spatial light modulator 1559 with a light source 102 disposed on a circuit board 3805 physically coupled to the flexible display connector 1556. In this embodiment, the reflective spatial light modulator 1559 includes an active layer 1553 positioned between a bottom substrate 1554 and a top substrate 1650. The top substrate 1650 of the reflective spatial light modulator 1559 is optically coupled to the film-based lightguide 3802 using an adhesive cladding layer 3806.

Figure 5:
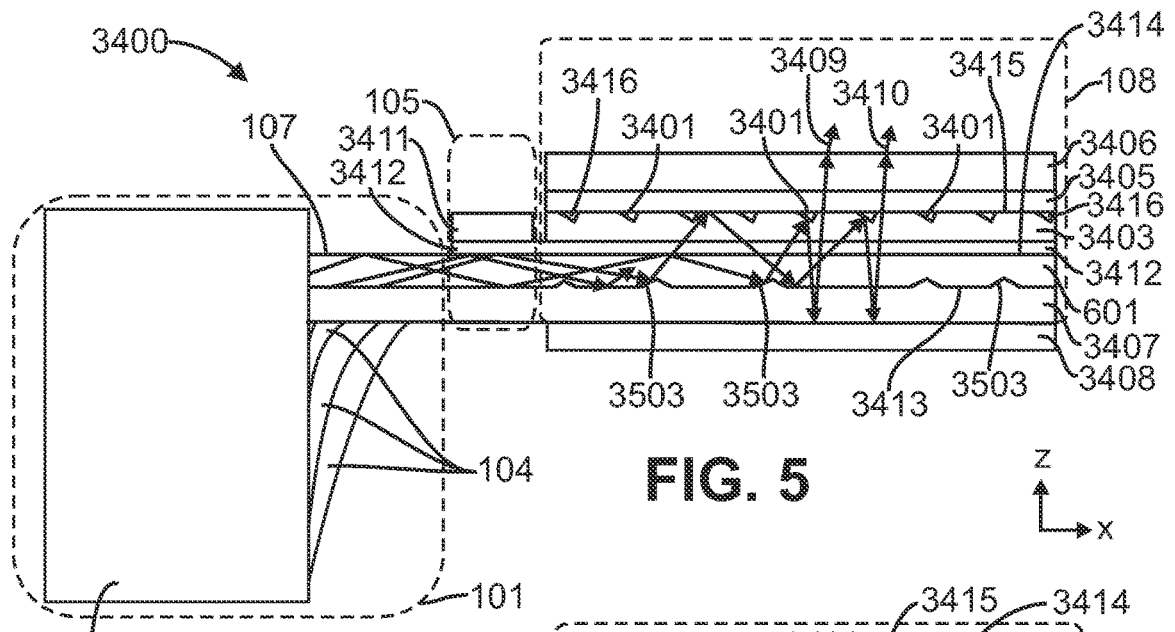
FIG. 5 is a cross-sectional side view of one embodiment of a light emitting device comprising low angle light directing features.

FIG. 5 is a cross-sectional side view of one embodiment of a light emitting device 3400 comprising the light input coupler 101, a film-based lightguide 107 comprising a core layer 601 of a core material with a core refractive index $n_{DL}$ optically coupled to a reflective spatial light modulator 3408 using a first pressure sensitive adhesive layer 3407 comprising a first material with a first refractive index $n_{D1}$. A light source 1102 with an optical axis parallel to the +y direction (into the page) is positioned to emit light into the folded stack of coupling lightguides 104. The film-based lightguide 107 comprises a plurality of low angle directing features 3503 on the lower surface 3413 of the core layer 601 of the film-based lightguide 107 and is optically coupled to a light turning film 3403 on the upper surface 3414 of the core layer 601 using a second pressure sensitive adhesive layer 3412 comprising a second material with a second refractive index $n_{D2}$. The light turning film 3403 comprises a plurality of light turning features 3401 on the top surface 3415 of the light turning film 3403 opposite the second pressure sensitive adhesive layer 3412. A third pressure sensitive adhesive layer 3405 optically couples a cover layer 3406 (such as a protective PET film or touchscreen film, for example) to the light turning film 3403 over a portion of the top surface 3415 such that air gaps 3416 are formed at the light turning features 3401. A light mixing region 105 is positioned between the light input coupler 101 and the light emitting region 108 of the light emitting device 3400. An opaque layer 3411 is optically coupled to the film-based lightguide 107 in the light mixing region 105 using the second pressure sensitive adhesive layer 3412. In this embodiment, the opaque layer 3411 is a light absorbing layer that absorbs at least 70% of the light within a wavelength range between 400 nanometers and 700 nanometers that reaches the opaque layer 3411 through the second pressure sensitive adhesive layer 3412. In this embodiment, first light 3409 and second light 3410 from the light source 1102 propagate through the coupling lightguides 104 within the light input coupler 101, totally internally reflect within the core layer 601 of the film-based lightguide 107 and propagate through the light mixing region 105 and into the light emitting region 108 of the film-based lightguide 107. First light 3409 reflects from a low angle directing feature 3503 to a second angle in the core layer 601 of the lightguide smaller than the incident angle by an average total angle of deviation of less than 20 degrees. In this embodiment, the second angle is less than the critical angle for the interface between the core layer 601 and second pressure sensitive adhesive layer 3412. In this embodiment, $n_{DL} > n_{D2} > n_{D1}$ such that the first light 3409 and the second light 3410 preferentially escape a total internal reflection condition within the core layer 601 of the film-based lightguide 107 on the upper surface 3414 of the core layer 601 since the refractive index, $n_{D2}$, of the second pressure sensitive adhesive layer 3412 is greater than the refractive index, $n_{D1}$, of the first pressure sensitive adhesive layer 3407. After transmitting from the core layer 601 into the second pressure sensitive adhesive layer 3412, the first light 3409 propagates into the light turning film 3403 and totally internally reflects from a light turning feature 3401 in the light turning film 3403 to an angle within degrees from the thickness direction (parallel to the z direction in this embodiment) of the film-based lightguide 107. The first light 3409 then propagates back through the light turning film 3403, the second pressure sensitive adhesive layer 3412, the core layer 601, and the first pressure sensitive adhesive layer 3407, reflects from the reflective spatial light modulator 3408, passes back through the aforementioned layers in the reverse order, does not interact a second time with a light turning feature 3401, and is emitted from the light emitting device 3400 in the light emitting region 108.

After being redirected by the low angle directing feature 3503, the second light 3410 propagates from the core layer 601 into the second pressure sensitive adhesive layer 3412 and into the light turning film 3403. The second light 3410 does not intersect a light turning feature 3401 on the first pass and totally internally reflects from the top surface 3415 of the light turning film 3403 between the light turning features 3401 and propagates back through the light turning film 3403, through the second pressure sensitive adhesive layer 3412, through the core layer 601 and totally internally reflects at the interface between the core layer 601 and the first pressure sensitive adhesive layer 3407, passes back through the aforementioned layers in reverse order and totally internally reflects from a light turning feature 3401 in the light turning film 3403 to an angle within 30 degrees from the thickness direction (parallel to the z direction in this embodiment) of the film-based lightguide 107. The second light 3410 then propagates back through the light turning film 3403, the second pressure sensitive adhesive layer 3412, the core layer 601, and the first pressure sensitive adhesive layer 3407, reflects from the reflective spatial light modulator 3408, passes back through the aforementioned layers in the reverse order, and is emitted from the light emitting device 3400 in the light emitting region 108.

Figure 6:
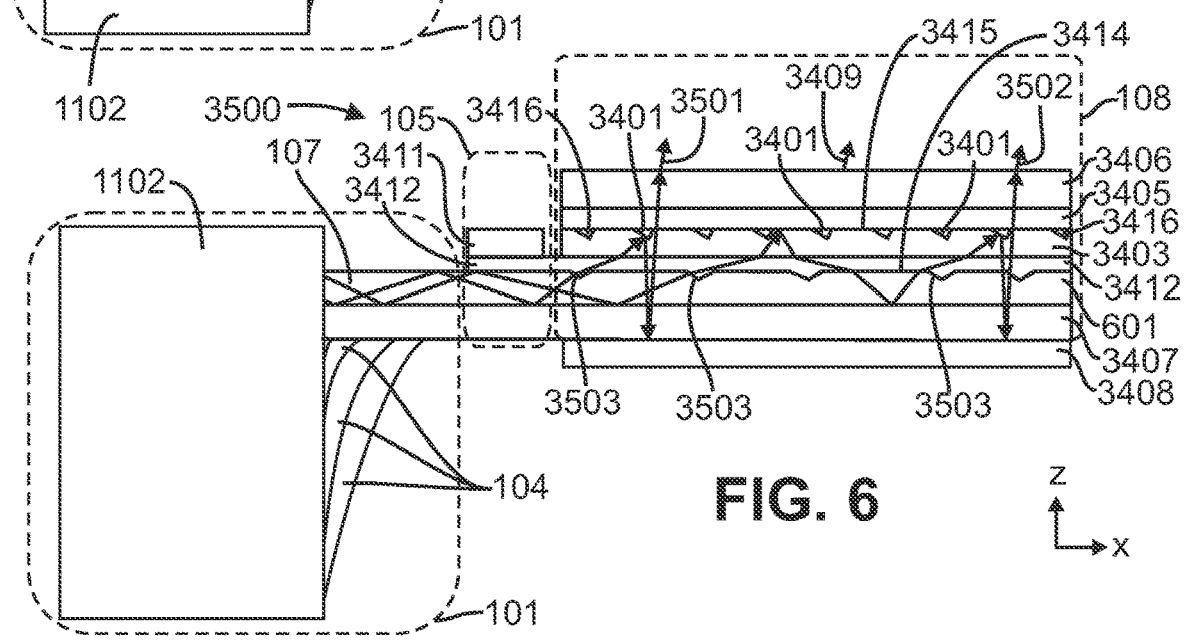
FIG. 6 is a cross-sectional side view of one embodiment of a light emitting device comprising light turning features.

FIG. 6 is a cross-sectional side view of one embodiment of a light emitting device 3500 comprising the light input coupler 101, a film-based lightguide 107 comprising a core layer 601 of a core material with a core refractive index $n_{DL}$ optically coupled to a reflective spatial light modulator 3408 using a first pressure sensitive adhesive layer 3407 comprising a first material with a first refractive index $n_{D1}$. A light source 1102 with an optical axis parallel to the +y direction (into the page) is positioned to emit light into the folded stack of coupling lightguides 104. The film-based lightguide 107 comprises a plurality of low angle directing features 3503 on the upper surface 3414 of the core layer 601 of the film-based lightguide 107 and is optically coupled to a light turning film 3403 on the upper surface 3414 of the core layer 601 using a second pressure sensitive adhesive layer 3412 comprising a second material with a second refractive index $n_{D2}$. The light turning film 3403 comprises a plurality of light turning features 3401 on the top surface 3415 of the light turning film 3403 opposite the second pressure sensitive adhesive layer 3412. A third pressure sensitive adhesive layer 3405 optically couples a cover layer 3406 (such as a protective PET film or touchscreen film, for example) to the light turning film 3403 over a portion of the top surface 3415 such that air gaps 3416 are formed at the light turning features 3401. A light mixing region 105 is positioned between the light input coupler 101 and the light emitting region 108 of the light emitting device 3400. An opaque layer 3411 is optically coupled to the film-based lightguide 107 in the light mixing region 105 using the second pressure sensitive adhesive layer 3412. In this embodiment, the opaque layer 3411 is a light absorbing layer that absorbs at least 70% of the light within a wavelength range between 400 nanometers and 700 nanometers that reaches the opaque layer 3411 through the second pressure sensitive adhesive layer 3412. In this embodiment, first light 3501 and second light 3502 from the light source 1102 propagate through the coupling lightguides 104 within the light input coupler 101, totally internally reflect within the core layer 601 of the film-based lightguide 107 and propagate through the light mixing region 105 and into the light emitting region 108 of the film-based lightguide 107. First light 3501 refracts to a new angle smaller than the incident angle by an average total angle of deviation of less than 20 degrees at a low angle directing feature 3503 such that it propagates out of the core layer 601 of the lightguide. In this embodiment, a portion of the light from within the core layer 601 that intersects a low angle directing feature 3503 may transmit through the low angle directing feature 3503 and a portion may reflect from the low angle directing feature 3503. In this embodiment, $n_{DL} > n_{D2} > n_{D1}$ such that a portion of the light that reflects from the low angle directing feature 3503 may reflect at a total angle of deviation of less than 20 degrees such that it reflects from the boundary between the core layer 601 and the first pressure sensitive adhesive layer 3407 and exits the core layer 601 at the upper surface 3414 of the core layer 601. After crossing the interface between the core layer 601 and the second pressure sensitive adhesive, the first light 3501 then propagates through the second pressure sensitive adhesive layer 3412 into the light turning film 3403 and totally internally reflects from a light turning feature 3401 in the light turning film 3403 to an angle within degrees from the thickness direction (parallel to the z direction in this embodiment) of the film-based lightguide 107. The first light 3501 then propagates back through the light turning film 3403, the second pressure sensitive adhesive layer 3412, the core layer 601, and the first pressure sensitive adhesive layer 3407, reflects from the reflective spatial light modulator 3408, passes back through the aforementioned layers in the reverse order, does not interact a second time with a light turning feature 3401, and is emitted from the light emitting device 3500 in the light emitting region 108.

After being redirected by the low angle directing feature 3503, the second light 3502 propagates through the second pressure sensitive adhesive layer 3412 and into the light turning film 3403. The second light 3502 does not intersect a light turning feature 3401 on the first pass and totally internally reflects from the top surface 3415 of the light turning film 3403 between the light turning features 3401 and propagates back through the light turning film 3403, through the second pressure sensitive adhesive layer 3412, through the core layer 601 and totally internally reflects at the interface between the core layer 601 and the first pressure sensitive adhesive layer 3407, passes back through the aforementioned layers in reverse order and totally internally reflects from a light turning feature 3401 in the light turning film 3403 to an angle within 30 degrees from the thickness direction (parallel to the z direction in this embodiment) of the film-based lightguide 107. The second light 3502 then propagates back through the light turning film 3403, the second pressure sensitive adhesive layer 3412, the core layer 601, and the first pressure sensitive adhesive layer 3407, reflects from the reflective spatial light modulator 3408, passes back through the aforementioned layers in the reverse order, and is emitted from the light emitting device 3400 in the light emitting region 108.

Figure 7:
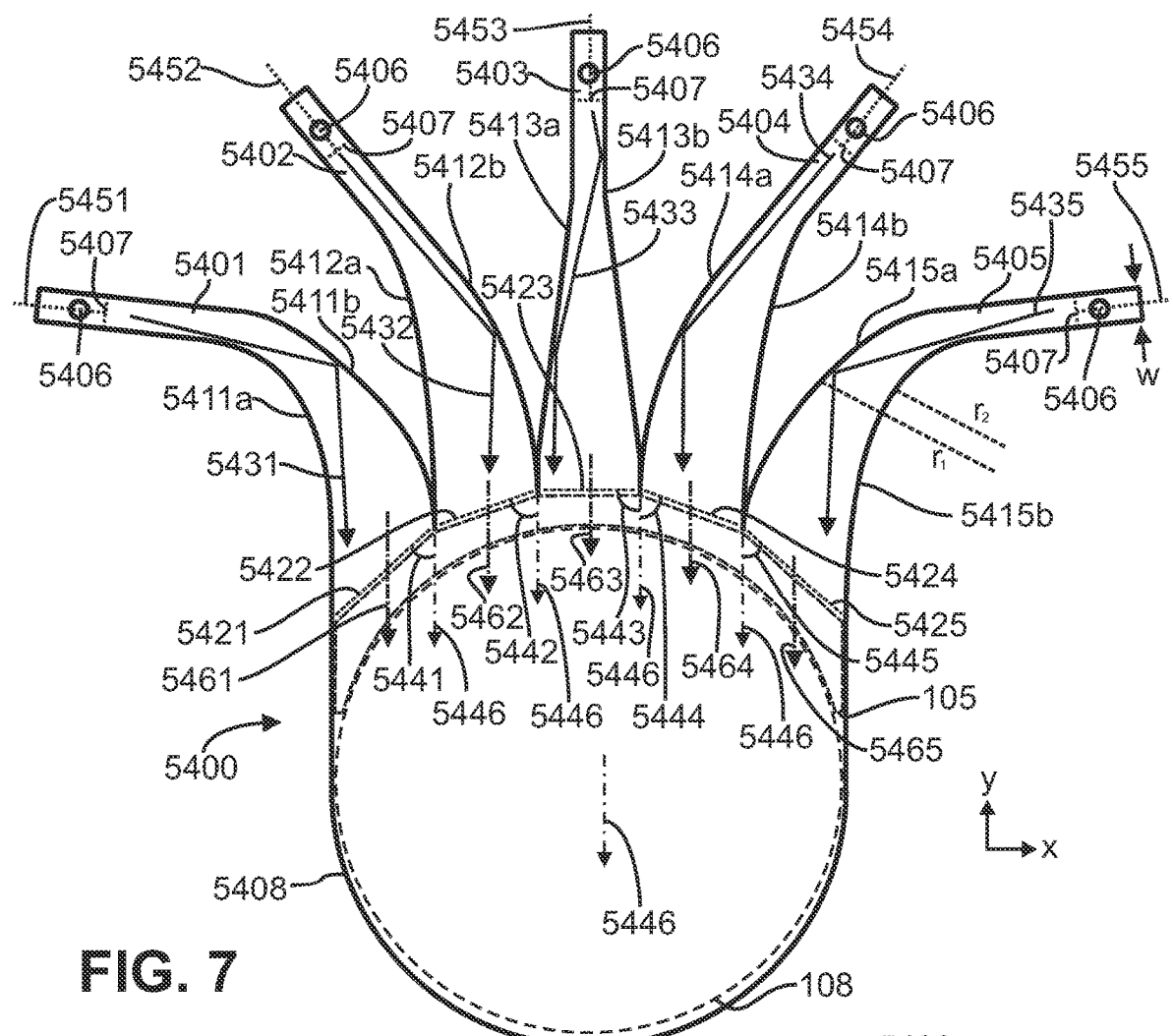
FIG. 7 is a top view of a film-based lightguide comprising a tapered coupling lightguides.

FIG. 7 is a top view of a film-based lightguide 5400 comprising a first tapered coupling lightguide 5401, a second tapered coupling lightguide 5402, a third tapered coupling lightguide 5403, a fourth tapered coupling lightguide 5404, and a fifth tapered coupling lightguide 5405 extended from a body 5408 of the film-based lightguide 5400 comprising a light mixing region 105 and a light emitting region 108. The film-based lightguide 5400 is shown in FIG. 7 in un-folded form prior to folding: the first tapered coupling lightguide 5401 along a first fold line 5421 oriented at a first fold angle 5441 to the primary axis of illumination 5446 of the total light illuminating the body 5408 in the plane (x-y plane) orthogonal to the thickness direction (z direction) of the film-based lightguide 5400 in the light emitting region 108 from the light source, the second tapered coupling lightguide 5402 along a second fold line 5422 oriented at a second fold angle 5442 to the primary axis of illumination 5446, the third tapered coupling lightguide 5403 along a third fold line 5423 oriented at a third fold angle 5443 to the primary axis of illumination 5446, the fourth tapered coupling lightguide 5404 along a fourth fold line 5424 oriented at a fourth fold angle 5444 to the primary axis of illumination 5446, and the fifth tapered coupling lightguide 5405 along a fifth fold line 5425 oriented at a fifth fold angle 5445 to the primary axis of illumination 5446. In this embodiment, the tapered coupling lightguides 5401, 5402, 5403, 5404, and 5405 comprise alignment holes 5406 that may overlap around a protrusion (such as a pin or other protrusion in a guide element, relative position maintaining element, housing circuit board, or flexible circuit board, for example) after folding such that when the tapered coupling lightguides 5401, 5402, 5403, 5404, and 5405 are cut at cut lines 5407, input edges to the tapered coupling lightguides 5401, 5402, 5403, 5404, and 5405 are formed at the cut lines 5407 (forming the new ends of the tapered coupling lightguides 5401, 5402, 5403, 5404, and 5405) such that the combined folded stack of tapered coupling lightguides 5401, 5402, 5403, 5404, and 5405 form a light input surface that can be positioned to receive light from a light source (shown in FIG. 8). In another embodiment, the film-based lightguide 5400 does not comprise the alignment holes 5406 and the tapered coupling lightguides 5401, 5402, 5403, 5404, and 5405 are folded, stacked, and/or aligned manually or by mechanical means such as a pick-and-place vacuum, clamp or similar mechanism. The first tapered coupling lightguide 5401 has a first lateral edge 5411a and a second lateral edge 5411b. The second tapered coupling lightguide 5402 has a first lateral edge 5412a and a second lateral edge 5412b. The third tapered coupling lightguide 5403 has a first lateral edge 5413a and second lateral edge 5413b. The fourth tapered coupling lightguide 5404 has a first lateral edge 5414a and a second lateral edge 5414b. The fifth tapered coupling lightguide 5405 has a first lateral edge 5415a and a second lateral edge 5415b. In this embodiment, the first tapered coupling lightguide 5401, second tapered coupling lightguide 5402, fourth tapered coupling lightguide 5404, and fifth tapered coupling lightguide 5405 comprise curved lateral edges (5411a, 5411b, 5412a, 5412b, 5414a, 5414b, 5415a, 5415b) with straight segments along their ends near the cut lines 5407. The third tapered coupling lightguide 5403 comprises lateral edges 5413a, 5413b with straight segments at non-zero angles relative to each other. In this embodiment, the tapered coupling lightguides 5401, 5402, 5403, 5404, and 5405 provide for a single or narrow width light source, such as a light source having a width in the width direction (x-direction) orthogonal to the optical axis of the light source (+y direction when folded) and orthogonal to the thickness direction (z direction) of the body 5408 of the film-based lightguide 5400 in the light emitting region 108 to illuminate a light emitting region 108 with a larger width in the width direction (x direction) (such as the ratio of the light emitting region 108 width to the light source emitting area width in the width direction greater than one selected from the group of 2, 4, 6, 8, 10, and 20) without using many coupling lightguides (shown here are only five tapered coupling lightguides 5401, 5402, 5403, 5404, and 5405) such that the total thickness of the stack of tapered coupling lightguides 5401, 5402, 5403, 5404, and 5405 can be reduced while the lateral edges 5411a, 5411b, 5412a, 5412b, 5413a, 5413b. 5414a, 5414b, 5415a, 5415b of the tapered coupling lightguides 5401, 5402, 5403, 5404, and 5405 have sufficient separation (thus sufficient width of the corresponding region of the tapered coupling lightguide) to provide a reduction in angular width of the light 5431, 5432, 5433, 5434, 5435 entering the light emitting region and/or sufficient width to redirect the optical axes 5461, 5462, 5464, 5465 of light from the tapered coupling lightguides 5401, 5402, 5404, 5405, respectively, to directions closer to the primary axis of illumination 5446 when the tapered coupling lightguides 5401, 5402, 5403, 5404, and 5405 are folded along fold lines 5421, 5422, 5423, 5424, 5425, respectively, oriented at angles to each other and different angles from the primary axis of illumination 5446.

The tapered coupling lightguides 5401, 5402, 5403, 5404, and 5405 of FIG. 7 have orientation axes 5451, 5452, 5453, 5454, and 5455, respectively, oriented at a first, second, third, fourth, and fifth orientation angles to the primary axis of illumination 5446 which all become parallel to each other (and typically parallel to the optical axis of the light source in the x-y plane) after folding the tapered coupling lightguides 5401, 5402, 5403, 5404, and 5405. The lateral edges 5411a, 5411b, 5412a, 5412b, 5413a, 5413b, 5414a, 5414b, 5415a, 5415b) of the tapered coupling lightguides (5401, 5402, 5403, 5404, 5405) provide a reduction in the angular width (full-angular width at half maximum luminous intensity within the film-based lightguide 5400) of the light 5431, 5432, 5433, 5434, and 5435, propagating through the tapered coupling lightguides 5401, 5402, 5403, 5404, and 5405 when they are folded along the fold lines 5421, 5422, 5423, 5424, and 5425 at the fold angles 5441, 5442, 5443, 5444, and 5445 from the primary axis of illumination 5446, respectively, aligned, stacked, and cut along their cut lines 5407 such that they receive illuminating light from a light source (see FIG. 8). The lateral edges 5411a, 5411b, 5412a, 5412b, 5414a, 5414b, 5415a, and 5415b are asymmetric in the width direction (such as having curved portions with different radii of curvature on each side of the coupling lightguide, for example). The curved portions of the lateral edges 5411a, 5411b, 5412a, 5412b, 5414a, 5414b, 5415a, and 5415b on opposing sides of the tapered coupling lightguides 5401, 5402, 5404, 5405 have radii of curvature directed to centers on the same side of the tapered coupling lightguide (or the curved sections on the lateral edges open in the same direction (such as −x direction, for example), and redirect each of the optical axes 5461, 5462, 5464, 5465 of the illuminating light from the light source within the tapered coupling lightguides 5401, 5402, 5404, 5405, respectively, as the light enters the light mixing region 105 (or light emitting region 108) to angles within one or more selected from the group of 5, 10, 15, and 20 degrees of the primary axis of illumination 5446. In this embodiment, the lateral edges 5413a and 5413b of the third tapered coupling lightguide 5403 are substantially symmetric about the orientation axis 5453 of the third tapered coupling lightguide 5403 and do not redirect the optical axis 5463 of the light propagating within the third tapered coupling lightguide 5403 more toward the primary axis of illumination 5446 since the optical axis of the light source (once the tapered coupling lightguide 5403 is folded, shown in FIG. 8) and the orientation axis 5453 are oriented within 10 degrees (such as parallel to each other and oriented at 0 degrees, for example) from the primary axis of illumination 5446. The film-based lightguide 5400 may be adhered (such as by a low refractive index adhesive cladding layer beneath at least the light emitting region 108 onto a reflective display and the tapered coupling lightguides 5401, 5402, 5403, 5404, 5405 of the film-based lightguide 5400 may be folded behind the reflective display (and optionally also folded behind a guide element along angled edges of the guide element) to form a stack to receive light from a light source to illuminate the reflective display from the front as a frontlight, thus forming a light emitting display. The order of the tapered coupling lightguides 5401, 5402, 5403, 5404, 5405 in the stack of tapered coupling lightguides (thus, the order of the folds) may determine the relative light flux within each tapered coupling lightguide 5401, 5402, 5403, 5404, 5405 with generally the tapered coupling lightguides 5401, 5402, 5403, 5404, 5405 near the center of the stack comprising more light flux from the light source than the tapered coupling lightguides near or at the top or bottom of the stack when the stack of tapered coupling lightguides 5401, 5402, 5403, 5404, 5405 is centered in the thickness direction about the light emitting surface of the light source. For example, one could stack the tapered coupling lightguides such that the central tapered coupling lightguide (such as the third tapered coupling lightguide 5403 in the embodiment of FIG. 7) is in the middle of the stack of tapered coupling lightguides. The width in the width direction of the lightguides (such as the tapered coupling lightguides 5401, 5402, 5403, 5404, and 5405) at the light mixing region 105 where they extend from the body 5408 of the film-based lightguide 5400 will also affect the light flux distribution within the light mixing region 105 and the light emitting region 108. The width of the tapered coupling lightguides 5401, 5405 further from the center of the light emitting region 108 in the width direction where they meet the body 5408 of the film-based lightguide 5400 may be wider than the tapered coupling lightguides 5402, 5403, 5404 closer to the center of the light emitting region 108 in the width direction. The tapered coupling lightguides (5401, 5402, 5404, 5405) that have curved regions may have a radius-to-width ratio r/w for each lateral edge 5411a, 5411b, 5412a, 5412b, 5414a, 5414b, 5415a, and 5415b. For example, as shown in FIG. 7, the fifth tapered coupling lightguide 5405 comprises width, w, at the end, a lateral edge 5415a with a radius $r_1$, and a lateral edge 5415b with a radius $r_2$ and a radius-to-width ratio of $r_1/w$ (which may be greater than one selected from the group of 2, 3, 4, 6, 8, 10, and 15) for the lateral edge 5415a and a radius-to-width ratio of $r_2/w$ (which may be greater than one selected from the group of 2, 3, 4, 6, 8, 10, and 15) for the lateral edge 5415b. The tapered coupling lightguide 5405 has an average radius-to-width ratio $(r_1+r_2)/2w$ for the tapered coupling lightguide 5405 greater than one selected from the group of 2, 3, 4, 6, 8, 10, and 15.

Figure 8:
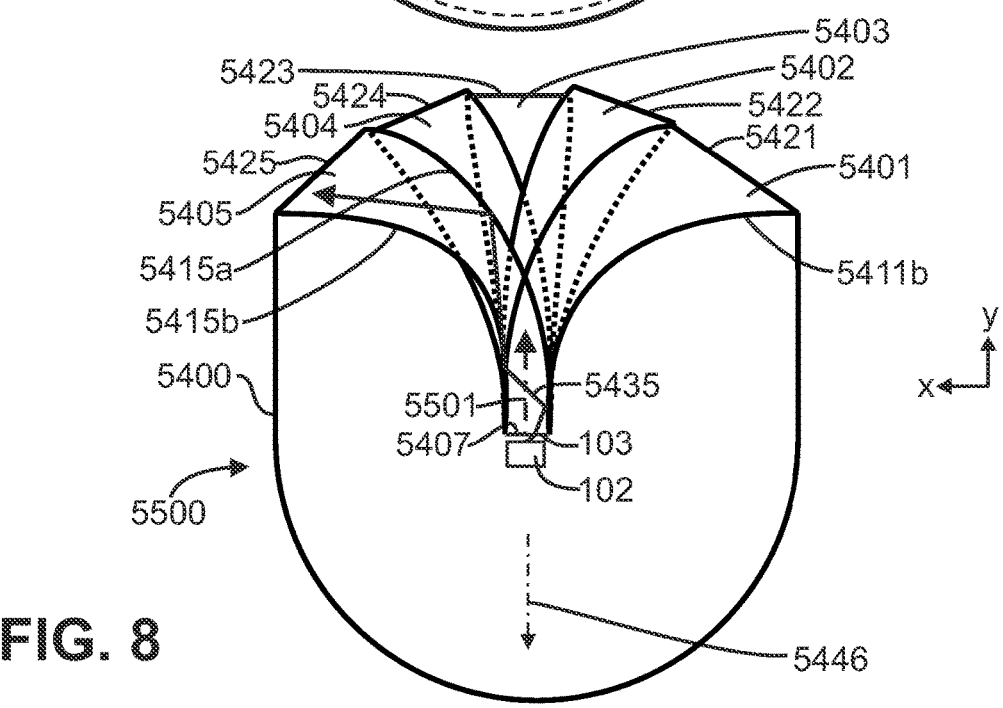
FIG. 8 is a bottom view of a light emitting device comprising a light source and the film-based lightguide of FIG. 7.

FIG. 8 is a bottom view of a light emitting device 5500 comprising a light source 102 and the film-based lightguide 5400 of FIG. 7 with the tapered coupling lightguides 5401, 5402, 5403, 5404, 5405 of the film-based lightguide 5400 folded along the fold lines 5421, 5422, 5423, 5424, and 5425 such that their ends are stacked and cut along the cut lines 5407 to form a light input surface 103 for the light source 102. Light from the light source 102 has an optical axis 5501 and propagates by total internal reflection into the tapered coupling lightguides 5401, 5402, 5403, 5404, 5405 of the film-based lightguide 5400, propagates through the light mixing region 105 and into the light emitting region 108 where it is emitted from the film-based lightguide 5400 due to light extraction features (not shown). For example, light 5435 from the light source 102 propagates through the fifth tapered coupling lightguide 5405, totally internally reflects at the lateral edge 5415a and is directed toward the optical axis 5465 of the fifth tapered coupling lightguide 5405 and to an angle within 10 degrees of the primary axis of illumination 5446.

Figure 9:
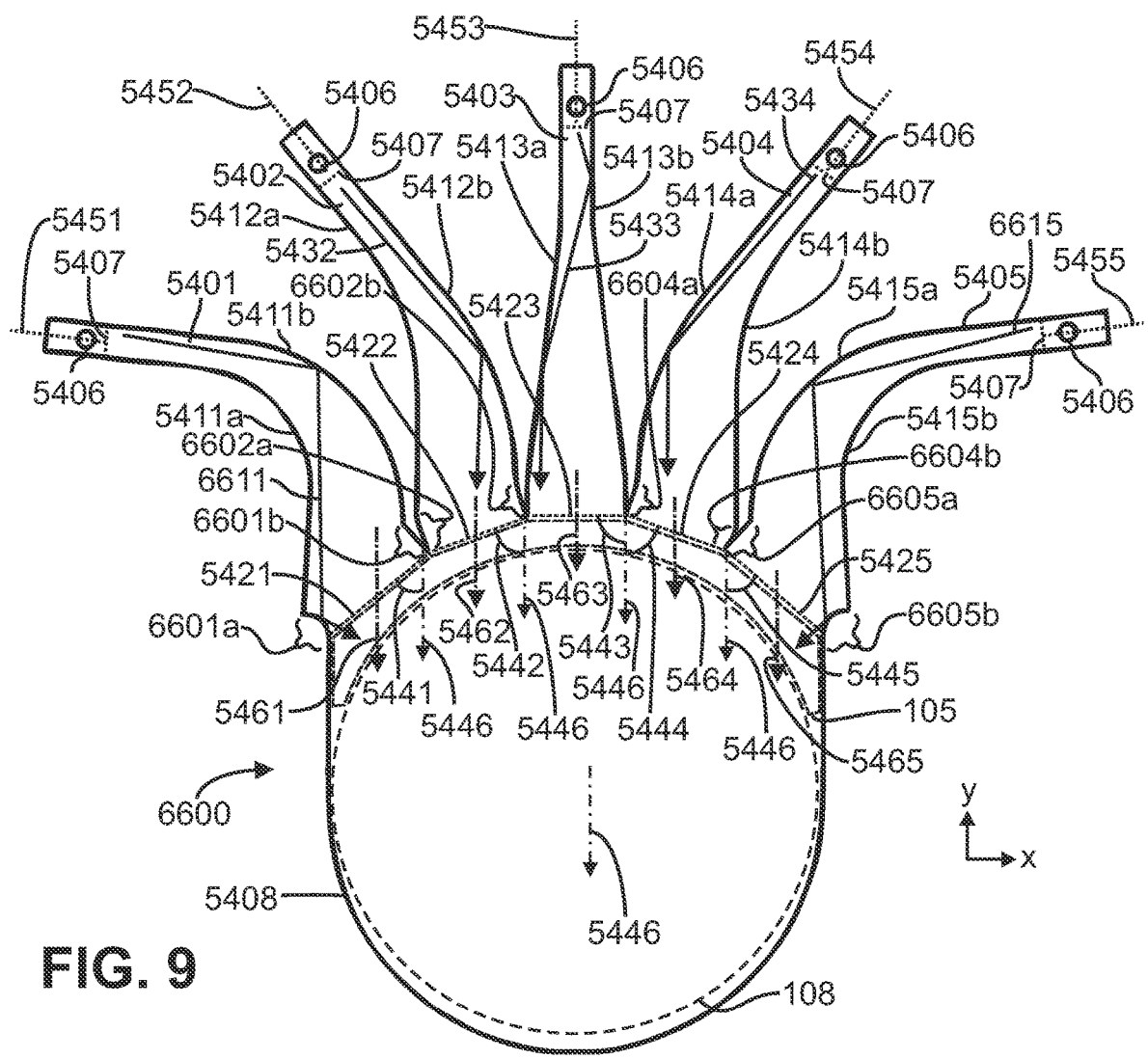
FIG. 9 is a top view of a film-based lightguide comprising tapered coupling lightguides comprising centrally directing lateral edge sections.

FIG. 9 is a top view of a film-based lightguide 6600 similar to the film-based lightguide 5400 except the first tapered coupling lightguide 5401, second tapered coupling lightguide 5402, fourth tapered coupling lightguide 5404, and fifth tapered coupling lightguide 5405 comprise centrally directing lateral edge sections 6601a, 6601b, 6602a, 6602b, 6604a, 6604b, 6605a and 6605b, respectively that direct a portion of the light from the light source (when the tapered coupling lightguides 5401, 5402, 5403, 5404, 5405 are folded, stacked, cut, and positioned to receive light from the light source) toward the center of the light mixing region 105 and/or light emitting region 108 in the width direction (+x or −x direction). In this embodiment, the centrally directing lateral edge sections 6601a and 6601b are oriented substantially parallel to each other and orthogonal to the fold line 5421 such that the tapered coupling lightguide 5401 can be folded across a linear edge of a guide element without a tapered coupling lightguides (5402 in this example) overlapping with the tapered coupling lightguide 5401 at their fold regions about the fold lines 5421, 5422 which reduces the probability of a tear of a tapered coupling lightguide (5401, 5402) or adjacent tapered coupling lightguides (5401, 5402) interfering with each other in the folding steps. Likewise, the centrally directing lateral edge section pairs 6602a and 6602b, 6604a and 6604b, and 6605a and 6605b are oriented substantially parallel to each other and orthogonal to their respective fold lines 5422, 5424, and 5425, respectively, and provide similar reduced probability of a tear or interference during folding. The lateral edges 5413a and 5413b of the third tapered coupling lightguide comprise linear lateral edge sections proximate the fold line 5423 substantially parallel to each other and perpendicular to the fold line 5423 to provide a similar reduced probability of a tear or interference during folding.

In some embodiments, for example, a portion of the light from the light source is directed toward the center (in the width direction (+x or −x direction in this example)) of the light mixing region 105 or light emitting region 108 by centrally directing lateral edge sections 6601a. 6601b, 6602a, 6602b, 6604a. 6604b, 6605a, and 6605b that redirect light by totally internally reflecting light from the lateral edge sections 6601a, 6602a, 6604b, 6605b oriented at an angle to the adjacent and/or other segments of the tapered coupling lightguides or by orienting the lateral edge sections 6601b, 6602b, 6604a, and 6605a at an angle to permit more light to propagate in the direction toward the central region of the light emitting region 108 in the width direction (+x or −x direction) without being totally internally reflected. In some embodiments, the centrally directing lateral edges (such as 6601a and 6605b in this example) totally internally reflect a portion of the light incident near the lateral edges of the body 5408 of the film-based lightguide 6600 to reduce the luminance of the light emitting region 108 near the lateral edges of the body 5408 that could otherwise be non-uniformly higher due to light reflecting from the edges back toward the center (in the width direction) of the light emitting region 108, or could otherwise exit the lateral edge of the light mixing region or light emitting region, for example.

The film-based lightguide 6600 of FIG. 9 comprises a first tapered coupling lightguide 5401, second tapered coupling lightguide 5402, third tapered coupling lightguide 5403, fourth tapered coupling lightguide 5404, and fifth tapered coupling lightguide 5405 extended from a body 5408 of the film-based lightguide 5400 comprising a light mixing region 105 and a light emitting region 108. The film-based lightguide 6600 is shown in FIG. 9 in un-folded form prior to folding: the first tapered coupling lightguide 5401 along a first fold line 5421 oriented at a first fold angle 5441 to the primary axis of illumination 5446 of the total light illuminating the body 5408 in the plane (x-y plane) orthogonal to the thickness direction (z direction) of the film-based lightguide 6600 in the light emitting region 108 from the light source, the second tapered coupling lightguide 5402 along a second fold line 5422 oriented at a second fold angle 5442 to the primary axis of illumination 5446, the third tapered coupling lightguide 5403 along a third fold line 5423 oriented at a third fold angle 5443 to the primary axis of illumination 5446, the fourth tapered coupling lightguide 5404 along a fourth fold line 5424 oriented at a fourth fold angle 5444 to the primary axis of illumination 5446, and the fifth tapered coupling lightguide 5405 along a fifth fold line 5425 oriented at a fifth fold angle 5445 to the primary axis of illumination 5446. The tapered coupling lightguides 5401, 5402, 5403, 5404, and 5405 comprise alignment holes 5406 that may overlap around a protrusion (such as a pin or other protrusion in a relative position maintaining element, housing circuit board, or flexible circuit board, for example) after folding such that when the tapered coupling lightguides 5401, 5402, 5403, 5404, and 5405 are cut at cut lines 5407, input edges to the tapered coupling lightguides 5401, 5402, 5403, 5404, and 5405 are formed at the cut lines 5407 (forming the new ends of the tapered coupling lightguides 5401, 5402, 5403, 5404, and 5405) such that the combined end edges of the folded stack of tapered coupling lightguides 5401, 5402, 5403, 5404, and 5405 form a light input surface that can be positioned to receive light from a light source. In another embodiment, the film-based lightguide 6600 does not comprise the alignment holes 5406 in the tapered coupling lightguides 5401, 5402, 5403, 5404, and 5405, and the tapered coupling lightguides 5401, 5402, 5403, 5404, and 5405 are folded, stacked, and/or aligned manually or by mechanical means such as a pick-and-place vacuum, clamp or similar mechanism. The first tapered coupling lightguide 5401 has a first lateral edge 5411a and a second lateral edge 5411b. The second tapered coupling lightguide 5402 has a first lateral edge 5412a and a second lateral edge 5412b. The third tapered coupling lightguide 5403 has a first lateral edge 5413a and second lateral edge 5413b. The fourth tapered coupling lightguide 5404 has a first lateral edge 5414a and a second lateral edge 5414b. The fifth tapered coupling lightguide 5405 has a first lateral edge 5415a and a second lateral edge 5415b. In this embodiment, the first tapered coupling lightguide 5401, second tapered coupling lightguide 5402, fourth tapered coupling lightguide 5404, and fifth tapered coupling lightguide 5405 comprise curved lateral edges (5411a, 5411b, 5412a, 5412b, 5414a, 5414b, 5415a, 5415b) with straight segments along their ends near the cut lines 5407. The third tapered coupling lightguide 5403 comprises lateral edges 5413a, 5413b with straight segments at non-zero angles relative to each other. In this embodiment, the tapered coupling lightguides 5401, 5402, 5403, 5404, and 5405 provide for a single or narrow width light source, such as a light source having a width in the width direction (x-direction) orthogonal to the optical axis of the light source (+y direction when folded) and orthogonal to the thickness direction (z direction) of the body 5408 of the film-based lightguide 5400 in the light emitting region 108 to illuminate a light emitting region 108 with a larger width in the width direction (x direction) (such as the ratio of the light emitting region 108 width to the light source emitting area width in the width direction greater than one selected from the group of 2, 4, 6, 8, 10, and 20) without using many coupling lightguides (shown here are only five tapered coupling lightguides 5401, 5402, 5403, 5404, and 5405) such that the total thickness of the stack of tapered coupling lightguides 5401, 5402, 5403, 5404, and 5405 can be reduced while the lateral edges 5411a, 5411b, 5412a, 5412b, 5413a, 5413b. 5414a, 5414b, 5415a, 5415b of the tapered coupling lightguides 5401, 5402, 5403, 5404, and 5405 have sufficient separation (thus sufficient width of the corresponding tapered coupling lightguide) to provide a reduction in angular width of the light 6611, 5432, 5433, 5434, 6615 entering the light emitting region 108 and/or sufficient width to redirect the optical axes 5461, 5462, 5464, 5465 of light from the tapered coupling lightguides 5401, 5402, 5404, 5405, respectively closer to the primary axis of illumination 5446 when the tapered coupling lightguides 5401, 5402, 5403, 5404, and 5405 are folded along fold lines 5421, 5422, 5423, 5424, 5425, respectively, oriented at angles to each other and different angles from the primary axis of illumination 5446.

The tapered coupling lightguides 5401, 5402, 5403, 5404, and 5405 of FIG. 9 have orientation axes 5451, 5452, 5453, 5454, and 5455, respectively, oriented at a first, second, third, fourth, and fifth orientation angles to the primary axis of illumination 5446 which all become parallel to each other (and typically parallel to the optical axis of the light source in the x-y plane) after folding the tapered coupling lightguides 5401, 5402, 5403, 5404, and 5405. The lateral edges 5411a, 5411b, 5412a, 5412b, 5413a, 5413b, 5414a, 5414b, 5415a, 5415b) of the tapered coupling lightguides (5401, 5402, 5403, 5404, 5405) provide a reduction in the angular width (full-angular width at half maximum luminous intensity within the film-based lightguide 5400) of the light 5431, 5432, 5433, 5434, and 5435, propagating through the tapered coupling lightguides 5401, 5402, 5403, 5404, and 5405 when they are folded along the fold lines 5421, 5422, 5423, 5424, and 5425 at the fold angles 5441, 5442, 5443, 5444, and 5445 from the primary axis of illumination 5446, respectively, aligned, stacked, and cut along their cut lines 5407 such that they receive illuminating light from a light source. The lateral edges 5411a, 5411b, 5412a, 5412b, 5414a, 5414b, 5415a, and 5415b are asymmetric in the width direction (such as having curved portions with different radii of curvature on each side of the coupling lightguide, for example). The curved portions of the lateral edges 5411a, 5411b, 5412a, 5412b, 5414a, 5414b, 5415a, and 5415b on opposing sides of the tapered coupling lightguides 5401, 5402, 5404, 5405 have radii of curvature directed to centers on the same side of the corresponding tapered coupling lightguide (or the curved sections on the lateral edges 5411a, 5411b, 5412a, 5412b, 5414a, 5414b, 5415a, and 5415b open in the same direction (such as −x direction, for example), and redirect each of the optical axes 5461, 5462, 5464, 5465 of the illuminating light from the light source within the tapered coupling lightguides 5401, 5402, 5404, 5405, respectively, as the light enters the light mixing region 105 (or light emitting region 108) to angles within one or more selected from the group of 5, 10, 15, and 20 degrees of the primary axis of illumination 5446. In this embodiment, the lateral edges 5413a and 5413b of the third tapered coupling lightguide 5403 are substantially symmetric about the orientation axis 5453 of the third tapered coupling lightguide 5403 and do not redirect the optical axis 5463 of the light propagating within the third tapered coupling lightguide 5403 more toward the primary axis of illumination 5446 since the optical axis of the light source (once the tapered coupling lightguide 5403 is folded) and the orientation axis 5453 are oriented within 10 degrees of each other (such as parallel to each other and oriented at 0 degrees, for example) or within 10 degrees from the primary axis of illumination 5446. The film-based lightguide 6600 may be adhered (such as by a low refractive index adhesive cladding layer beneath at least the light emitting region 108 onto a reflective display and the tapered coupling lightguides 5401, 5402, 5403, 5404, 5405 of the film-based lightguide 6600 may be folded behind the reflective display (and optionally also folded behind a guide element along angled edges of the guide element) to form a stack to receive light from a light source to illuminate the reflective display from the front as a frontlight, thus forming a light emitting display. The order of the tapered coupling lightguides in the stack of tapered coupling lightguides 5401, 5402, 5403, 5404, 5405 (thus, the order of the folds) may determine the relative light flux within each tapered coupling lightguide 5401, 5402, 5403, 5404, 5405 with generally the tapered coupling lightguides near the center of the stack comprising more light flux from the light source than the tapered coupling lightguides near or at the top or bottom of the stack when the stack of tapered coupling lightguides 5401, 5402, 5403, 5404, 5405 is centered in the thickness direction about the light emitting surface of the light source. For example, one could stack the tapered coupling lightguides such that the central tapered coupling lightguide (such as the third tapered coupling lightguide 5403 in the embodiment of FIG. 9) is in the middle of the stack of tapered coupling lightguides 5401, 5402, 5403, 5404, 5405. The width in the width direction of the lightguides (such as the tapered coupling lightguides 5401, 5402, 5403, 5404, and 5405) at the light mixing region 105 where they extend from the body 5408 of the film-based lightguide 6600 will also affect the light flux distribution within the light mixing region 105 and the light emitting region 108.

Figure 10:
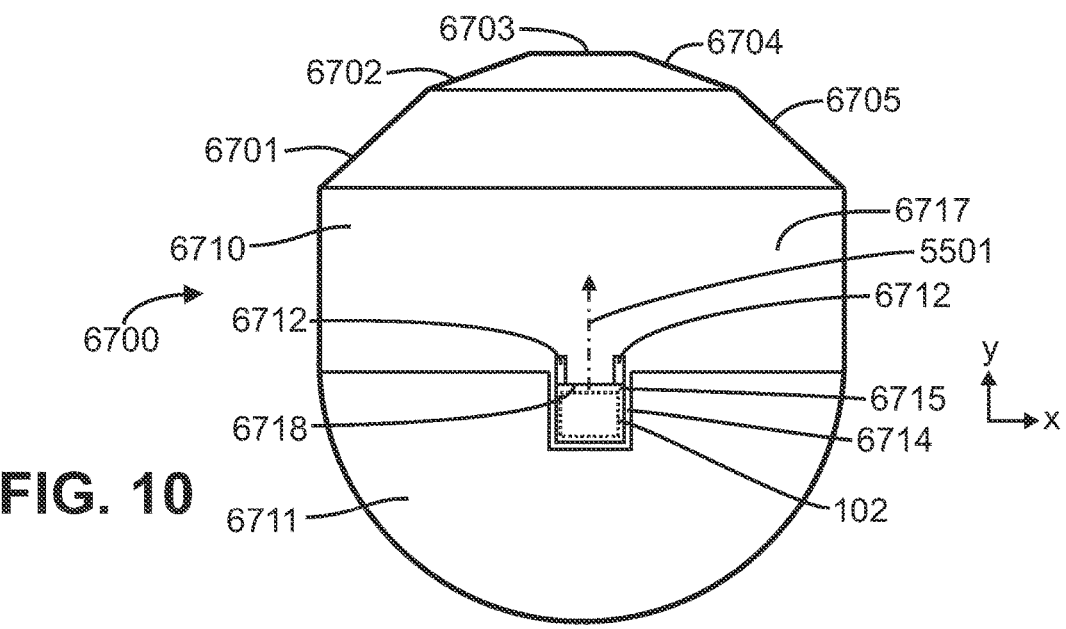
FIG. 10 is a bottom view of a guide element comprising angled edges.

FIG. 10 is a bottom view of a guide element 6700 suitable for use with the film-based lightguide 5400 of FIG. 7 comprising angled edges 6701, 6702, 6703, 6704, 6705 oriented at the same angles as the corresponding fold angles 5441, 5442, 5443, 5444, 5445 and parallel to the fold lines 5421, 5422, 5423, 5424, 5425. Each of the angled edges 6701, 6702, 6703, 6704, 6705 is curved in the thickness direction (+z direction, out of the page in FIG. 10) of the guide element 6700 and the light emitting region 180 of a film-based lightguide with tapered coupling lightguides folded behind it along the angled edges 6701, 6702, 6703, 6704, 6705). The guide element 6700 further comprises a thick region 6710 adjacent a thin region 6711 and two coupling lightguide guide protrusions 6712 positioned on either side in the width direction (x-direction) of the location for the stacked coupling lightguides (such as the tapered coupling lightguides 5401, 5402, 5403, 5404, and 5405 of FIG. 7) to restrain the stacked coupling lightguides in the width direction such that they may be aligned in the width direction to a light source 102 that is positioned on or against a light source surface 6715 with light source boundary walls 6714 positioned to restrain the light source 102 in the width direction and the −y direction as shown in FIG. 10. The light source surface 6715 is lower (in the −z direction) than the lower surface 6717 of the thick region 6710 and is restrained in the +y direction by a front edge 6718 between the light source surface 6715 and the lower surface 6717 of the thick region 6710. Also, since light sources 102 typically have housings (such as the housing for a light emitting diode) surrounding the light emitting surface in the plane orthogonal to the optical axis 5501 (which may be oriented in the +y direction as shown in FIG. 10) of the light source 102, by lowering the light source 102 relative to the lower surface 6717 (such as by 0.5 millimeters, for example), the lower edge (in the −z direction) of the light emitting area of the light source 102 can line up in the thickness direction with the lowest coupling lightguide when the coupling lightguides are stacked against the lower surface 6717.

Figure 11:
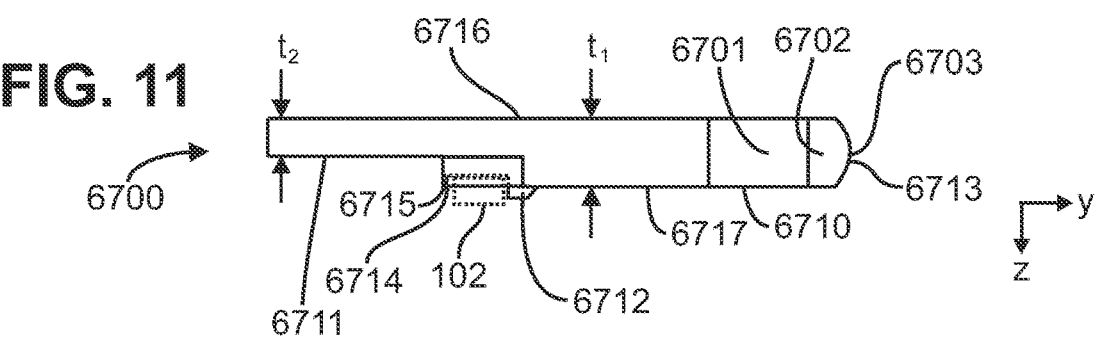
FIG. 11 is a side view of the guide element of FIG. 10.

FIG. 11 illustrates a side view of the guide element 6700 of FIG. 10. The thick region 6710 has a first thickness, $t_1$, and the thin region has a second thickness, $t_2$. The thickness, $t_2$, of the thick region facilitates the folding the coupling lightguides (such as the tapered coupling lightguides 5401, 5402, 5403, 5404, and 5405) around the guide element 6700 such that they are less likely to tear or leak significant amount of light flux out of the coupling lightguide due to bending at a tight radius. The angled edges 6701, 6702, 6703, 6704, 6705 are curved in a plane (such as the y-z plane) comprising the thickness direction (z-direction) as shown by the curved surface 6713 of the angled edge 6703. In one embodiment, the radii of curvature of the angled edges 6701, 6702, 6703, 6704, 6705 (which may all be the same or some may be different) may be greater than or equal to half of the thickness, $t_1$, of the thick region 6710 of the guide element 6700. The curve of the angled edges 6701, 6702, 6703, 6704, 6705 may also be an arc in a cross-section parallel to the thickness direction that subtends and angle of one selected from the group: 180 degrees, 90 degrees, less than 180 degrees and greater than 90 degrees, between 135 degrees and 45 degrees, greater than 45 degrees, between 60 and 120 degrees, between 70 and 110 degrees, and between 80 and 100 degrees.

The thickness, $t_2$, of the thin region 6711 may be less than the thickness, $t_1$, of the thick region, for example, to reduce the volume of the light emitting device or display. When the guide element 6700 is used to guide the folds of the coupling lightguides (such as the tapered coupling lightguides 5401, 5402, 5403, 5404, and 5405), the lower surface of a reflective spatial light modulator (such as a reflective LCD or electrophoretic display) may be positioned against the top surface 6716 of the guide element 6700 such that the film-based lightguide positioned above the reflective spatial modulator functions as a frontlight for the reflective spatial light modulator.

Figure 12:
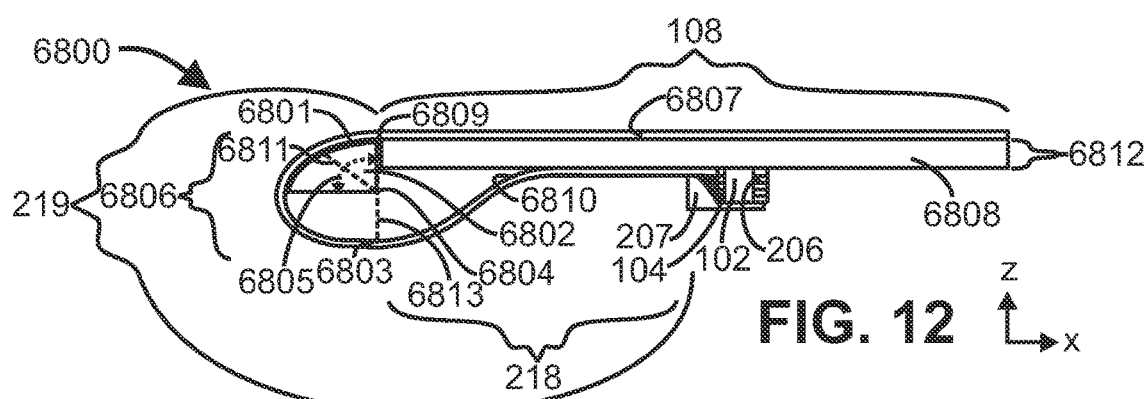
FIG. 12 is a side view of one embodiment of a reflective display with a film lightguide and a guide with a guide surface adjacent a surface of the film lightguide with a subtended angle of 90 degrees.

FIG. 12 is a side view of one embodiment of a reflective display 6800 including a film lightguide 6807 operatively coupled to a reflective spatial light modulator 6808. A plurality of coupling lightguides 104 extend from the film lightguide 6807 and are folded and stacked such that their ends 206 are positioned to receive light from the light source 102. A relative position maintaining element 207 substantially maintains the relative position of the coupling lightguides 104. The film lightguide 6807 includes a first bend 6806 in the light mixing region 219 such that a portion 218 of the light mixing region 219 is positioned behind the light emitting region 108 of the film lightguide 6807 and reflective spatial light modulator 6808. A guide 6802 is positioned within the first bend 6806 such that a first curved surface 6801 of the guide 6802 is adjacent the inner surface 6810 of the film lightguide 6807. In this embodiment, the curved surface 6801 of the guide 6802 adjacent the inner surface 6810 of the film lightguide 6807 at the bend 6806 in a plane (x-z plane as shown) comprising the bend 6806 of the film lightguide 6807 has a subtended angle 6805 from the midpoint 6804 of the line 6813 (shown dashed) between a point 6809 on the inner surface 6810 of the film lightguide 6807 at the start of the bend 6806 and the point 6803 on the inner surface 6810 of the film lightguide 6807 at the end of the bend 6806. In this embodiment, the subtended angle 6805 is 90 degrees and the radius of curvature 6811 of the curved surface 6801 of the guide 6802 adjacent the inner surface 6810 of the film lightguide 6807 in the plane (x-z plane) comprising the bend 6806 is greater than 1.5 times the thickness 6812 of the reflective spatial light modulator 6808.

Figure 13:
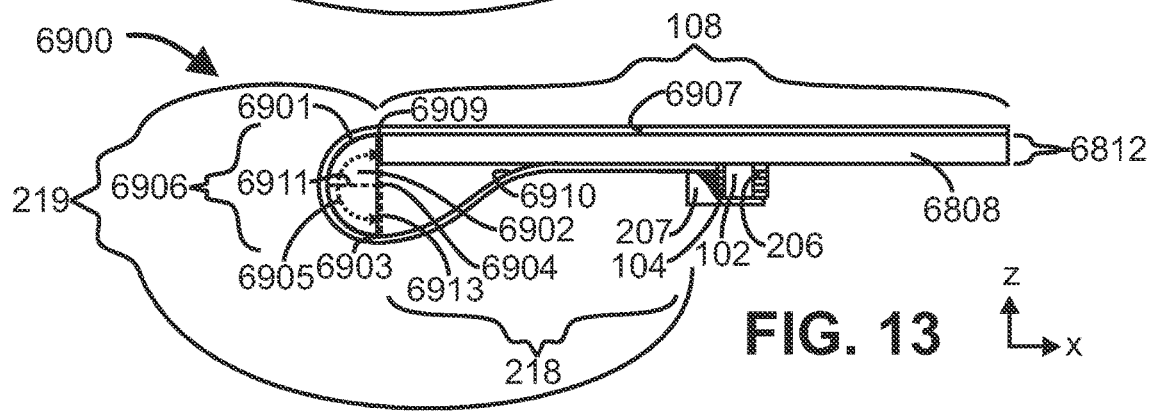
FIG. 13 is a side view of one embodiment of a reflective display with a film lightguide and a guide with a guide surface adjacent a surface of the film lightguide with a subtended angle of 180 degrees.

FIG. 13 is a side view of one embodiment of a reflective display 6900 including a film lightguide 6907 operatively coupled to a reflective spatial light modulator 6808. A plurality of coupling lightguides 104 extend from the film lightguide 6807 and are folded and stacked such that their ends 206 are positioned to receive light from the light source 102. A relative position maintaining element 207 substantially maintains the relative position of the coupling lightguides 104. The film lightguide 6907 includes a first bend 6906 in the light mixing region 219 such that a portion 218 of the light mixing region 219 is positioned behind the light emitting region 108 of the film lightguide 6907 and reflective spatial light modulator 6808. A guide 6902 is positioned within the first bend 6906 such that a first curved surface 6901 of the guide 6902 is adjacent the inner surface 6910 of the film lightguide 6907. In this embodiment, the curved surface 6901 of the guide 6902 adjacent the inner surface 6910 of the film lightguide 6907 at the bend 6906 in a plane (x-z plane as shown) comprising the bend 6906 of the film lightguide 6907 has a subtended angle 6905 from the midpoint 6904 of the line 6913 (shown dashed) between a point 6909 on the inner surface 6910 of the film lightguide 6907 at the start of the bend 6906 and the point 6903 on the inner surface 6910 of the film lightguide 6907 at the end of the bend 6906. In this embodiment, the subtended angle 6905 is 180 degrees and the radius of curvature 6911 of the curved surface 6901 of the guide 6902 adjacent the inner surface 6910 of the film lightguide 6907 in the plane (x-z plane) comprising the bend 6906 is greater than the thickness 6812 of the reflective spatial light modulator 6808.

Figure 14:
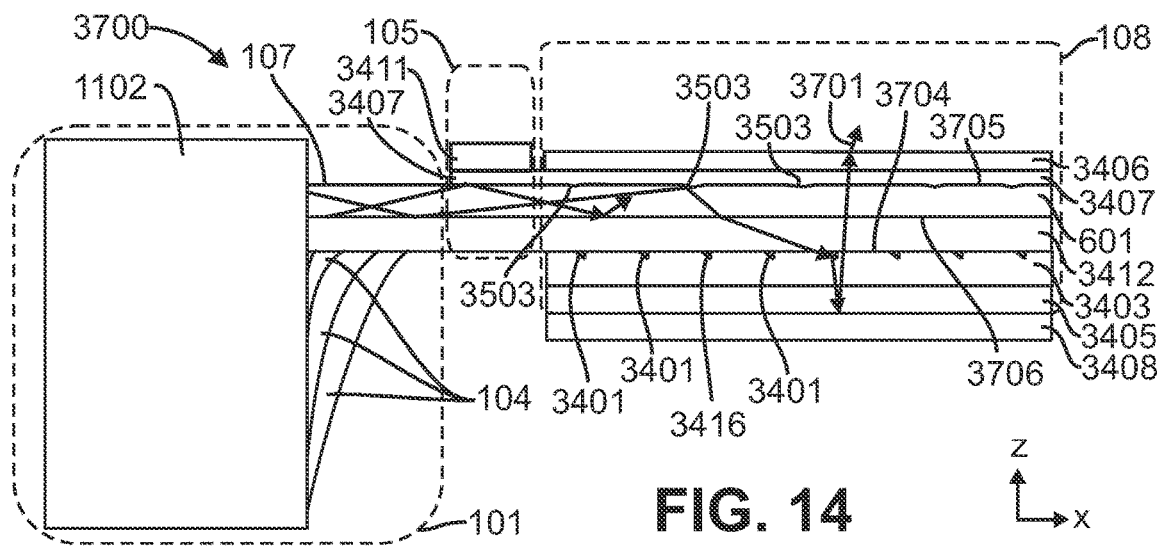
FIG. 14 is a cross-sectional side view of one embodiment of a light emitting device comprising light turning features and low angle directing features.

FIG. 14 is a cross-sectional side view of one embodiment of a light emitting device 3700 comprising the light input coupler 101, a film-based lightguide 107 comprising a core layer 601 of a core material with a core refractive index $n_{DL}$ optically coupled to a light turning film 3403 over a portion of the top surface 3704 of the light turning film 3403 (such that air gaps 3416 are formed at the light turning features 3401) using a second pressure sensitive adhesive layer 3412 comprising a second material with a second refractive index $n_{D2}$. The reflective spatial light modulator 3408 is optically coupled to the light turning film 3403 using a third pressure sensitive adhesive layer 3405. The light turning film 3403 comprises a plurality of light turning features 3401 on the top surface 3705 of the light turning film 3403 opposite the third pressure sensitive adhesive layer 3405. A light source 1102 with an optical axis parallel to the +y direction (into the page) is positioned to emit light into the folded stack of coupling lightguides 104. The film-based lightguide 107 comprises a plurality of low angle directing features 3503 on the top surface 3705 of the core layer 601 of the film-based lightguide 107 and is optically coupled to a cover layer 3406 (such as a protective PET film or touchscreen film, for example) using a first pressure sensitive adhesive layer 3407 comprising a first material with a first refractive index $n_{D1}$.

A light mixing region 105 is positioned between the light input coupler 101 and the light emitting region 108 of the light emitting device 3700. An opaque layer 3411 is optically coupled to the film-based lightguide 107 in the light mixing region 105 using the first pressure sensitive adhesive layer 3407. In this embodiment, the opaque layer 3411 is a light absorbing layer that absorbs at least 70% of the light within a wavelength range between 400 nanometers and 700 nanometers that reaches the opaque layer 3411 through the first pressure sensitive adhesive layer 3407. In this embodiment, first light 3701 from the light source 1102 propagates through the coupling lightguides 104 within the light input coupler 101, totally internally reflect within the core layer 601 of the film-based lightguide 107 and propagates through the light mixing region 105 and into the light emitting region 108 of the film-based lightguide 107. First light 3701 reflects from a low angle directing feature 3503 to a second angle in the core layer 601 of the lightguide smaller than the incident angle by an average total angle of deviation of less than 20 degrees. In this embodiment, the second angle is less than the critical angle for the interface between the core layer 601 and second pressure sensitive adhesive layer 3412. In this embodiment, $n_{DL} > n_{D2} > n_{D1}$ such that the first light 3701 preferentially escapes a total internal reflection condition within the core layer 601 of the film-based lightguide 107 on the lower surface 3706 of the core layer 601 since the refractive index, $n_{D2}$, of the second pressure sensitive adhesive layer 3412 is greater than the refractive index, $n_{D1}$, of the first pressure sensitive adhesive layer 3407. After transmitting from the core layer 601 into the second pressure sensitive adhesive layer 3412, the first light 3409 propagates into the light turning film 3403 and totally internally reflects from a light turning feature 3401 in the light turning film 3403 to an angle within 30 degrees from the thickness direction (parallel to the z direction in this embodiment) of the film-based lightguide 107. The first light 3409 then propagates through the third pressure sensitive adhesive layer 3405 and reflects from the reflective spatial light modulator 3408, passes back through the aforementioned layers in the reverse order, does not interact a second time with a light turning feature 3401, and is emitted from the light emitting device 3400 in the light emitting region 108.

Exemplary embodiments of light emitting devices and methods for making or producing the same are described above in detail. The devices, components, and methods are not limited to the specific embodiments described herein, but rather, the devices, components of the devices and/or steps of the methods may be utilized independently and separately from other devices, components and/or steps described herein. Further, the described devices, components and/or the described methods steps can also be defined in, or used in combination with, other devices and/or methods, and are not limited to practice with only the devices and methods as described herein.

While the disclosure includes various specific embodiments, those skilled in the art will recognize that the embodiments can be practiced with modification within the spirit and scope of the disclosure and the claims.

It is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Reference throughout this specification to "one embodiment" or "an embodiment" may mean that a particular feature, structure, or characteristic described in connection with a particular embodiment may be included in at least one embodiment of claimed subject matter. Thus, appearances of the phrase "in one embodiment" or "an embodiment" in various places throughout this specification is not necessarily intended to refer to the same embodiment or to any one particular embodiment described. Furthermore, it is to be understood that particular features, structures, or characteristics described may be combined in various ways in one or more embodiments. In general, of course, these and other issues may vary with the particular context of usage. Therefore, the particular context of the description or the usage of these terms may provide helpful guidance regarding inferences to be drawn for that context.

EQUIVALENTS

Those skilled in the art will recognize or be able to ascertain using no more than routine experimentation, numerous equivalents to the specific procedures described herein. Such equivalents are considered to be within the scope of the disclosure. Various substitutions, alterations, and modifications may be made to the embodiments without departing from the spirit and scope of the disclosure. Other aspects, advantages, and modifications are within the scope of the disclosure. This disclosure is intended to cover any adaptations or variations of the specific embodiments discussed herein. Therefore, it is intended that this disclosure be limited only by the claims and the equivalents thereof.

Unless otherwise indicated, all numbers expressing feature sizes, amounts, and physical properties used in the specification and claims are to be understood as being modified by the term "about". Accordingly, unless indicated to the contrary, the numerical parameters set forth in the foregoing specification and attached claims are approximations that can vary depending upon the desired properties sought to be obtained by those skilled in the art utilizing the teachings disclosed herein. Unless indicated to the contrary, all tests and properties are measured at an ambient temperature of 25 degrees Celsius or the environmental temperature within or near the device when powered on (when indicated) under constant ambient room temperature of 25 degrees Celsius. Unless otherwise stated, refractive indexes referenced herein are measured at the yellow doublet sodium D-line, with a wavelength of 589 nanometers. Elements in the figures are not drawn to scale.

What is claimed is:

1. A display comprising:
   a reflective spatial light modulator comprising a front viewing side and a back side opposite the front viewing side;
   a lightguide formed from a film having opposing surfaces with a thickness not greater than 0.5 millimeters therebetween, the lightguide positioned on the front viewing side of the reflective spatial light modulator and comprising a lightguide region, a light emitting region, and a plurality of coupling lightguides in a form of strips of the film extending from and continuous with the lightguide region, and each coupling lightguide of the plurality of coupling lightguides terminates in a bounding edge;
   a light source positioned to emit light into the bounding edges, the light propagating within the plurality of coupling lightguides to the lightguide region; and
   a plurality of light extraction features arranged within the light emitting region, the plurality of light extraction features frustrate totally internally reflected light from the light source propagating in the lightguide region such that light exits the lightguide in the light emitting region and propagates to the reflective spatial light modulator,
   wherein the plurality of coupling lightguides are folded along linear fold lines behind the reflective spatial light modulator such that the plurality of coupling lightguides are stacked on the back side of the reflective spatial light modulator with the bounding edges positioned to receive the light from the light source, and the linear fold lines of the plurality of coupling lightguides are oriented at different fold angles such that a difference between fold angles of adjacent coupling lightguides of the plurality of coupling lightguides is greater than 5 degrees.

2. The display of claim 1 wherein each fold angle of the fold angles directs the bounding edge toward a center of the light emitting region in a width direction orthogonal to a thickness direction of the film.

3. The display of claim 1 wherein the plurality of coupling lightguides comprise linear lateral edge sections proximate the linear fold lines that are substantially parallel to each other and perpendicular to the linear fold lines.

4. The display of claim 1 wherein the reflective spatial light modulator comprises a designed illumination angle for ambient light illumination of the reflective spatial light modulator and a primary axis of illumination defined as an in-plane component of the designed illumination angle in a plane perpendicular to a thickness direction of the reflective spatial light modulator, and optical axes of light from the plurality of coupling lightguides are within 10 degrees of the primary axis of illumination when entering the light emitting region.

5. The display of claim 4 where the primary axis of illumination is a downward vertical direction when viewing the display.

6. The display of claim 1 wherein the reflective spatial light modulator comprises a designed illumination angle for ambient light illumination of the reflective spatial light modulator and a primary axis of illumination defined as an in-plane component of the designed illumination angle in a plane perpendicular to a thickness direction of the reflective spatial light modulator, the plurality of coupling lightguides comprise lateral edges, and the lateral edges join the lightguide region at an angle less than 10 degrees from the primary axis of illumination.

7. The display of claim 1 wherein the reflective spatial light modulator comprises a designed illumination angle for ambient light illumination of the reflective spatial light modulator and a primary axis of illumination defined as an in-plane component of the designed illumination angle in a plane perpendicular to a thickness direction of the reflective spatial light modulator, the plurality of coupling lightguides comprises a central coupling lightguide with a fold angle of 90 degrees from the primary axis of illumination.

8. The display of claim 7 wherein the plurality of coupling lightguides comprises coupling lightguides on opposite sides of the central coupling lightguide with fold angles at a same magnitude but opposite in sign.

9. The display of claim 1 wherein the reflective spatial light modulator comprises an active area defined by a boundary with a circular, semi-circular, or arcuate portion.

10. The display of claim 1 wherein the reflective spatial light modulator comprises an active area in a shape of a polygon with more than four sides.

11. The display of claim 10 wherein the linear fold lines are substantially parallel to two or more sides of the more than four sides.

12. The display of claim 1 wherein the plurality of coupling lightguides comprise lateral edges that are asymmetric in a width direction orthogonal to a thickness direction of the film.

13. The display of claim 1 wherein the plurality of coupling lightguides comprise tapered lateral edges that reduce widths of each coupling lightguide of the plurality of coupling lightguides from the lightguide region to the bounding edge.

14. The display of claim 1 wherein the plurality of coupling lightguides comprise tapered lateral edges that reduce widths of each coupling lightguide of the plurality of coupling lightguides from the lightguide region to the bounding edge, and the tapered lateral edges comprise portions curved in a plane orthogonal to a thickness direction of the film.

15. The display of claim 1 wherein each coupling lightguide of the plurality of coupling lightguides comprises lateral edges with portions curved in a plane orthogonal to a thickness direction of the coupling lightguide.

16. The display of claim 15 wherein one or more coupling lightguides of the plurality of coupling lightguides comprise:
   a first lateral edge of the one or more coupling lightguides with a radius of curvature $r_1$ along a section of the first lateral edge;
   a second lateral edge of the one or more coupling lightguides opposite the first lateral edge with a radius of curvature $r_2$ along a section of the second lateral edge; and
   a width, w, at a bounding edge in a direction orthogonal to an optical axis of the light source and orthogonal to the thickness direction of the coupling lightguide, and an average radius-to-width ratio, $(r_1+r_2)/2w$, of the one or more coupling lightguides is greater than 6.

17. A display comprising:
   a reflective spatial light modulator comprising a front viewing side and a back side opposite the front viewing side;
   a lightguide formed from a film having opposing surfaces with a thickness not greater than 0.5 millimeters therebetween, the lightguide positioned on the front viewing side of the reflective spatial light modulator and comprising a lightguide region, a light emitting region, and a plurality of coupling lightguides in a form of strips of the film extending from and continuous with the lightguide region, and each coupling lightguide of the plurality of coupling lightguides terminates in a bounding edge;
   a light source positioned to emit light into the bounding edges, the light propagating within the plurality of coupling lightguides to the lightguide region; and
   a plurality of light extraction features arranged within the light emitting region, the plurality of light extraction features frustrate totally internally reflected light from the light source propagating in the lightguide region such that light exits the lightguide in the light emitting region and propagates to the reflective spatial light modulator,
   wherein the plurality of coupling lightguides are folded along linear fold lines behind the reflective spatial light modulator such that the plurality of coupling lightguides are stacked on the back side of the reflective spatial light modulator with the bounding edges positioned to receive the light from the light source, the linear fold lines of the plurality of coupling lightguides are oriented at different fold angles, and the plurality of coupling lightguides comprise lateral edges with curved portions.

18. The display of claim 17 wherein the plurality of coupling lightguides comprise tapered lateral edges that reduce widths of each coupling lightguide of the plurality of coupling lightguides from the lightguide region to the bounding edge.

19. The display of claim 17 wherein the lateral edges of each coupling lightguide of the plurality of coupling lightguides comprise linear portions proximate the linear fold lines that are substantially parallel to each other.

20. A display comprising:
   a reflective spatial light modulator comprising a front viewing side and a back side opposite the front viewing side;
   a lightguide formed from a film having opposing surfaces with a thickness not greater than 0.5 millimeters therebetween, the lightguide positioned on the front viewing side of the reflective spatial light modulator and comprising a lightguide region, a light emitting region, and a plurality of coupling lightguides in a form of strips of the film extending from and continuous with the lightguide region, and each coupling lightguide of the plurality of coupling lightguides terminates in a bounding edge;
   a light source positioned to emit light into the bounding edges, the light propagating within the plurality of coupling lightguides to the lightguide region; and
   a plurality of light extraction features arranged within the light emitting region, the plurality of light extraction features frustrate totally internally reflected light from the light source propagating in the lightguide region such that light exits the lightguide in the light emitting region and propagates to the reflective spatial light modulator,
   wherein the reflective spatial light modulator comprises an active area defined by a boundary with a circular, semi-circular, or arcuate portion, or an active area in a shape of a polygon with more than four sides, the plurality of coupling lightguides are folded along linear fold lines behind the reflective spatial light modulator such that the plurality of coupling lightguides are stacked on the back side of the reflective spatial light modulator with the bounding edges positioned to receive the light from the light source, and the linear fold lines of the plurality of coupling lightguides are oriented at different fold angles.

* * * * *